US012681961B2

(12) United States Patent
Cao et al.

(10) Patent No.: US 12,681,961 B2
(45) Date of Patent: Jul. 14, 2026

(54) METHOD AND APPARATUS FOR RETRIEVING 3D MAP

(71) Applicant: HUAWEI TECHNOLOGIES CO., LTD., Shenzhen (CN)

(72) Inventors: Xiaoran Cao, Hangzhou (CN); Kangying Cai, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 177 days.

(21) Appl. No.: 18/526,846

(22) Filed: Dec. 1, 2023

(65) Prior Publication Data

US 2024/0111793 A1 Apr. 4, 2024

Related U.S. Application Data

(63) Continuation of application No. PCT/CN2021/105624, filed on Jul. 9, 2021.

(30) Foreign Application Priority Data

Jun. 4, 2021 (WO) ................ PCT/CN2021/098482
Jun. 4, 2021 (WO) ................ PCT/CN2021/098483

(51) Int. Cl.
*G06F 16/29* (2019.01)
*G06F 16/487* (2019.01)
(Continued)

(52) U.S. Cl.
CPC ............ *G06F 16/29* (2019.01); *G06F 16/487* (2019.01); *G06T 9/00* (2013.01); *G06T 17/00* (2013.01); *G06T 17/05* (2013.01)

(58) Field of Classification Search
None
See application file for complete search history.

(56) References Cited

U.S. PATENT DOCUMENTS

2015/0095350 A1* 4/2015 Chen ...................... G06F 16/29
707/755
2021/0350713 A1* 11/2021 Van Meeteren ..... G05D 1/0022

FOREIGN PATENT DOCUMENTS

EP 4343574 A1 3/2024
JP 2019040445 A 3/2019
(Continued)

OTHER PUBLICATIONS

Strecha et al., "LDAHash:Improved Matching with Smaller Descriptors," IEEE Transactions on Pattern Analysiss and Machine Intelligence, vol. 34, No. 1, Total 13 pages (Jan. 2012).
(Continued)

*Primary Examiner* — Kent W Chang
*Assistant Examiner* — Jonathan M Cofino
(74) *Attorney, Agent, or Firm* — Leydig, Voit & Mayer, Ltd.

(57) ABSTRACT

A 3D map retrieval method is provided. The method for retrieving a 3D map includes: obtaining binary data of S 3D map descriptors; performing stage-i retrieval in the binary data of the S 3D map descriptors based on binary data of a retrieval descriptor, to obtain P 3D map descriptors through screening; performing stage-m decompression on compressed data of the P 3D map descriptors to obtain reconstructed data of the P 3D map descriptors; and performing stage-j retrieval in the reconstructed data of the P 3D map descriptors based on partial data or all data of the retrieval descriptor, to obtain Q 3D map descriptors.

17 Claims, 13 Drawing Sheets

Extract binary data of S 3D map descriptors from compressed data of the S 3D map descriptors — S101A Perform stage-i retrieval in the binary data of the S 3D map descriptors based on binary data of a retrieval descriptor, to obtain P 3D map descriptors — S102A Perform stage-m decompression on compressed data of the P 3D map descriptors to obtain reconstructed data of the P 3D map descriptors — S103A Perform stage-j retrieval in the reconstructed data of the P 3D map descriptors based on partial data or all data of the retrieval descriptor, to obtain Q 3D map descriptors — S104A

(51) Int. Cl.
    *G06T 9/00*          (2006.01)
    *G06T 17/00*       (2006.01)
    *G06T 17/05*       (2011.01)

(56)                References Cited

FOREIGN PATENT DOCUMENTS

| | | | |
|---|---|---|---|
| KR | 20200096411 A | 8/2020 | |
| WO | 2019198636 A1 | 10/2019 | |

OTHER PUBLICATIONS

Tran et al., "On-Device Scalable Image-Based Localization via Prioritized Cascade Search and Fast One-Many RANSAC," IEEE Transactions on Image Processing, vol. 28, No. 4, Total 16 pages (Apr. 2019).
Dube et al., "SegMap: Segment-based mapping and localization using data-driven descriptors," The International Journal of Robotics Research, Total 17 pages (Sep. 2019).

\* cited by examiner

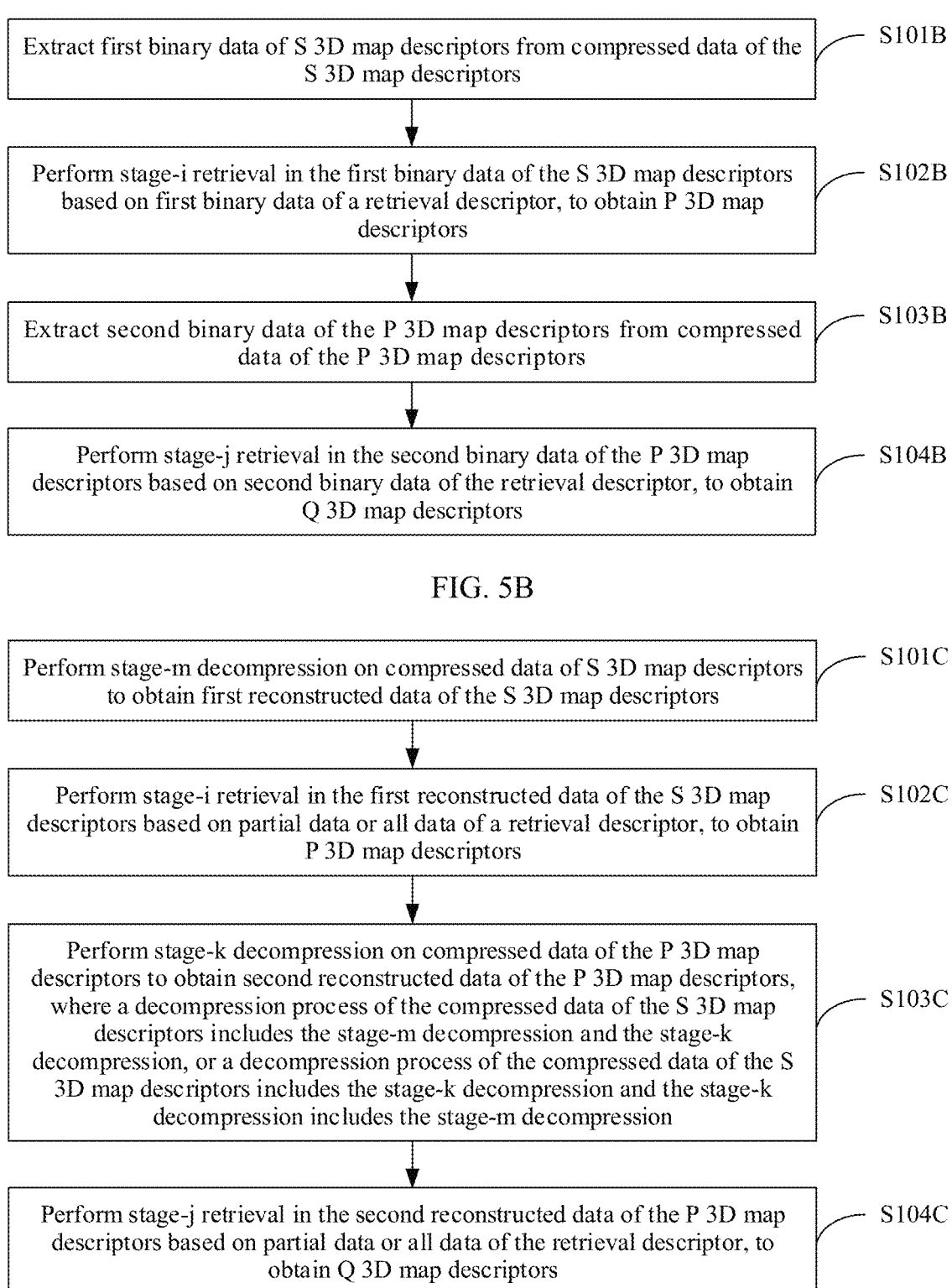

Extract first binary data of S 3D map descriptors from compressed data of the S 3D map descriptors — S101B Perform stage-i retrieval in the first binary data of the S 3D map descriptors based on first binary data of a retrieval descriptor, to obtain P 3D map descriptors — S102B Extract second binary data of the P 3D map descriptors from compressed data of the P 3D map descriptors — S103B Perform stage-j retrieval in the second binary data of the P 3D map descriptors based on second binary data of the retrieval descriptor, to obtain Q 3D map descriptors — S104B

FIG. 5B

Perform stage-m decompression on compressed data of S 3D map descriptors to obtain first reconstructed data of the S 3D map descriptors — S101C Perform stage-i retrieval in the first reconstructed data of the S 3D map descriptors based on partial data or all data of a retrieval descriptor, to obtain P 3D map descriptors — S102C Perform stage-k decompression on compressed data of the P 3D map descriptors to obtain second reconstructed data of the P 3D map descriptors, where a decompression process of the compressed data of the S 3D map descriptors includes the stage-m decompression and the stage-k decompression, or a decompression process of the compressed data of the S 3D map descriptors includes the stage-k decompression and the stage-k decompression includes the stage-m decompression — S103C Perform stage-j retrieval in the second reconstructed data of the P 3D map descriptors based on partial data or all data of the retrieval descriptor, to obtain Q 3D map descriptors — S104C

FIG. 5C

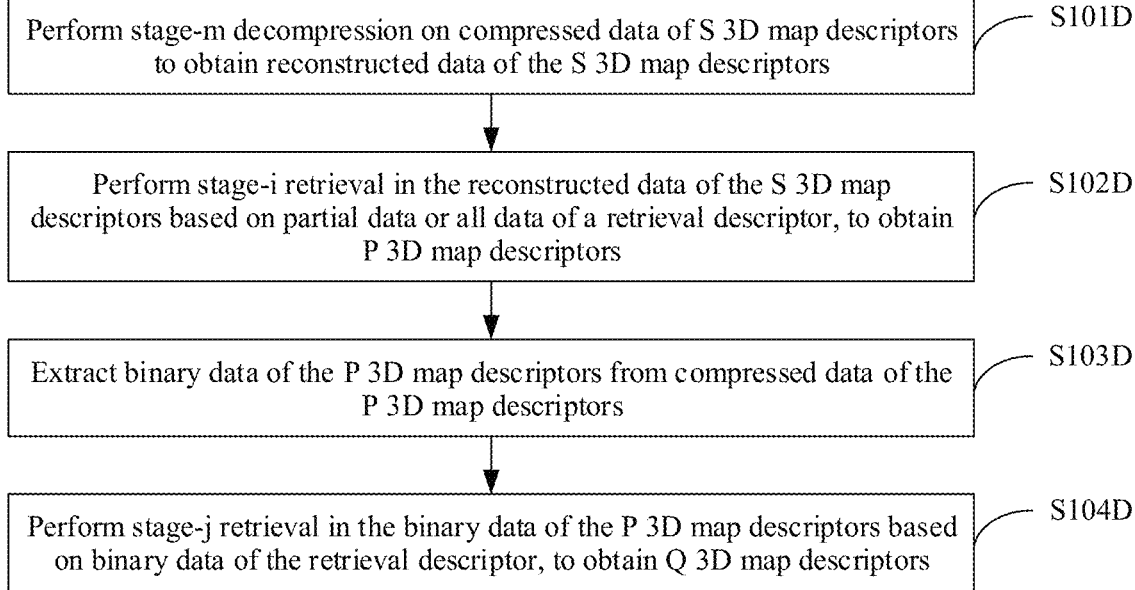

Perform stage-m decompression on compressed data of S 3D map descriptors to obtain reconstructed data of the S 3D map descriptors — S101D Perform stage-i retrieval in the reconstructed data of the S 3D map descriptors based on partial data or all data of a retrieval descriptor, to obtain P 3D map descriptors — S102D Extract binary data of the P 3D map descriptors from compressed data of the P 3D map descriptors — S103D Perform stage-j retrieval in the binary data of the P 3D map descriptors based on binary data of the retrieval descriptor, to obtain Q 3D map descriptors — S104D

FIG. 5D

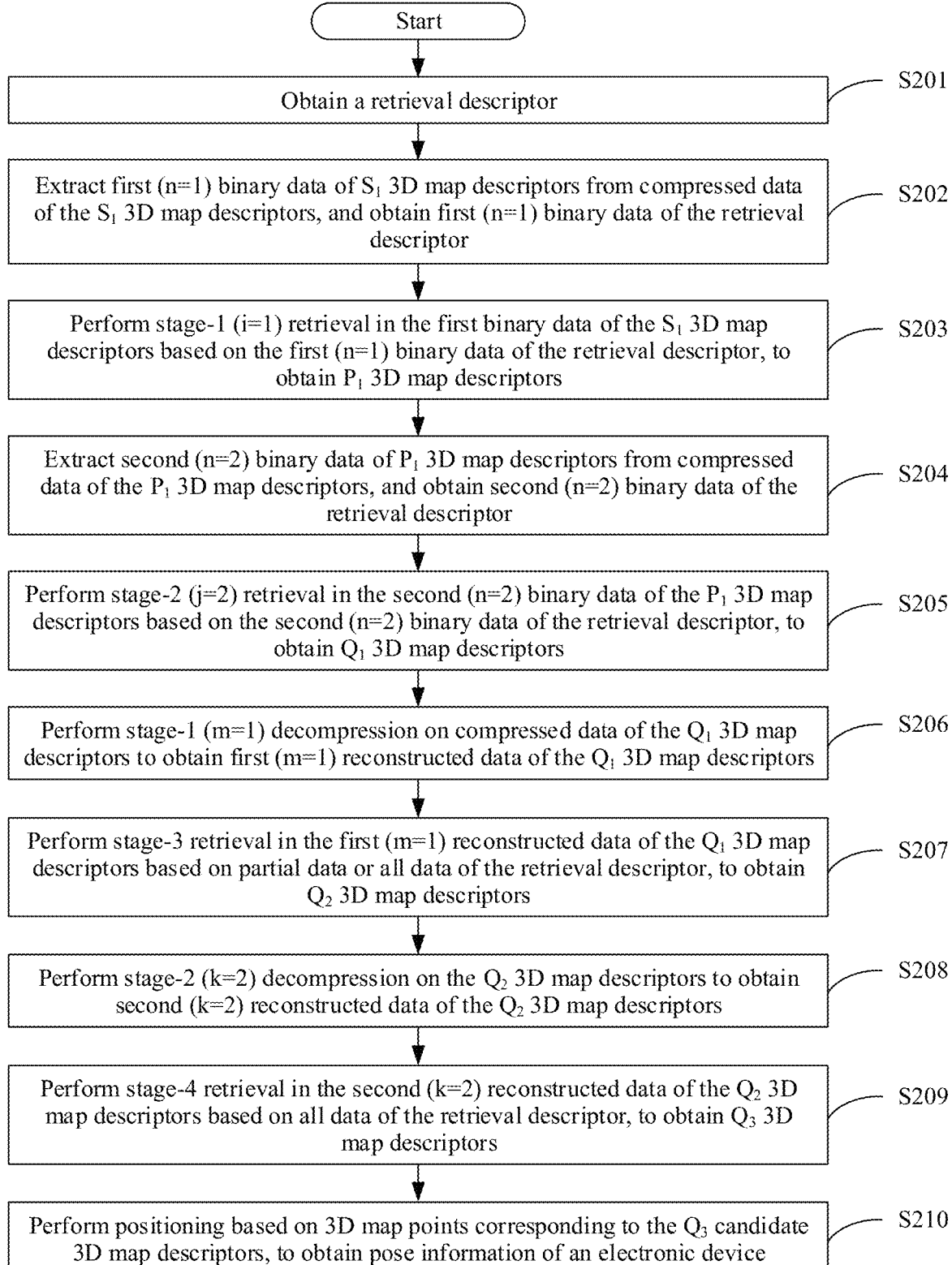

Start

Obtain a retrieval descriptor — S201

Extract first (n=1) binary data of $S_1$ 3D map descriptors from compressed data of the $S_1$ 3D map descriptors, and obtain first (n=1) binary data of the retrieval descriptor — S202

Perform stage-1 (i=1) retrieval in the first binary data of the $S_1$ 3D map descriptors based on the first (n=1) binary data of the retrieval descriptor, to obtain $P_1$ 3D map descriptors — S203

Extract second (n=2) binary data of $P_1$ 3D map descriptors from compressed data of the $P_1$ 3D map descriptors, and obtain second (n=2) binary data of the retrieval descriptor — S204

Perform stage-2 (j=2) retrieval in the second (n=2) binary data of the $P_1$ 3D map descriptors based on the second (n=2) binary data of the retrieval descriptor, to obtain $Q_1$ 3D map descriptors — S205

Perform stage-1 (m=1) decompression on compressed data of the $Q_1$ 3D map descriptors to obtain first (m=1) reconstructed data of the $Q_1$ 3D map descriptors — S206

Perform stage-3 retrieval in the first (m=1) reconstructed data of the $Q_1$ 3D map descriptors based on partial data or all data of the retrieval descriptor, to obtain $Q_2$ 3D map descriptors — S207

Perform stage-2 (k=2) decompression on the $Q_2$ 3D map descriptors to obtain second (k=2) reconstructed data of the $Q_2$ 3D map descriptors — S208

Perform stage-4 retrieval in the second (k=2) reconstructed data of the $Q_2$ 3D map descriptors based on all data of the retrieval descriptor, to obtain $Q_3$ 3D map descriptors — S209

Perform positioning based on 3D map points corresponding to the $Q_3$ candidate 3D map descriptors, to obtain pose information of an electronic device — S210

FIG. 6

Perform stage-i retrieval in binary data of S representative 3D map descriptors based on binary data of a retrieval descriptor, to obtain at least one representative 3D map descriptor — S1021A Use 3D map descriptors in a data set corresponding to each of the at least one representative 3D map descriptor as P 3D map descriptors — S1022A

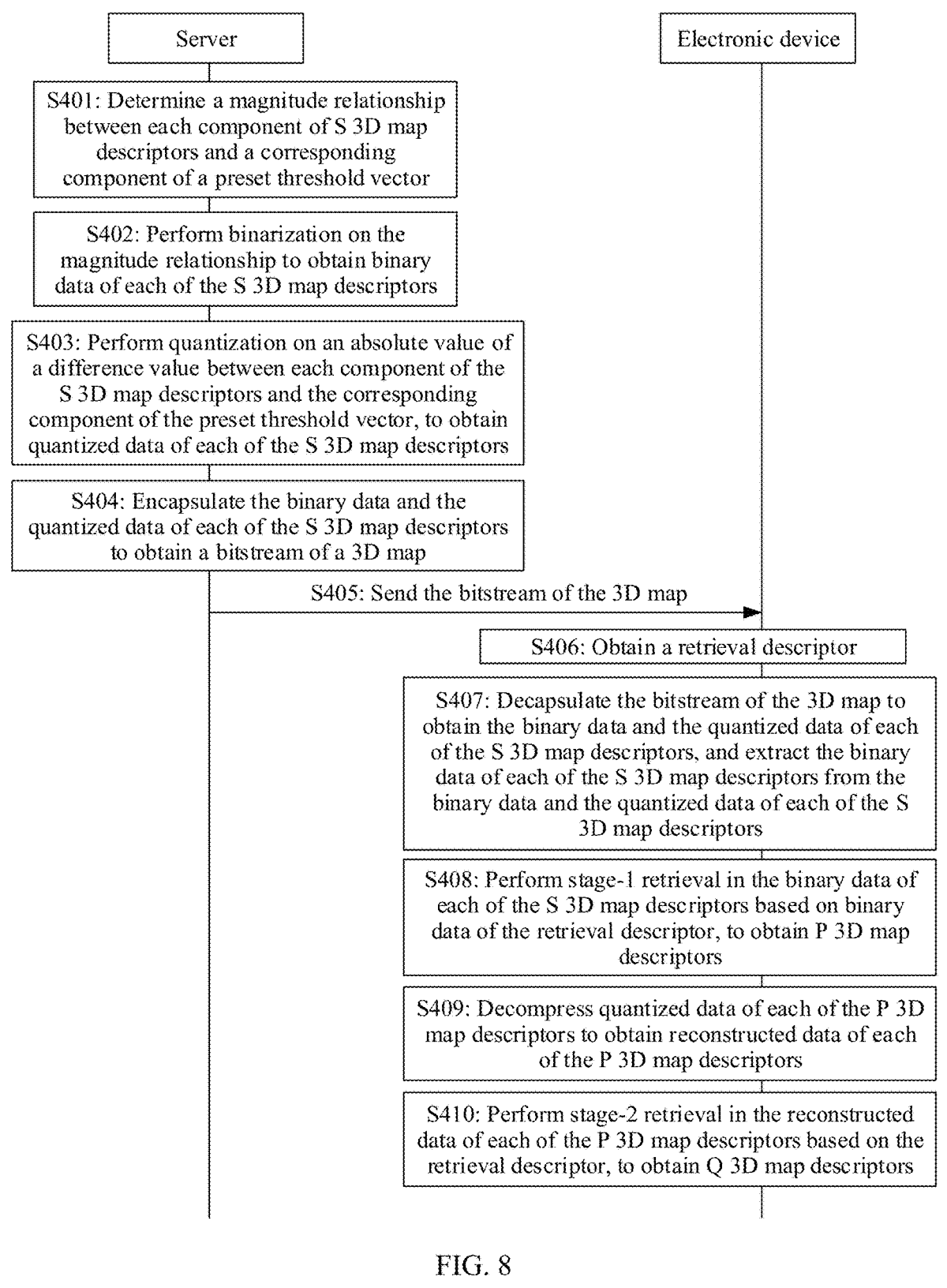

| Server | Electronic device |
|---|---|

S401: Determine a magnitude relationship between each component of S 3D map descriptors and a corresponding component of a preset threshold vector S402: Perform binarization on the magnitude relationship to obtain binary data of each of the S 3D map descriptors S403: Perform quantization on an absolute value of a difference value between each component of the S 3D map descriptors and the corresponding component of the preset threshold vector, to obtain quantized data of each of the S 3D map descriptors S404: Encapsulate the binary data and the quantized data of each of the S 3D map descriptors to obtain a bitstream of a 3D map S405: Send the bitstream of the 3D map S406: Obtain a retrieval descriptor S407: Decapsulate the bitstream of the 3D map to obtain the binary data and the quantized data of each of the S 3D map descriptors, and extract the binary data of each of the S 3D map descriptors from the binary data and the quantized data of each of the S 3D map descriptors S408: Perform stage-1 retrieval in the binary data of each of the S 3D map descriptors based on binary data of the retrieval descriptor, to obtain P 3D map descriptors S409: Decompress quantized data of each of the P 3D map descriptors to obtain reconstructed data of each of the P 3D map descriptors S410: Perform stage-2 retrieval in the reconstructed data of each of the P 3D map descriptors based on the retrieval descriptor, to obtain Q 3D map descriptors

FIG. 8

METHOD AND APPARATUS FOR RETRIEVING 3D MAP

CROSS-REFERENCE TO RELATED APPLICATIONS

This application is a continuation of International Application No. PCT/CN2021/105624, filed on Jul. 9, 2021, which claims priority to International Patent Application No. PCT/CN2021/098482, filed on Jun. 4, 2021 and International Patent Application No. PCT/CN2021/098483, filed on Jun. 4, 2021. The disclosures of the aforementioned applications are hereby incorporated by reference in their entireties.

TECHNICAL FIELD

This application relates to positioning technologies, and in particular, to a method and an apparatus for retrieving a three-dimensional (3D) map.

BACKGROUND

Virtual reality (VR), augmented reality (AR), and mixed reality (MR) technologies are emerging multimedia virtual scenario technologies in recent years. Such technologies can be used to create virtual reality and overlay it with a real world to produce a new visual environment and interactive experience. In such an application, an electronic device needs to determine pose information of the electronic device in a current environment, to accurately implement fusion between a virtual object and a real scene.

In addition, in applications such as autonomous driving, autonomous navigation, uncrewed aerial vehicle automatic inspection, and industrial robots, a carrying device such as a vehicle, an uncrewed aerial vehicle, or a robot needs to determine a pose of an electronic device carried by the carrying device, to determine a pose of the carrying device in a current environment, so as to perform accurate route planning, navigation, detection, and control.

In the foregoing applications, for a problem that the pose of the electronic device in the current environment needs to be determined, a typical solution is as follows: The electronic device receives, from a server or another device, a three-dimensional (3-dimensional, 3D) map of an environment in which the electronic device is located, collects visual information in the environment by using a local sensor, and performs retrieval in a downloaded 3D map based on the collected visual information, to determine the current pose of the electronic device.

However, an original 3D map usually includes a large data volume, and a computation amount for retrieval is usually extremely large. This requires a large quantity of computing resources, and takes a long time, thereby affecting user experience.

SUMMARY

Embodiments of this application provide a method and an apparatus for retrieving a 3D map, to improve retrieval performance.

According to a first aspect, an embodiment of this application provides a method for retrieving a 3D map. The method may include: extracting binary data of S 3D map descriptors from compressed data of the S 3D map descriptors, where the S 3D map descriptors correspond to a plurality of 3D map points of a 3D map; performing stage-i retrieval in the binary data of the S 3D map descriptors based on binary data of a retrieval descriptor, to obtain P 3D map descriptors, where the retrieval descriptor is a feature that corresponds to a real environment and that is extracted from visual information collected by a sensor of an electronic device; performing stage-m decompression on compressed data of the P 3D map descriptors to obtain reconstructed data of the P 3D map descriptors, where a decompression process (complete decompression process) of the compressed data of the P 3D map descriptors includes at least the stage-m decompression; and performing stage-j retrieval in the reconstructed data of the P 3D map descriptors based on partial data or all data of the retrieval descriptor, to obtain Q 3D map descriptors, where S, P, Q, i, j, and m are positive integers, $0<Q<P$, $0<P<T$, $0<S\le T$, T represents a total quantity of 3D map descriptors in the 3D map, $j=i+1$, $1\le i<L$, $1<j\le L$, L represents a total quantity of retrieval stages of the 3D map or a retrieval stage quantity threshold, and L is a positive integer greater than 1.

It can be learned that, in this embodiment, the stage-i retrieval is performed in the binary data of the S 3D map descriptors based on the binary data of the retrieval descriptor, to obtain the P 3D map descriptors through screening, the stage-m decompression is performed on the compressed data of the P 3D map descriptors to obtain the reconstructed data of the P 3D map descriptors, and the stage-j retrieval is performed in the reconstructed data of the P 3D map descriptors based on partial data or all data of the retrieval descriptor, to obtain fewer 3D map descriptors through screening. Binary data in the compressed data is used for one stage of retrieval in the at least two stages of retrieval, to improve a retrieval speed, and the reconstructed data obtained through decompression is used for another stage of retrieval, to ensure retrieval accuracy. Compared with retrieval in reconstructed data of the 3D map obtained through complete decompression, the method for retrieving a 3D map provided in this embodiment of this application can improve retrieval performance. In other words, the method for retrieving a 3D map provided in this embodiment of this application can improve retrieval performance.

The stage j may be an intermediate stage in multi-stage retrieval, that is, $j<L$, or may be the last stage in multi-stage retrieval, that is, $j=L$.

In an example, the stage-m decompression may be staged decompression, and may be understood as a subprocess of complete decompression, or may be understood as partial decompression. In another example, the stage-m decompression may be complete decompression.

In a possible design, N 3D map descriptors in the Q 3D map descriptors are used for positioning, 3D map points corresponding to the N 3D map descriptors match a 3D map point corresponding to the retrieval descriptor, N is a positive integer, and $0<N\le Q$. The method may further include: performing positioning based on the 3D map points corresponding to the N 3D map descriptors, to obtain pose information of the electronic device.

In this embodiment, when the 3D map points corresponding to the N 3D map descriptors obtained through retrieval match the map point corresponding to the retrieval descriptor, positioning may be performed based on the 3D map points corresponding to the N 3D map descriptors. This helps improve positioning performance.

In a possible design, a retrieval manner used for the stage-i retrieval is a retrieval manner based on a first distance, and a retrieval manner used for the stage-j retrieval is a retrieval manner based on a second distance.

The first distance may include a distance obtained by using binary data, such as a Hamming distance. For example, the first distance may be a Hamming distance. For another example, the first distance may be a distance obtained by obtaining absolute values of difference values between corresponding bits of two pieces of binary data and adding up the absolute values of all the difference values. Retrieval based on the first distance means determining a correlation or similarity by calculating the first distance, to screen 3D map descriptors. The second distance may include but is not limited to a Euclidean distance, an inner product distance, a cosine distance, a Manhattan distance, and the like. Retrieval based on the second distance means determining a correlation or similarity by calculating the second distance, to screen 3D map descriptors.

In this embodiment, retrieval based on the first distance can improve a retrieval speed, and retrieval based on the second distance can improve retrieval accuracy.

In a possible design, the method may further include: receiving the retrieval descriptor, and performing binarization on the retrieval descriptor to obtain the binary data of the retrieval descriptor. An execution body (which may be an electronic device, or may be a server (for example, a cloud server)) configured to perform the retrieval method in the first aspect may receive the retrieval descriptor sent by another device. For example, an execution body configured to perform the retrieval method in the first aspect receives the retrieval descriptor collected and extracted by another electronic device. Then, binarization is performed on the retrieval descriptor to obtain the binary data of the retrieval descriptor.

In a possible design, the method may further include: receiving the visual information, extracting the retrieval descriptor from the visual information, and performing binarization on the retrieval descriptor to obtain the binary data of the retrieval descriptor. An execution body (which may be an electronic device or a server) configured to perform the retrieval method in the first aspect may receive the visual information sent by another device, and extract the retrieval descriptor from the visual information. Then, binarization is performed on the retrieval descriptor to obtain the binary data of the retrieval descriptor.

In a possible design, the method may further include: in response to a visual information collection operation entered by a user, triggering the sensor to perform visual information collection on the real environment to obtain the visual information, extracting the retrieval descriptor from the visual information, and performing binarization on the retrieval descriptor to obtain the binary data of the retrieval descriptor. An execution body (which may be an electronic device or a server) configured to perform the retrieval method in the first aspect may collect the visual information, and extract the retrieval descriptor from the visual information. Then, binarization is performed on the retrieval descriptor to obtain the binary data of the retrieval descriptor.

According to the method for retrieving a 3D map in this embodiment of this application, retrieval may be performed in the 3D map based on retrieval descriptors in different application scenarios, which is widely applicable.

In a possible design, when $N<Q$, the method further includes: performing stage-k decompression on compressed data of the Q 3D map descriptors to obtain reconstructed data of the Q 3D map descriptors; and performing stage-r retrieval in the reconstructed data of the Q 3D map descriptors based on partial data or all data of the retrieval descriptor, to obtain the N 3D map descriptors. $N<Q<P$, and the decompression process of the compressed data of the P 3D map descriptors includes the stage-m decompression (staged decompression) and the stage-k decompression (staged decompression), where r and k are positive integers, $m<k$, and $j<r\leq L$.

In this embodiment, the stage-i retrieval is performed in the binary data of the S 3D map descriptors based on the binary data of the retrieval descriptor, to obtain the P 3D map descriptors through screening, the stage-m decompression (staged decompression) is performed on the compressed data of the P 3D map descriptors to obtain the reconstructed data of the P 3D map descriptors, and the stage-j retrieval is performed in the reconstructed data of the P 3D map descriptors based on partial data or all data of the retrieval descriptor, to obtain the Q 3D map descriptors through screening. Then, the stage-k decompression (staged decompression) is performed on the compressed data of the Q 3D map descriptors to obtain the reconstructed data of the Q 3D map descriptors, and the stage-r retrieval is performed in the reconstructed data of the Q 3D map descriptors based on all data of the retrieval descriptor, to obtain the N 3D map descriptors. The N 3D map descriptors may be used for positioning. Binary data in the compressed data is used for one stage of retrieval in the at least three stages of retrieval, to improve a retrieval speed, and reconstructed data obtained through different decompression is used for other two stages of retrieval, to ensure retrieval accuracy while improving a retrieving speed.

Specifically, the reconstructed data obtained through the stage-m decompression and the reconstructed data obtained through the stage-k decompression have different decompression degrees or distortions.

In a possible design, the compressed data of the P 3D map descriptors includes binary data and quantized data of each of the P 3D map descriptors, and the performing stage-m decompression on compressed data of the P 3D map descriptors to obtain reconstructed data of the P 3D map descriptors includes: performing dequantization on the quantized data of each of the P 3D map descriptors to obtain P pieces of dequantized data, where the P pieces of dequantized data are used as the reconstructed data of the P 3D map descriptors. The performing stage-k decompression on compressed data of the Q 3D map descriptors to obtain reconstructed data of the Q 3D map descriptors includes: performing dequantization on quantized data of each of the Q 3D map descriptors to obtain Q pieces of dequantized data; and obtaining reconstructed data of each of the Q 3D map descriptors based on the Q pieces of dequantized data and binary data of each of the Q 3D map descriptors.

In this embodiment, dequantization is performed on the quantized data of each of the P 3D map descriptors to obtain the dequantized data of each of the P 3D map descriptors, the stage-j retrieval is performed based on the dequantized data (used as reconstructed data for current-stage retrieval) of each of the P 3D map descriptors, to obtain the Q 3D map descriptors through screening, and dequantization is performed on the quantized data of each of the Q 3D map descriptors to obtain the Q dequantized data, obtaining the reconstructed data of each of the Q 3D map descriptors based on the Q dequantized data and the binary data of the Q 3D map descriptors, and the stage-r retrieval is performed based on the reconstructed data of each of the Q 3D map descriptors, to obtain the N 3D map descriptors. A distortion of the reconstructed data for the stage-j retrieval is greater than a distortion of the reconstructed data for the stage-r retrieval. That is, rough retrieval is performed first, to improve a retrieval speed, and then refined retrieval is performed, to improve retrieval accuracy.

In a possible design, when N=Q, compressed data of the P 3D map descriptors includes binary data and quantized data of each of the P 3D map descriptors, and the performing stage-m decompression on compressed data of the P 3D map descriptors to obtain reconstructed data of the P 3D map descriptors includes: performing dequantization on the quantized data of each of the P 3D map descriptors to obtain P pieces of dequantized data; and obtaining reconstructed data of each of the P 3D map descriptors based on the P pieces of dequantized data and the binary data of each of the P 3D map descriptors.

In this embodiment, the stage-j retrieval may be the last stage in multi-stage retrieval, and retrieval at the last stage is based on reconstructed data obtained through complete decompression, to improve retrieval accuracy.

In a possible design, the S 3D map descriptors are S representative 3D map descriptors, the S representative 3D map descriptors each correspond to at least one data set, each data set of the at least one data set includes at least one 3D map descriptor, and the performing stage-i retrieval in the binary data of the S 3D map descriptors based on binary data of a retrieval descriptor, to obtain P 3D map descriptors includes: performing the stage-i retrieval in binary data of the S representative 3D map descriptors based on the binary data of the retrieval descriptor, to obtain at least one representative 3D map descriptor; and using 3D map descriptors in a data set corresponding to each of the at least one representative 3D map descriptor as the P 3D map descriptors.

3D map descriptors in each data set have a correlation or similarity. The representative 3D map descriptor represents a common or similar feature of 3D map descriptors in a corresponding data set. P may be greater than S, P<T, and S<T.

In this embodiment, one-stage retrieval is performed in fewer representative 3D map descriptors, to improve a retrieval speed. Then, one-stage or multi-stage retrieval may be performed in a data set corresponding to the representative 3D map descriptor, to improve retrieval accuracy. This can improve a retrieval speed and ensure retrieval accuracy when compared with retrieval in reconstructed data of the 3D map obtained through complete decompression.

In a possible design, Q<P<S<T. That is, a quantity of 3D map descriptors in multi-stage retrieval decreases stage by stage.

In a possible design, the method may further include: determining a magnitude relationship between each component of the retrieval descriptor and a corresponding component of a preset threshold vector based on each component of the retrieval descriptor and the corresponding component of the preset threshold vector; and performing binarization on the magnitude relationship to obtain the binary data of the retrieval descriptor.

In a possible design, the determining a magnitude relationship between each component of the retrieval descriptor and a corresponding component of a preset threshold vector based on each component of the retrieval descriptor and the corresponding component of the preset threshold vector includes: subtracting the corresponding component of the preset threshold vector from each component of the retrieval descriptor, to obtain a difference value for each component; and determining a symbol of each component based on the difference value for each component. The performing binarization on the magnitude relationship to obtain the binary data of the retrieval descriptor includes: performing binarization on the symbol of each component to obtain the binary data of the retrieval descriptor.

According to a second aspect, an embodiment of this application provides a method for retrieving a 3D map. The method may include: extracting first binary data of S 3D map descriptors from compressed data of the S 3D map descriptors, where the S 3D map descriptors correspond to a plurality of 3D map points of a 3D map; performing stage-i retrieval in the first binary data of the S 3D map descriptors based on first binary data of a retrieval descriptor, to obtain P 3D map descriptors, where the retrieval descriptor is a feature that corresponds to a real environment and that is extracted from visual information collected by a sensor of an electronic device; extracting second binary data of the P 3D map descriptors from compressed data of the P 3D map descriptors; and performing stage-j retrieval in the second binary data of the P 3D map descriptors based on second binary data of the retrieval descriptor, to obtain Q 3D map descriptors, where S, P, Q, i, and j are positive integers, $0<Q<P$, $0<P<T$, $0<S\leq T$, T represents a total quantity of 3D map descriptors in the 3D map, $j=i+1$, $1\leq i<L$, $1<j\leq L$, L represents a total quantity of retrieval stages of the 3D map or a retrieval stage quantity threshold, and L is a positive integer greater than 1.

It can be learned that, in this embodiment, the first binary data of the S 3D map descriptors is extracted from the compressed data of the S 3D map descriptors, and the stage-i retrieval is performed in the first binary data of the S 3D map descriptors based on the first binary data of the retrieval descriptor, to obtain the P 3D map descriptors through screening. The second binary data of the P 3D map descriptors is extracted from the compressed data of the P 3D map descriptors, and the stage-j retrieval is performed in the second binary data of the P 3D map descriptors based on the second binary data of the retrieval descriptor, to obtain fewer 3D map descriptors through screening. Extraction of binary data of 3D map descriptors from the compressed data for one-stage retrieval is performed alternately with the one-stage retrieval, to perform at least two-stage retrieval in the 3D map in a compressed state, so as to obtain retrieved 3D map descriptors. Information content carried in binary data of a 3D map descriptor used by each of any two stages of retrieval is different, or information integrity of binary data of a 3D map descriptor used by each of any two stages of retrieval is different. This can improve a retrieval speed and ensure retrieval accuracy when compared with retrieval in reconstructed data of the 3D map obtained through complete decompression.

The first binary data and the second binary data may be binary data used in any two stages in multi-stage retrieval, and binarization manners or lengths of the binary data and the second binary data may be different.

In a possible design, N 3D map descriptors in the Q 3D map descriptors are used for positioning, 3D map points corresponding to the N 3D map descriptors match a 3D map point corresponding to the retrieval descriptor, N is a positive integer, and $0<N\leq Q$. The method further includes: performing positioning based on the 3D map points corresponding to the N 3D map descriptors, to obtain pose information of the electronic device.

In a possible design, both retrieval manners used for the stage-i retrieval and the stage-j retrieval are retrieval based on a first distance, the P 3D map descriptors belong to the S 3D map descriptors, and a location of first binary data of each 3D map descriptor of the P 3D map descriptors in compressed data of the 3D map descriptor is different from a location of second binary data of the 3D map descriptor in the compressed data of the 3D map descriptor, where P<S. For example, the location may be a start location, or may be an end location or the like.

It can be learned that a retrieval speed and retrieval accuracy are comprehensively improved through differentiated at least two-stage retrieval.

In a possible design, a length of the first binary data of each 3D map descriptor of the P 3D map descriptors is less than a length of the second binary data of each 3D map descriptor of the P 3D map descriptors.

It can be learned that, the length of the first binary data of each 3D map descriptor in the stage-i retrieval is smaller, to improve a retrieval speed, and the length of the second binary data of each 3D map descriptor in the stage-j retrieval is larger, to improve retrieval accuracy. A retrieval speed and retrieval accuracy are comprehensively improved through differentiated at least two-stage retrieval.

In a possible design, the method further includes: receiving the retrieval descriptor, and performing binarization on the retrieval descriptor to obtain the first binary data and the second binary data of the retrieval descriptor. An execution body (which may be an electronic device, or may be a server (for example, a cloud server)) configured to perform the retrieval method in the second aspect may receive the retrieval descriptor sent by another device. For example, an execution body configured to perform the retrieval method in the second aspect receives the retrieval descriptor collected and extracted by another electronic device. Then, binarization is performed on the retrieval descriptor to obtain the first binary data and the second binary data of the retrieval descriptor.

In a possible design, the method further includes: receiving the visual information, extracting the retrieval descriptor from the visual information, and performing binarization on the retrieval descriptor to obtain the first binary data and the second binary data of the retrieval descriptor. An execution body (which may be an electronic device or a server) configured to perform the retrieval method in the second aspect may receive the visual information sent by another device, and extract the retrieval descriptor from the visual information. Then, binarization is performed on the retrieval descriptor to obtain the first binary data and the second binary data of the retrieval descriptor.

In a possible design, the method further includes: in response to a visual information collection operation entered by a user, triggering the sensor to perform visual information collection on the real environment to obtain the visual information, extracting the retrieval descriptor from the visual information, and performing binarization on the retrieval descriptor to obtain the first binary data and the second binary data of the retrieval descriptor. An execution body (which may be an electronic device or a server) configured to perform the retrieval method in the second aspect may collect the visual information, and extract the retrieval descriptor from the visual information. Then, binarization is performed on the retrieval descriptor to obtain the first binary data and the second binary data of the retrieval descriptor.

In a possible design, a length of the first binary data of the retrieval descriptor is equal to a length of the first binary data of each 3D map descriptor of the S 3D map descriptors, and/or a length of the second binary data of the retrieval descriptor is equal to a length of the second binary data of each 3D map descriptor of the S 3D map descriptors.

In this embodiment, a first distance between pieces of binary data with a same length is calculated, to perform retrieval in the 3D map, thereby improving a retrieval speed.

In a possible design, the S 3D map descriptors are S representative 3D map descriptors, the S representative 3D map descriptors each correspond to at least one data set, each data set of the at least one data set includes at least one 3D map descriptor, and the performing stage-i retrieval in the first binary data of the S 3D map descriptors based on first binary data of a retrieval descriptor, to obtain P 3D map descriptors includes: performing the stage-i retrieval in first binary data of the S representative 3D map descriptors based on the first binary data of the retrieval descriptor, to obtain at least one representative 3D map descriptor; and using 3D map descriptors in a data set corresponding to each of the at least one representative 3D map descriptor as the P 3D map descriptors.

In a possible design, Q<P<S<T. That is, a quantity of 3D map descriptors in multi-stage retrieval decreases stage by stage.

According to a third aspect, an embodiment of this application provides a method for retrieving a 3D map. The method may include: performing stage-m decompression on compressed data of S 3D map descriptors to obtain first reconstructed data of the S 3D map descriptors, where the S 3D map descriptors correspond to a plurality of 3D map points of a 3D map; performing stage-i retrieval in the first reconstructed data of the S 3D map descriptors based on partial data or all data of a retrieval descriptor, to obtain P 3D map descriptors, where the retrieval descriptor is a feature that corresponds to a real environment and that is extracted from visual information collected by a sensor of an electronic device; performing stage-k decompression on compressed data of the P 3D map descriptors to obtain second reconstructed data of the P 3D map descriptors, where a decompression process of the compressed data of the S 3D map descriptors includes the stage-m decompression and the stage-k decompression, or a decompression process of the compressed data of the S 3D map descriptors includes the stage-k decompression and the stage-k decompression includes the stage-m decompression; and performing stage-j retrieval in the second reconstructed data of the P 3D map descriptors based on partial data or all data of the retrieval descriptor, to obtain Q 3D map descriptors, where S, P, Q, i, j, k, and m are positive integers, 0<Q<P, 0<P<T, 0<S≤T, T represents a total quantity of 3D map descriptors in the 3D map, j=i+1, 1≤i<L, 1<j≤L, L represents a total quantity of retrieval stages of the 3D map or a retrieval stage quantity threshold, and L is a positive integer greater than 1.

It can be learned that, in this embodiment, the stage-m decompression is performed on the compressed data of the S 3D map descriptors to obtain the first reconstructed data of the S 3D map descriptors, and the stage-i retrieval is performed in the first reconstructed data of the S 3D map descriptors based on partial data or all data of the retrieval descriptor, to obtain the P 3D map descriptors through screening. The stage-k decompression is performed on the compressed data of the P 3D map descriptors to obtain the second reconstructed data of the P 3D map descriptors, and the stage-j retrieval is performed in the second reconstructed data of the P 3D map descriptors based on partial data or all data of the retrieval descriptor, to obtain fewer 3D map descriptors through screening. Decompression to obtain reconstructed data of 3D map descriptors for one-stage retrieval is performed alternately with the one-stage retrieval. In at least two stages of retrieval, one stage of retrieval is staged decompression, to improve a retrieval speed. A differentiated decompression setting for the at least two stages of retrieval can ensure retrieval accuracy. Reconstructed data of 3D map descriptors used by any two stages of retrieval has different decompression degrees or distortions. This can improve a retrieval speed and ensure retrieval accuracy when compared with retrieval in reconstructed data of the 3D map obtained through complete decompression.

In a possible design, N 3D map descriptors in the Q 3D map descriptors are used for positioning, 3D map points corresponding to the N 3D map descriptors match a 3D map point corresponding to the retrieval descriptor, N is a positive integer, and 0<N<Q. The method further includes: performing positioning based on the 3D map points corresponding to the N 3D map descriptors, to obtain pose information of the electronic device.

In this embodiment, when the 3D map points corresponding to the N 3D map descriptors obtained through retrieval match the map point corresponding to the retrieval descriptor, positioning may be performed based on the 3D map points corresponding to the N 3D map descriptors. This helps improve positioning performance.

In a possible design, both retrieval manners used for the stage-i retrieval and the stage-j retrieval are retrieval manners based on a second distance, the P 3D map descriptors belong to the S 3D map descriptors, and a distortion of first reconstructed data of each 3D map descriptor of the P 3D map descriptors is different from a distortion of second reconstructed data of each 3D map descriptor of the P 3D map descriptors. The distortion of the first reconstructed data of each 3D map descriptor of the P 3D map descriptors indicates a degree of a difference between the first reconstructed data of each 3D map descriptor and a corresponding original 3D map descriptor, the distortion of the second reconstructed data of each 3D map descriptor of the P 3D map descriptors indicates a degree of a difference between the second reconstructed data of each 3D map descriptor and a corresponding original 3D map descriptor, where P<S.

It can be learned that a retrieval speed and retrieval accuracy are comprehensively improved through differentiated at least two-stage retrieval.

In a possible design, the distortion of the first reconstructed data of each 3D map descriptor of the P 3D map descriptors is greater than the distortion of the second reconstructed data of each 3D map descriptor of the P 3D map descriptors.

It can be learned that, the distortion of the first reconstructed data of each 3D map descriptor in the stage-i retrieval may be greater than the distortion of the second reconstructed data of each 3D map descriptor of the P 3D map descriptors. In two successive stages of retrieval, a distortion of a previous stage retrieval is greater than a distortion of a next stage of retrieval, to implement fast retrieval in the previous stage retrieval so as to improve a retrieval speed, and to implement refined retrieval in the next stage of retrieval so as to improve retrieval accuracy.

In a possible design, the method further includes: receiving the retrieval descriptor, and obtaining partial data or all data of the retrieval descriptor. An execution body (which may be an electronic device, or may be a server (for example, a cloud server)) configured to perform the retrieval method in the third aspect may receive the retrieval descriptor sent by another device. For example, an execution body configured to perform the retrieval method in the third aspect receives the retrieval descriptor collected and extracted by another electronic device. Then, partial data or full data of the retrieval descriptor is obtained according to a retrieval requirement.

In a possible design, the method further includes: receiving the visual information, extracting the retrieval descriptor from the visual information, and obtaining partial data or all data of the retrieval descriptor. An execution body (which may be an electronic device or a server) configured to perform the retrieval method in the third aspect may receive the visual information sent by another device, and extract the retrieval descriptor from the visual information. Then, partial data or full data of the retrieval descriptor is obtained according to a retrieval requirement.

In a possible design, the method further includes: in response to a visual information collection operation entered by a user, triggering the sensor to perform visual information collection on the real environment to obtain the visual information, extracting the retrieval descriptor from the visual information, and obtaining partial data or all data of the retrieval descriptor. An execution body (which may be an electronic device or a server) configured to perform the retrieval method in the third aspect may collect the visual information, and extract the retrieval descriptor from the visual information. Then, partial data or full data of the retrieval descriptor is obtained according to a retrieval requirement.

According to the method for retrieving a 3D map in this embodiment of this application, retrieval may be performed in the 3D map based on retrieval descriptors in different application scenarios, which is widely applicable.

In a possible design, the S 3D map descriptors are S representative 3D map descriptors, the S representative 3D map descriptors each correspond to at least one data set, each data set of the at least one data set includes at least one 3D map descriptor, and the performing stage-i retrieval in the first reconstructed data of the S 3D map descriptors based on partial data or all data of a retrieval descriptor, to obtain P 3D map descriptors includes: performing the stage-i retrieval in first reconstructed data of the S representative 3D map descriptors based on partial data or all data of the retrieval descriptor, to obtain at least one representative 3D map descriptor; and using 3D map descriptors in a data set corresponding to each of the at least one representative 3D map descriptor as the P 3D map descriptors.

3D map descriptors in each data set have a correlation or similarity. The representative 3D map descriptor represents a common or similar feature of 3D map descriptors in a corresponding data set. P may be greater than S, P<T, and S<T.

In this embodiment, one-stage retrieval is performed in fewer representative 3D map descriptors, to improve a retrieval speed. Then, one-stage or multi-stage retrieval may be performed in a data set corresponding to the representative 3D map descriptor, to improve retrieval accuracy. This can improve a retrieval speed and ensure retrieval accuracy when compared with retrieval in reconstructed data of the 3D map obtained through complete decompression.

In a possible design, Q<P<S<T. That is, a quantity of 3D map descriptors in multi-stage retrieval decreases stage by stage.

According to a fourth aspect, an embodiment of this application provides a method for retrieving a 3D map. The method may include: performing stage-m decompression on compressed data of S 3D map descriptors to obtain reconstructed data of the S 3D map descriptors, where the S 3D map descriptors correspond to a plurality of 3D map points of a 3D map; performing stage-i retrieval in the reconstructed data of the S 3D map descriptors based on partial data or all data of a retrieval descriptor, to obtain P 3D map descriptors, where the retrieval descriptor is a feature that corresponds to a real environment and that is extracted from visual information collected by a sensor of an electronic device; extracting binary data of the P 3D map descriptors from compressed data of the P 3D map descriptors; and performing stage-j retrieval in the binary data of the P 3D map descriptors based on binary data of the retrieval descriptor, to obtain Q 3D map descriptors, where S, P, Q, i, m, and j are positive integers, $0<Q<P$, $0<P<T$, $0<S\leq T$, T represents a total quantity of 3D map descriptors in the 3D map, $j=i+1$, $1\leq i<L$, $1<j\leq L$, L represents a total quantity of retrieval stages of the 3D map or a retrieval stage quantity threshold, and L is a positive integer greater than 1.

It can be learned that, in this embodiment, one stage of retrieval in at least two stages of retrieval is decompression, to improve retrieval accuracy, and one stage of retrieval in the at least two stages of retrieval is extraction from compressed data, to improve a retrieval speed. Compared with retrieval in the reconstructed data, obtained through complete decompression, of the 3D map, the method for retrieving a 3D map provided in this embodiment of this application can improve a retrieval speed and ensure retrieval accuracy.

In a possible design, N 3D map descriptors in the Q 3D map descriptors are used for positioning, 3D map points corresponding to the N 3D map descriptors match a 3D map point corresponding to the retrieval descriptor, N is a positive integer, and $0<N<Q$. The method further includes: performing positioning based on the 3D map points corresponding to the N 3D map descriptors, to obtain pose information of the electronic device.

In a possible design, a retrieval manner used for the stage-i retrieval is a retrieval manner based on a second distance, and a retrieval manner used for the stage-j retrieval is a retrieval manner based on a first distance.

In this embodiment, the retrieval manner based on the second distance can improve retrieval accuracy, and the retrieval manner based on the first distance can improve a retrieval speed, thereby comprehensively improving retrieval accuracy and a retrieval speed.

In a possible design, the method further includes: receiving the retrieval descriptor, and performing binarization on the retrieval descriptor to obtain the binary data of the retrieval descriptor. An execution body (which may be an electronic device or a server (for example, a cloud server)) configured to perform the retrieval method in the fourth aspect may receive the retrieval descriptor sent by another device. For example, an execution body configured to perform the retrieval method in the first aspect receives the retrieval descriptor collected and extracted by another electronic device. Then, binarization is performed on the retrieval descriptor to obtain the binary data of the retrieval descriptor.

In a possible design, the method further includes: receiving the visual information, extracting the retrieval descriptor from the visual information, and performing binarization on the retrieval descriptor to obtain the binary data of the retrieval descriptor. An execution body (which may be an electronic device or a server) configured to perform the retrieval method in the fourth aspect may receive the visual information sent by another device, and extract the retrieval descriptor from the visual information. Then, binarization is performed on the retrieval descriptor to obtain the binary data of the retrieval descriptor.

In a possible design, the method further includes: in response to a visual information collection operation entered by a user, triggering the sensor to perform visual information collection on the real environment to obtain the visual information, extracting the retrieval descriptor from the visual information, and performing binarization on the retrieval descriptor to obtain the binary data of the retrieval descriptor. An execution body (which may be an electronic device or a server) configured to perform the retrieval method in the fourth aspect may receive the visual information sent by another device, and extract the retrieval descriptor from the visual information. Then, binarization is performed on the retrieval descriptor to obtain the binary data of the retrieval descriptor.

In a possible design, the S 3D map descriptors are S representative 3D map descriptors, the S representative 3D map descriptors each correspond to at least one data set, each data set of the at least one data set includes at least one 3D map descriptor, and the performing stage-i retrieval in the reconstructed data of the S 3D map descriptors based on partial data or all data of a retrieval descriptor, to obtain P 3D map descriptors includes: performing the stage-i retrieval in reconstructed data of the S representative 3D map descriptors based on partial data or all data of the retrieval descriptor, to obtain at least one representative 3D map descriptor; and using 3D map descriptors in a data set corresponding to each of the at least one representative 3D map descriptor as the P 3D map descriptors.

3D map descriptors in each data set have a correlation or similarity. The representative 3D map descriptor represents a common or similar feature of 3D map descriptors in a corresponding data set. P may be greater than S, $P<T$, and $S<T$.

In this embodiment, one-stage retrieval is performed in fewer representative 3D map descriptors, to improve a retrieval speed. Then, one-stage or multi-stage retrieval may be performed in a data set corresponding to the representative 3D map descriptor, to improve retrieval accuracy. This can improve a retrieval speed and ensure retrieval accuracy when compared with retrieval in reconstructed data of the 3D map obtained through complete decompression.

In a possible design, $Q<P<S<T$. That is, a quantity of 3D map descriptors in multi-stage retrieval decreases stage by stage.

With reference to the first aspect or any possible design of the first aspect, or with reference to the second aspect or any possible design of the second aspect, or with reference to the third aspect or any possible design of the third aspect, or with reference to the fourth aspect or any possible design of the fourth aspect, the following possible design further exists:

In a possible design, the retrieval descriptor includes an area descriptor or a 3D map point descriptor. Correspondingly, the S 3D map descriptors may include S area descriptors or S 3D map point descriptors.

According to a fifth aspect, an embodiment of this application provides an apparatus for retrieving a 3D map. The apparatus may be a chip or a system-on-chip in an electronic device or a server, or may be a functional module that is in the electronic device or the server and that is configured to implement the method according to the first aspect or any possible implementation of the first aspect. For example, the apparatus for retrieving a 3D map includes: a retrieval module, an extraction module, and a decompression module.

In a possible design, the extraction module is configured to extract binary data of S 3D map descriptors from compressed data of the S 3D map descriptors, where the S 3D map descriptors correspond to a plurality of 3D map points of a 3D map. The retrieval module is configured to perform stage-i retrieval in the binary data of the S 3D map descriptors based on binary data of a retrieval descriptor, to obtain P 3D map descriptors, where the retrieval descriptor is a feature that corresponds to a real environment and that is extracted from visual information collected by a sensor of an electronic device. The decompression module is configured to perform stage-m decompression on the compressed data of the P 3D map descriptors to obtain reconstructed data of the P 3D map descriptors, where a decompression process of the compressed data of the P 3D map descriptors includes at least the stage-m decompression. The retrieval module is configured to perform stage-j retrieval in the reconstructed data of the P 3D map descriptors based on partial data or all data of the retrieval descriptor, to obtain Q 3D map descriptors, where S, P, Q, i, j, and m are positive integers, $0<Q<P$, $0<P<T$, $0<S\leq T$, T represents a total quantity of 3D map descriptors in the 3D map, $j=i+1$, $1\leq i<L$, $1<j\leq L$, L represents a total quantity of retrieval stages of the 3D map or a retrieval stage quantity threshold, and L is a positive integer greater than 1.

In a possible design, N 3D map descriptors in the Q 3D map descriptors are used for positioning, 3D map points corresponding to the N 3D map descriptors match a 3D map point corresponding to the retrieval descriptor, N is a positive integer, $0<N<Q$, and the apparatus further includes a pose determining module. The pose determining module performs positioning based on the 3D map points corresponding to the N 3D map descriptors, to obtain pose information of the electronic device.

In a possible design, a retrieval manner used for the stage-i retrieval is a retrieval manner based on a first distance, and a retrieval manner used for the stage-j retrieval is a retrieval manner based on a second distance.

In a possible design, the apparatus further includes an obtaining module, configured to: receive the retrieval descriptor, and perform binarization on the retrieval descriptor to obtain the binary data of the retrieval descriptor; or receive the visual information, extract the retrieval descriptor from the visual information, and perform binarization on the retrieval descriptor to obtain the binary data of the retrieval descriptor; or in response to a visual information collection operation entered by a user, trigger the sensor to perform visual information collection on the real environment to obtain the visual information, extract the retrieval descriptor from the visual information, and perform binarization on the retrieval descriptor to obtain the binary data of the retrieval descriptor.

In a possible design, when $N<Q$, the decompression module is further configured to: perform stage-k decompression on compressed data of the Q 3D map descriptors to obtain reconstructed data of the Q 3D map descriptors; and perform stage-r retrieval in the reconstructed data of the Q 3D map descriptors based on partial data or all data of the retrieval descriptor, to obtain the N 3D map descriptors, where $N<Q<P$, and the decompression process of the compressed data of the P 3D map descriptors includes the stage-m decompression and the stage-k decompression, where r and k are positive integers, $m<k$, and $j<r\leq L$.

In a possible design, the compressed data of the P 3D map descriptors includes binary data and quantized data of each of the P 3D map descriptors, and the decompression module is configured to: perform dequantization on the quantized data of each of the P 3D map descriptors to obtain P pieces of dequantized data, where the P pieces of dequantized data are used as the reconstructed data of the P 3D map descriptors; perform dequantization on quantized data of each of the Q 3D map descriptors to obtain Q pieces of dequantized data; and obtain reconstructed data of each of the Q 3D map descriptors based on the Q pieces of dequantized data and binary data of each of the Q 3D map descriptors.

In a possible design, when $N=Q$, compressed data of the P 3D map descriptors includes binary data and quantized data of each of the P 3D map descriptors, and the decompression module is configured to: perform dequantization on the quantized data of each of the P 3D map descriptors to obtain P pieces of dequantized data; and obtain reconstructed data of each of the P 3D map descriptors based on the P pieces of dequantized data and the binary data of each of the P 3D map descriptors.

In a possible design, the S 3D map descriptors are S representative 3D map descriptors, the S representative 3D map descriptors each correspond to at least one data set, each data set of the at least one data set includes at least one 3D map descriptor, and the retrieval module is configured to: perform stage-i retrieval in binary data of the S representative 3D map descriptors based on the binary data of the retrieval descriptor, to obtain at least one representative 3D map descriptor; and use a 3D map descriptor in a data set corresponding to each of the at least one representative 3D map descriptor as the P 3D map descriptors.

According to a sixth aspect, an embodiment of this application provides an apparatus for retrieving a 3D map. The apparatus may be a chip or a system-on-chip in an electronic device or a server, or may be a functional module that is in the electronic device or the server and that is configured to implement the method according to the first aspect or any possible implementation of the first aspect. For example, the apparatus for retrieving a 3D map includes: a retrieval module, an extraction module, and a decompression module.

In a possible design, the extraction module is configured to extract first binary data of S 3D map descriptors from compressed data of the S 3D map descriptors, where the S 3D map descriptors correspond to a plurality of 3D map points of a 3D map. The retrieval module is configured to perform stage-i retrieval in the first binary data of the S 3D map descriptors based on first binary data of a retrieval descriptor, to obtain P 3D map descriptors, where the retrieval descriptor is a feature that corresponds to a real environment and that is extracted from visual information collected by a sensor of an electronic device. The extraction module is further configured to extract second binary data of the P 3D map descriptors from the compressed data of the P 3D map descriptors. The retrieval module is configured to perform stage-j retrieval in the second binary data of the P 3D map descriptors based on second binary data of the retrieval descriptor, to obtain Q 3D map descriptors, where S, P, Q, i, and j are positive integers, $0<Q<P$, $0<P<T$, $0<S\leq T$, T represents a total quantity of 3D map descriptors in the 3D map, $j=i+1$, $1\leq i<L$, $1<j\leq L$, L represents a total quantity of retrieval stages of the 3D map or a retrieval stage quantity threshold, and L is a positive integer greater than 1.

In a possible design, N 3D map descriptors in the Q 3D map descriptors are used for positioning, 3D map points corresponding to the N 3D map descriptors match a 3D map point corresponding to the retrieval descriptor, N is a positive integer, $0<N<Q$, and the apparatus further includes a pose determining module. The pose determining module is configured to perform positioning based on the 3D map points corresponding to the N 3D map descriptors, to obtain pose information of the electronic device.

In a possible design, both retrieval manners used for the stage-i retrieval and the stage-j retrieval are retrieval based on a first distance, the P 3D map descriptors belong to the S 3D map descriptors, and a location of first binary data of each 3D map descriptor of the P 3D map descriptors in compressed data of the 3D map descriptor is different from a location of second binary data of the 3D map descriptor in the compressed data of the 3D map descriptor, where $P<S$.

In a possible design, a length of the first binary data of each 3D map descriptor of the P 3D map descriptors is less than a length of the second binary data of each 3D map descriptor of the P 3D map descriptors.

In a possible design, the apparatus further includes an obtaining module, configured to: receive the retrieval descriptor, and perform binarization on the retrieval descriptor to obtain the first binary data and the second binary data of the retrieval descriptor; or receive the visual information, extract the retrieval descriptor from the visual information, and perform binarization on the retrieval descriptor to obtain the first binary data and the second binary data of the retrieval descriptor; or in response to a visual information collection operation entered by a user, trigger the sensor to perform visual information collection on the real environment to obtain the visual information, extract the retrieval descriptor from the visual information, and perform binarization on the retrieval descriptor to obtain the first binary data and the second binary data of the retrieval descriptor.

In a possible design, a length of the first binary data of the retrieval descriptor is equal to a length of the first binary data of each 3D map descriptor of the S 3D map descriptors, and/or a length of the second binary data of the retrieval descriptor is equal to a length of the second binary data of each 3D map descriptor of the S 3D map descriptors.

In a possible design, the S 3D map descriptors are S representative 3D map descriptors, the S representative 3D map descriptors each correspond to at least one data set, each data set of the at least one data set includes at least one 3D map descriptor, and the retrieval module is configured to: perform stage-i retrieval in first binary data of the S representative 3D map descriptors based on the first binary data of the retrieval descriptor, to obtain at least one representative 3D map descriptor; and use a 3D map descriptor in a data set corresponding to each of the at least one representative 3D map descriptor as the P 3D map descriptors.

According to a seventh aspect, an embodiment of this application provides an apparatus for retrieving a 3D map. The apparatus may be a chip or a system-on-chip in an electronic device or a server, or may be a functional module that is in the electronic device or the server and that is configured to implement the method according to the first aspect or any possible implementation of the first aspect. For example, the apparatus for retrieving a 3D map includes: a retrieval module, an extraction module, and a decompression module.

In a possible design, the decompression module is configured to perform stage-m decompression on compressed data of S 3D map descriptors to obtain first reconstructed data of the S 3D map descriptors, where the S 3D map descriptors correspond to a plurality of 3D map points of a 3D map. The retrieval module is configured to perform stage-i retrieval in first reconstructed data of the S 3D map descriptors based on partial data or all data of a retrieval descriptor, to obtain P 3D map descriptors, where the retrieval descriptor is a feature that corresponds to a real environment and that is extracted from visual information collected by a sensor of an electronic device. The decompression module is further configured to perform stage-k decompression on compressed data of the P 3D map descriptors to obtain second reconstructed data of the P 3D map descriptors, where a decompression process of the compressed data of the S 3D map descriptors includes the stage-m decompression and the stage-k decompression, or a decompression process of the compressed data of the S 3D map descriptors includes the stage-k decompression and the stage-k decompression includes the stage-m decompression.

The retrieval module is configured to perform stage-j retrieval in the second reconstructed data of the P 3D map descriptors based on a part or all of the retrieval descriptor, to obtain Q 3D map descriptors, where S, P, Q, i, j, k, and m are positive integers, $0<Q<P$, $0<P<T$, $0<S\leq T$, T represents a total quantity of 3D map descriptors in the 3D map, $j=i+1$, $1\leq i<L$, $1<j\leq L$, L represents a total quantity of retrieval stages of the 3D map or a retrieval stage quantity threshold, and L is a positive integer greater than 1.

In a possible design, N 3D map descriptors in the Q 3D map descriptors are used for positioning, 3D map points corresponding to the N 3D map descriptors match a 3D map point corresponding to the retrieval descriptor, N is a positive integer, $0<N<Q$, and the apparatus further includes a pose determining module. The pose determining module is configured to perform positioning based on the 3D map points corresponding to the N 3D map descriptors, to obtain pose information of the electronic device.

In a possible design, both retrieval manners used for the stage-i retrieval and the stage-j retrieval are retrieval manners based on a second distance, the P 3D map descriptors belong to the S 3D map descriptors, and a distortion of first reconstructed data of each 3D map descriptor of the P 3D map descriptors is different from a distortion of second reconstructed data of each 3D map descriptor of the P 3D map descriptors. The distortion of the first reconstructed data of each 3D map descriptor of the P 3D map descriptors indicates a degree of a difference between the first reconstructed data of each 3D map descriptor and a corresponding original 3D map descriptor, the distortion of the second reconstructed data of each 3D map descriptor of the P 3D map descriptors indicates a degree of a difference between the second reconstructed data of each 3D map descriptor and a corresponding original 3D map descriptor, where $P<S$.

In a possible design, the distortion of the first reconstructed data of each 3D map descriptor of the P 3D map descriptors is greater than the distortion of the second reconstructed data of each 3D map descriptor of the P 3D map descriptors.

In a possible design, the apparatus further includes an obtaining module, configured to: receive the retrieval descriptor, and obtain partial data or all data of the retrieval descriptor; or receive the visual information, extract the retrieval descriptor from the visual information, and obtain partial data or all data of the retrieval descriptor; or in response to a visual information collection operation entered by a user, trigger the sensor to perform visual information collection on the real environment to obtain the visual information, extract the retrieval descriptor from the visual information, and obtain partial data or all data of the retrieval descriptor.

In a possible design, the S 3D map descriptors are S representative 3D map descriptors, the S representative 3D map descriptors each correspond to at least one data set, each data set of the at least one data set includes at least one 3D map descriptor, and the retrieval module is configured to: perform stage-i retrieval in $m^{th}$ reconstructed data of the S representative 3D map descriptors based on partial data or all data of the retrieval descriptor, to obtain at least one representative 3D map descriptor; and use a 3D map descriptor in a data set corresponding to each of the at least one representative 3D map descriptor as the P 3D map descriptors.

According to an eighth aspect, an embodiment of this application provides an apparatus for retrieving a 3D map. The apparatus may be a chip or a system-on-chip in an electronic device or a server, or may be a functional module that is in the electronic device or the server and that is configured to implement the method according to the first aspect or any possible implementation of the first aspect. For example, the apparatus for retrieving a 3D map includes: a retrieval module, an extraction module, and a decompression module.

In a possible design, the decompression module is configured to perform stage-m decompression on compressed data of S 3D map descriptors to obtain reconstructed data of the S 3D map descriptors, where the S 3D map descriptors correspond to a plurality of 3D map points of a 3D map. The retrieval module is configured to perform stage-i retrieval in the reconstructed data of the S 3D map descriptors based on partial data or all data of a retrieval descriptor, to obtain P 3D map descriptors, where the retrieval descriptor is a feature that corresponds to a real environment and that is extracted from visual information collected by a sensor of an electronic device. The extraction module is configured to extract binary data of the P descriptors from compressed data of the P 3D map descriptors. The retrieval module is further configured to perform stage-j retrieval in the binary data of the P 3D map descriptors based on binary data of the retrieval descriptor, to obtain Q 3D map descriptors, where S, P, Q, i, m, and j are positive integers, $0<Q<P$, $0<P<T$, $0<S\leq T$, T represents a total quantity of 3D map descriptors in the 3D map, $j=i+1$, $1\leq i<L$, $1<j\leq L$, L represents a total quantity of retrieval stages of the 3D map or a retrieval stage quantity threshold, and L is a positive integer greater than 1.

In a possible design, N 3D map descriptors in the Q 3D map descriptors are used for positioning, 3D map points corresponding to the N 3D map descriptors match a 3D map point corresponding to the retrieval descriptor, N is a positive integer, $0<N<Q$, and the apparatus further includes a pose determining module. The pose determining module is configured to perform positioning based on the 3D map points corresponding to the N 3D map descriptors, to obtain pose information of the electronic device.

In a possible design, a retrieval manner used for the stage-i retrieval is a retrieval manner based on a second distance, and a retrieval manner used for the stage-j retrieval is a retrieval manner based on a first distance.

In a possible design, the apparatus further includes an obtaining module, configured to: receive the retrieval descriptor, and perform binarization on the retrieval descriptor to obtain the binary data of the retrieval descriptor; or receive the visual information, extract the retrieval descriptor from the visual information, and perform binarization on the retrieval descriptor to obtain the binary data of the retrieval descriptor; or in response to a visual information collection operation entered by a user, trigger the sensor to perform visual information collection on the real environment to obtain the visual information, extract the retrieval descriptor from the visual information, and perform binarization on the retrieval descriptor to obtain the binary data of the retrieval descriptor.

In a possible design, the S 3D map descriptors are S representative 3D map descriptors, the S representative 3D map descriptors each correspond to at least one data set, each data set of the at least one data set includes at least one 3D map descriptor, and the retrieval module is configured to: perform stage-i retrieval in $m^{th}$ reconstructed data of the S representative 3D map descriptors based on partial data or all data of the retrieval descriptor, to obtain at least one representative 3D map descriptor; and use a 3D map descriptor in a data set corresponding to each of the at least one representative 3D map descriptor as the P 3D map descriptors.

According to a ninth aspect, an embodiment of this application provides an apparatus for retrieving a 3D map, including: one or more processors; and a memory, configured to store one or more programs. When the one or more programs are executed by the one or more processors, the one or more processors are enabled to implement the method according to any one of the first to the fourth aspects or any possible design of the first to the fourth aspects.

According to a tenth aspect, an embodiment of this application provides a computer-readable storage medium, including a computer program. When the computer program is executed on a computer, the computer is enabled to perform the method according to any one of the first to the fourth aspects or any possible design of the first to the fourth aspects.

According to an eleventh aspect, an embodiment of this application provides a computer program or a computer program product. When the computer program or the computer program product is executed on a computer, the computer is enabled to implement the method described in any one of the first to the fourth aspects or any possible implementation of the first to the fourth aspects.

It should be understood that the technical solutions in the fifth aspect to the eleventh aspect of embodiments of this application are consistent with the technical solutions in the first aspect to the fourth aspect of embodiments of this application. Beneficial effects achieved in the aspects and the corresponding feasible implementations are similar thereto, and details are not described again.

BRIEF DESCRIPTION OF DRAWINGS

FIG. 5A to FIG. 5D are schematic flowcharts of segments of a method for retrieving a 3D map according to an embodiment of this application;

FIG. 6 is a schematic flowchart of a method for retrieving a 3D map according to an embodiment of this application;

FIG. 8 is a schematic flowchart of a method for retrieving a 3D map according to an embodiment of this application;

DESCRIPTION OF EMBODIMENTS

Figure 1:
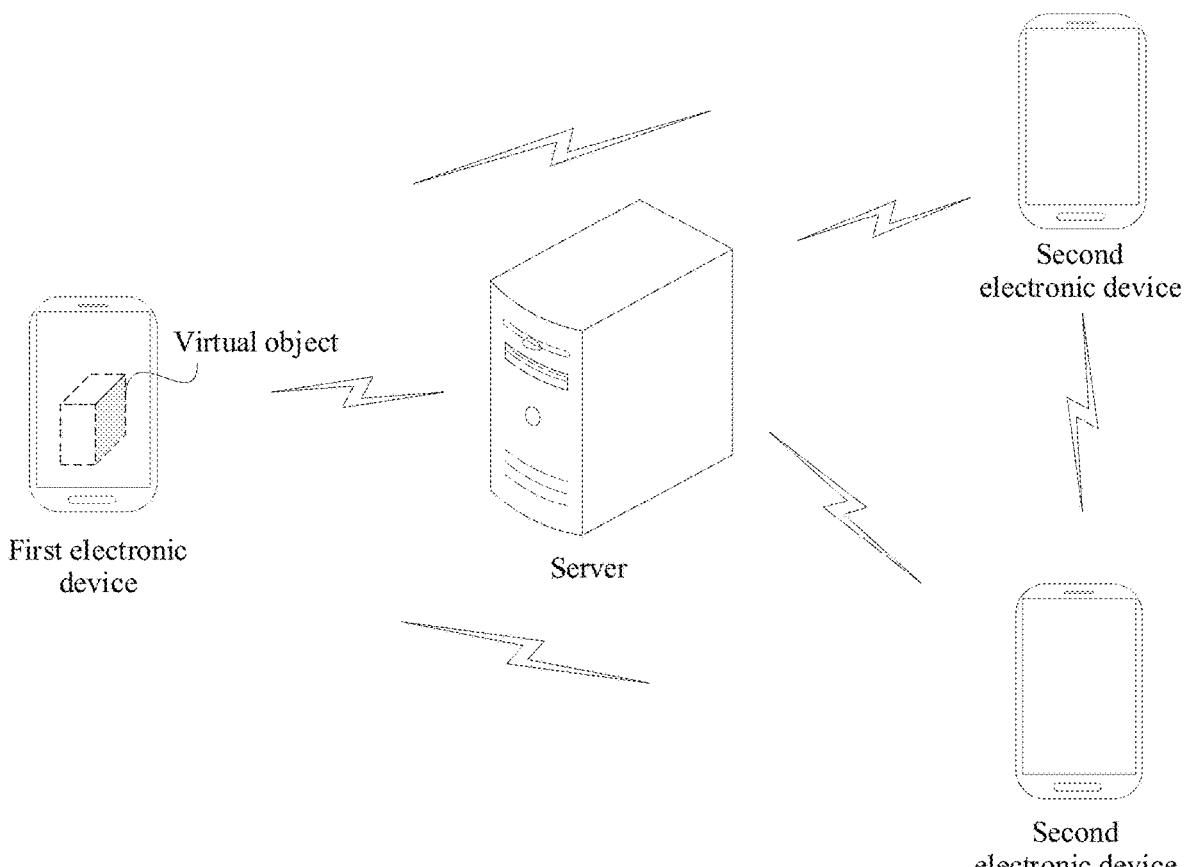
FIG. 1 is a schematic diagram of an application architecture according to an embodiment of this application.

The following describes embodiments of this application with reference to the accompanying drawings in embodiments of this application. Terms used in embodiments of this application are merely used to explain exemplary embodiments of this application, but are not intended to limit this application.

In embodiments of the specification, claims, and the accompanying drawings of this application, the terms "first", "second", and the like are merely intended for distinguishing and description, and shall not be understood as an indication or implication of relative importance or an indication or implication of an order. In addition, the terms "include", "have", and any variant thereof are intended to cover non-exclusive inclusion, for example, inclusion of a series of steps or units. A method, a system, a product, or a device is not necessarily limited to clearly listed steps or units, but may include other steps or units that are not clearly listed and that are inherent to the process, the method, the product, or the device.

It should be understood that, in this application, "at least one (item)" is one or more, and "a plurality of" is two or more. The term "and/or" describes an association relationship of associated objects, and indicates that three relationships may exist. For example, "A and/or B" may indicate the following three cases: Only A exists, only B exists, and both A and B exist. A and B may be singular or plural. The character "/" usually indicates an "or" relationship between associated objects. "At least one of the following items" or a similar expression thereto indicates any combination of the items, including one of the items or any combination of a plurality of the items. For example, at least one of a, b, or c may indicate a, b, c, a and b, a and c, b and c, or a, b, and c, where a, b, and c may be singular or plural.

In embodiments of this application, the term such as "example" or "for example" is used to represent giving an example, an illustration, or a description. Any embodiment or design described by "example" or "for example" in embodiments of this application shall not be construed as being more preferred or advantageous than another embodiment or design. To be precise, the term such as "example" or "for example" is intended to present a relative concept in a specific manner.

The terms "a", "said", and "the" in singular forms used in embodiments and the appended claims of this application are also intended to include plural forms, unless otherwise specified in the context clearly. It should be further understood that, the term "and/or" used herein indicates and includes any or all possible combinations of one or more associated listed items. As used herein, the meaning of "a", "some", and "the" in singular forms also includes plural forms, unless otherwise expressly indicated in the context. It should be further understood that the terms "include", "have", "comprise", and/or "include" are used in this specification to specify the existence of the stated features, integers, steps, operations, elements, and/or components, but do not exclude the existence or addition of one or more other features, integers, steps, operations, elements, components, and/or groups thereof.

It should be noted that the terms used in embodiments of this application are merely for the purpose of illustrating exemplary embodiments, and are not intended to limit this application.

FIG. 1 is a schematic diagram of an application architecture according to an embodiment of this application. As shown in FIG. 1, the application architecture includes a plurality of electronic devices and a server. The plurality of electronic devices may include a first electronic device and one or more second electronic devices (two second electronic devices are used as an example in FIG. 1). The one or more second electronic devices are several electronic devices other than the first electronic device. Communication may be performed between the plurality of electronic devices and the server and between the plurality of electronic devices. For example, any device in the application architecture may communicate with another device in a manner such as wireless fidelity (Wi-Fi) communication, Bluetooth communication, or cellular 2nd/3rd/4th/5th generation (2G/3G/4G/5G) communication. It should be understood that another communication manner, including a future communication manner, may be further used between the server and the electronic device. This is not specifically limited herein. It should be noted that "one or more second electronic devices" in this embodiment of this application is merely used to represent an electronic device other than the first electronic device, but whether types of the plurality of electronic devices are the same is not limited.

The electronic devices may be various types of devices provided with cameras and display components. For example, the electronic device may be a terminal device such as a mobile phone, a tablet computer, a notebook computer, or a video recorder (a mobile phone is used as an example of the electronic device in FIG. 1). Alternatively, the electronic device may be a device used for interaction in a virtual scenario, including VR glasses, an AR device, an MR interaction device, or the like. Alternatively, the electronic device may be a wearable electronic device such as a smartwatch or a smart band. Alternatively, the electronic device may be a device carried in a carrying device such as a vehicle, an uncrewed vehicle, an uncrewed aerial vehicle, or an industrial robot. A specific form of the electronic device is not specially limited in embodiments of this application.

In addition, the electronic device may also be referred to as user equipment (UE), a subscriber station, a mobile unit, a subscriber unit, a wireless unit, a remote unit, a mobile device, a wireless device, a wireless communication device, a remote device, a mobile subscriber station, a terminal device, an access terminal, a mobile terminal, a wireless terminal, a smart terminal, a remote terminal, a handheld terminal, a user agent, a mobile client, a client, or another proper term.

The server may be one or more physical servers (one physical server is used as an example in FIG. 1), or may be a computer cluster, or may be a virtual machine or a cloud server in a cloud computing scenario, or the like.

In this embodiment of this application, a virtual scenario application (APP) such as a VR application, an AR application, or an MR application may be installed on the electronic device, and the VR application, the AR application, or the MR application may be run based on a user operation (for example, tap, touch, slide, shake, or voice control). The electronic device may collect visual information of any object in an environment by using a sensor, and then display a virtual object on a display component based on the collected visual information. The virtual object may be a virtual object (namely, an object in a virtual environment) in a VR scenario, an AR scenario, or an MR scenario.

In this embodiment of this application, a navigation, detection, or control application may be installed on the electronic device, and a corresponding application is run based on operations and control of a user or a preset program. The electronic device may run applications such as route planning, object detection, and carrying device operations and control based on a pose and other status information of the electronic device in a current environment.

The pose is location and orientation information of the electronic device, and may be an absolute pose in the world coordinate system, or may be a relative pose relative to a point in an environment.

The visual information in embodiments of this application includes but is not limited to an image video (without depth information) collected by a camera, an image video (with depth information) collected by a depth sensor, data collected by a lidar (LiDAR), and data collected by a millimeter-wave radar (RaDAR).

It should be noted that, in this embodiment of this application, the virtual scenario application in the electronic device may be an application built in the electronic device, or may be an application that is provided by a third-party service provider and that is installed by the user. This is not specifically limited herein.

In this embodiment of this application, a simultaneous localization and mapping (SLAM) system may be further configured for the electronic device. The SLAM system can create a map in a completely unknown environment, and use the map to perform positioning, pose (location and posture) determining, navigation, and the like. In this embodiment of this application, a map created by the SLAM system is referred to as a SLAM map. The SLAM map may be understood as a map drawn by the SLAM system based on environment information collected by a collection device. The collection device may include a visual information collection apparatus and an inertia measurement unit (IMU) in the electronic device. The visual information collection apparatus may include, for example, a camera, a depth camera, a lidar, and a millimeter-wave radar. The IMU may include, for example, a sensor such as a gyroscope and an accelerometer.

In embodiments of this application, the SLAM map is also referred to as a 3D map. It should be noted that the 3D map includes but is not limited to a SLAM map, and may further include a three-dimensional map created by using another technology. This is not specifically limited in embodiments of this application.

In a possible implementation, the 3D map may include a plurality of 3D map points, and correspondingly, data of the 3D map may include data of the plurality of 3D map points. The 3D map point is a point of interest or a point having a significant feature in an environment.

A possible manner of obtaining a 3D map point is to use a plurality of devices such as a lidar, aerial photography (tilt photography) from an angle of view of an uncrewed aerial vehicle, a high-definition panoramic camera, a high-definition industrial camera to perform shooting, and extract a 3D map point, from data obtained through shooting by the foregoing devices, by using a method such as ORB, scale-invariant feature transform (SIFT), speeded up robust features (SURF), binary robust independent elementary features (BRIEF), a binary robust invariant scalable key point (BRISK), a fast retina keypoint (FREAK), D2Net, or a self-supervised training feature point detection and descriptor extraction method (SuperPoint).

Data of a 3D map point may include the following.
(1) 3D Map Point Descriptor

The 3D map point descriptor is a vector, used to represent a local feature of a corresponding 3D map point. In a visual positioning algorithm, a 3D map point descriptor is used for matching between 3D map points. A possible method is: calculating a distance (which may be a Euclidean distance, an inner product distance, a Hamming distance, or the like)

between two 3D map point descriptors; and when the distance is less than a threshold, considering that the two 3D map points match.
(2) 3D Map Point Spatial Location A 3D map point spatial location may be represented by using X, Y, and Z on three-dimensional spatial axes, or may be represented by using a longitude, a latitude, and an altitude, or may be represented by using polar coordinates or the like. A method for representing a 3D map point spatial location is not specifically limited in embodiments of this application. The 3D map point spatial location may be an absolute location of a 3D map point or a relative location of a 3D map point. For example, a central location of an entire area is used as an origin, and all 3D map point spatial locations are offset locations relative to a spatial location of the origin.

In embodiments of this application, a number may be allocated to each 3D map point and written into data of the 3D map, or a storage sequence of a plurality of 3D map points in a memory may be used to implicitly indicate numbers of the 3D map points. It should be noted that the sequence of the plurality of 3D map points included in the 3D map is meaningless. Therefore, the foregoing numbers may be considered as identifiers used to identify the 3D map points, to distinguish between the 3D map points. However, the numbers are not intended to limit the sequence of the plurality of 3D map points. For example, a 3D map includes three 3D map points whose numbers are respectively 1, 2, and 3, and the three 3D map points may be processed in an order of 1, 2, and 3, or in an order of 3, 2, and 1, or in an order of 2, 1, and 3, or the like.

In a possible implementation, the data of the 3D map further includes a plurality of area descriptors, and any one of the plurality of area descriptors describes features of some or all 3D map points of the plurality of 3D map points. To be specific, for any one of the plurality of area descriptors, the area descriptor may describe features of some or all 3D map points of the plurality of 3D map points. In this case, the area descriptor and the 3D map point are in a one-to-many relationship. A feature of each 3D map point of the plurality of 3D map points may be described by some or all area descriptors of the plurality of area descriptors. In this case, the 3D map point and the area descriptor are in a one-to-many relationship. It can be learned that a plurality of area descriptors and a plurality of 3D map points are in a many-to-many relationship. A method for generating an area descriptor includes but is not limited to a conventional method such as a bag of words (BOW) and a vector of locally aggregated descriptors (VLAD), and a novel method based on NetVLAD or artificial intelligence (AI). Similarly, a plurality of area descriptors may be identified by numbers to distinguish between the plurality of area descriptors. Similarly, however, the numbers are not intended to limit a sequence of the plurality of area descriptors.

In a possible implementation, the data of the 3D map further includes a correspondence between a 3D map point and a descriptor. The correspondence clearly describes which 3D map points any descriptor corresponds to and which descriptors any 3D map point corresponds to.

Optionally, the foregoing correspondence may be explicitly described by using a correspondence table between a number of an area descriptor and a number of a 3D map point. For example, the 3D map includes three area descriptors whose numbers are T1 to T3, and six 3D map points. Numbers of six 3D map point spatial locations are P1 to P6, and numbers of six 3D map point descriptors are F1 to F6. The correspondence table is shown in Table 1.

TABLE 1

| Area descriptor | 3D map point spatial location | 3D map point descriptor |
|---|---|---|
| T1 | $P_1$ | $F_1$ |
|  | $P_2$ | $F_2$ |
|  | $P_3$ | $F_3$ |
| T2 | $P_2$ | $F_2$ |
|  | $P_3$ | $F_3$ |
| T3 | $P_3$ | $F_3$ |
|  | $P_4$ | $F_4$ |
|  | $P_5$ | $F_5$ |
|  | $P_6$ | $F_6$ |

It should be noted that, Table 1 is an example of a correspondence table between a number of an area descriptor and a number of a 3D map point. The correspondence table may alternatively be presented in another format or manner. This is not specifically limited in this application.

Optionally, the foregoing correspondence may alternatively be implicitly described by using storage locations of an area descriptor and a 3D map point. For example, T1 is first stored in the memory, and then data of $P_1$, $P_2$, and $P_3$ is stored; then T2 is stored, and then data of $P_2$ and $P_3$ is stored; and finally, T3 is stored, and then data of $P_3$, $P_4$, $P_5$, and $P_6$ is stored.

Figure 2:
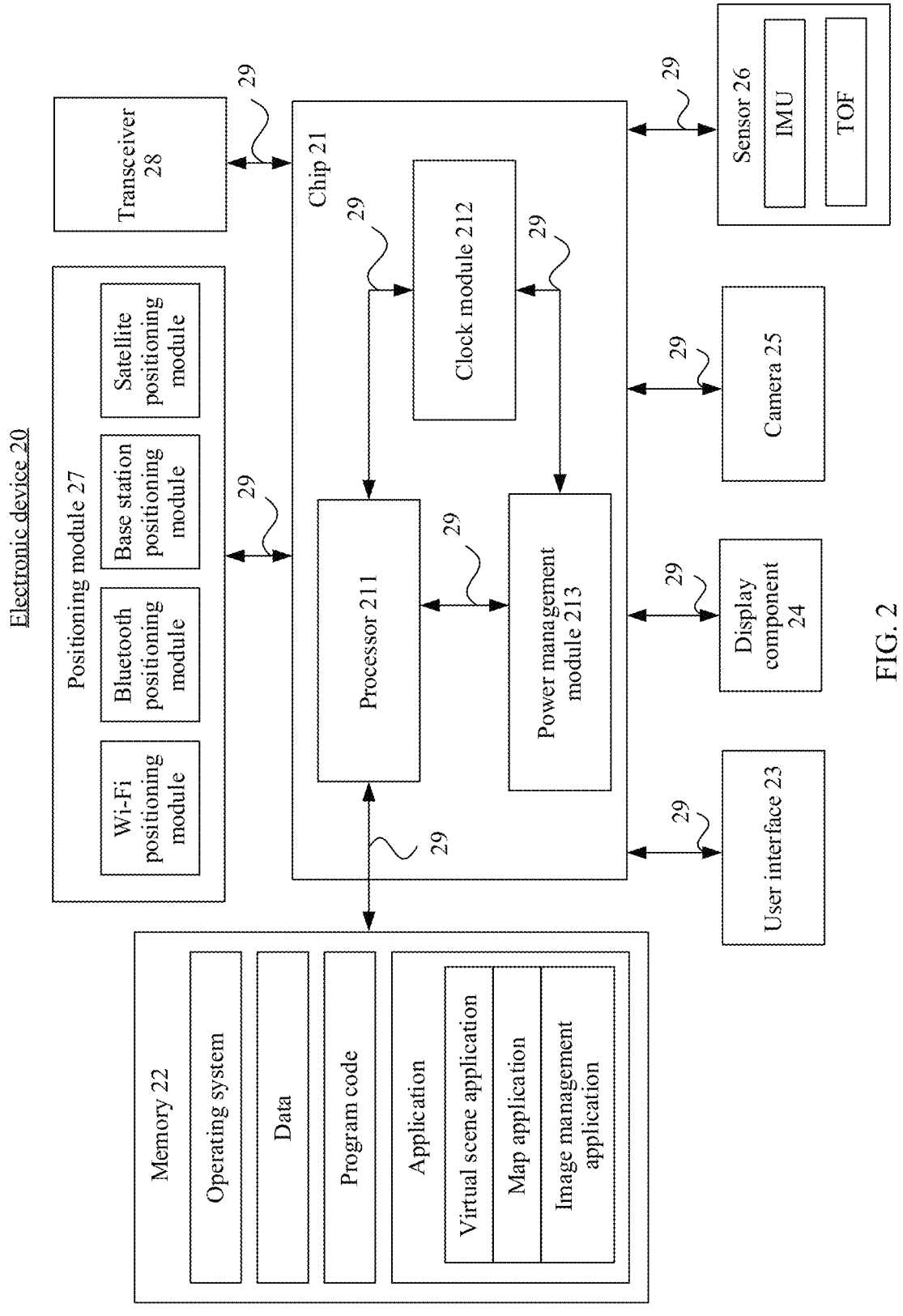
FIG. 2 is a schematic diagram of a structure of an electronic device 20 according to an embodiment of this application.

FIG. 2 is a schematic diagram of a structure of an electronic device 20 according to an embodiment of this application. As shown in FIG. 2, the electronic device 20 may be at least one of the first electronic device and one or more second electronic devices in the embodiment shown in FIG. 1. It should be understood that the structure shown in FIG. 2 does not constitute a specific limitation on the electronic device 20. In some other embodiments of this application, the electronic device 20 may include more or fewer components than those shown in FIG. 2, or combine some components, or split some components, or have different component arrangements. The components shown in FIG. 2 may be implemented in hardware including one or more signal processing and/or application-specific integrated circuits, software, or a combination of hardware and software.

The electronic device 20 may include a chip 21, a memory 22 (one or more computer-readable storage media), a user interface 23, a display component 24, a camera 25, a sensor 26, a positioning module 27 configured to perform device positioning, and a transceiver 28 configured to perform communication. These components may communicate with each other by using one or more buses 29.

One or more processors 211, a clock module 212, and a power management module 213 may be integrated into the chip 21. The clock module 212 integrated in the chip 21 is mainly configured to provide a timer for data transmission and timing control for the processor 211. The timer may implement clock functions of data transmission and timing control. The processor 211 may execute an operation and generate an operation control signal based on an instruction operation code and a timing signal, to complete control of instruction fetching and instruction execution. The power management module 213 integrated in the chip 21 is mainly configured to provide a stable and high-precision voltage for the chip 21 and another component of the electronic device 20.

The processor 211 may also be referred to as a central processing unit (CPU). The processor 211 may include one or more processing units. For example, the processor 211 may include an application processor (AP), a modem processor, a graphics processing unit (GPU), an image signal processor (ISP), a controller, a video codec, a digital signal processor (DSP), a baseband processor, a neural processing unit (NPU), and/or the like. Different processing units may be independent components, or may be integrated into one or more processors.

In a possible implementation, the processor 211 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The memory 22 may be connected to the processor 211 through the bus 29, or may be coupled to the processor 311, and is configured to store various software programs and/or a plurality of groups of instructions. The memory 22 may include a high-speed random access memory (for example, a cache), or may include a nonvolatile memory, for example, one or more magnetic disk storage devices, a flash memory device, or another nonvolatile solid-state storage device. The memory 22 may store an operating system, for example, an embedded operating system such as Android, an Apple mobile platform (iOS), a Microsoft window operating system (Windows), or Linux. The memory 22 may further store data, for example, image data, point cloud data, 3D map data, pose data, coordinate system conversion information, and map update information. The memory 22 may further store computer-executable program code. The computer-executable program code includes instructions, for example, communication program instructions and related program instructions of a SLAM system. The memory 22 may further store one or more applications, for example, a virtual scenario application such as AR/VR/MR, a map application, an image management application, and a navigation and control application. The memory 22 may further store a user interface program. The user interface program may vividly display content of an application, for example, a virtual object in a virtual scenario such as AR/VR/MR, by using a graphical operation interface, present the content by using the display component 24, and receive a control operation performed by a user on the application by using an input control such as a menu, a dialog box, or a button.

The user interface 23 may be, for example, a touch panel. The touch panel may detect an instruction of an operation performed by the user on the touch panel. The user interface 23 may be, for example, a keypad, a physical button, or a mouse.

The electronic device 20 may include one or more display components 24. The electronic device 20 may implement a display function jointly by using the display component 24, a graphics processing unit (GPU) and an application processor (AP) in the chip 21, and the like. The GPU is a microprocessor for implementing image processing, and is connected to the display component 24 and the application processor. The GPU performs mathematical and geometric calculation for graphics rendering. The display component 24 may display interface content output by the electronic device 20, for example, display an image, a video, and the like in a virtual scenario such as AR/VR/MR. The interface content may include an interface of a running application, a system-level menu, and the like, and may include the following interface elements: input interface elements, such as a button (Button), a text input box (Text), a scrollbar (Scrollbar), and a menu (Menu); and output interface elements, such as a window (Window), a label (Label), an image, a video, and an animation.

The display component 24 may be a display panel, a lens (for example, VR glasses), a projection screen, or the like. The display panel may also be referred to as a display screen, for example, may be a touchscreen, a flexible screen, a curved screen, or the like, or may be another optical component. It should be understood that the display screen of the electronic device in embodiments of this application may be a touchscreen, a flexible screen, a curved screen, or a screen in another form. In other words, the display screen of the electronic device has a function of displaying an image, and a specific material and shape of the display screen are not specifically limited.

For example, when the display component 24 includes a display panel, the display panel may use a liquid crystal display (LCD), an organic light-emitting diode (OLED), an active matrix organic light-emitting diode or an active-matrix organic light-emitting diode (AMOLED), a flexible light-emitting diode (FLED), a MiniLed, a MicroLed, a Micro-oLed, a quantum dot light-emitting diode (QLED), or the like. In addition, in a possible implementation, the touch panel in the user interface 23 may be coupled to the display panel in the display component 24. For example, the touch panel may be disposed below the display panel, the touch panel is configured to detect touch pressure that acts on the display panel when the user enters a touch operation (for example, tap, slide, or touch) by using the display panel, and the display panel is configured to display content.

The camera 25 may be a monocular camera, a binocular camera, or a depth camera, and is configured to photograph/record an environment to obtain an image/video image. The image/video image collected by the camera 25 may be, for example, used as input data of the SLAM system, or an image/video may be displayed by using the display component 24.

In a possible implementation, the camera 25 may also be considered as a sensor. The image collected by the camera 25 may be in an IMG format, or may be in another format type. This is not specifically limited in embodiments of this application.

The sensor 26 may be configured to collect data related to a status change (for example, rotation, swing, movement, or jitter) of the electronic device 20. The data collected by the sensor 26 may be used as input data of the SLAM system. The sensor 26 may include one or more sensors, for example, an inertia measurement unit (IMU) and a time of flight (TOF) sensor. The IMU may include sensors such as a gyroscope and an accelerometer. The gyroscope is configured to measure an angular velocity of the electronic device when the electronic device moves, and the accelerometer is configured to measure acceleration of the electronic device when the electronic device moves. The TOF sensor may include an optical transmitter and an optical receiver. The optical transmitter is configured to emit light outward, for example, laser light, an infrared ray, or a radar wave. The optical receiver is configured to detect reflected light, for example, reflected laser light, an infrared ray, or a radar wave.

It should be noted that the sensor 26 may further include more other sensors, such as an inertia sensor, a barometer, a magnetometer, and a wheel speedometer. This is not specifically limited in embodiments of this application.

The positioning module 27 is configured to implement physical positioning of the electronic device 20, for example, configured to obtain an initial location of the electronic device 20. The positioning module 27 may include one or more of a Wi-Fi positioning module, a Bluetooth positioning module, a base station positioning module, and a satellite positioning module. A global navigation satellite system (GNSS) may be disposed in the satellite positioning module to assist in positioning. The GNSS is not limited to a BeiDou system, a Global Positioning System (GPS) system, a global navigation satellite system (GLONASS) system, and a Galileo Navigation Satellite System (Galileo) system.

The transceiver 28 is configured to implement communication between the electronic device 20 and another device (for example, a server or another electronic device). The transceiver 28 integrates a transmitter and a receiver, which are respectively configured to send and receive a radio frequency signal. In an exemplary implementation, the transceiver 28 includes but is not limited to an antenna system, a radio frequency (RF) transceiver, one or more amplifiers, a tuner, one or more oscillators, a digital signal processor, a codec (CODEC) chip, a subscriber identity module (SIM) card, a storage medium, and the like. In a possible implementation, the transceiver 28 may be alternatively implemented on a separate chip. The transceiver 28 supports at least one data network communication in at least one data network of 2G/3G/4G/5G or the like, and/or supports at least one of the following short-range wireless communication manners: Bluetooth (BT) communication, Wireless Fidelity (Wi-Fi) communication, near-field communication (NFC), infrared (IR) wireless communication, ultra-wideband (UWB) communication, and ZigBee protocol communication.

In this embodiment of this application, the processor 211 runs program code stored in the memory 22, to perform various function applications and data processing of the electronic device 20.

Figure 3:
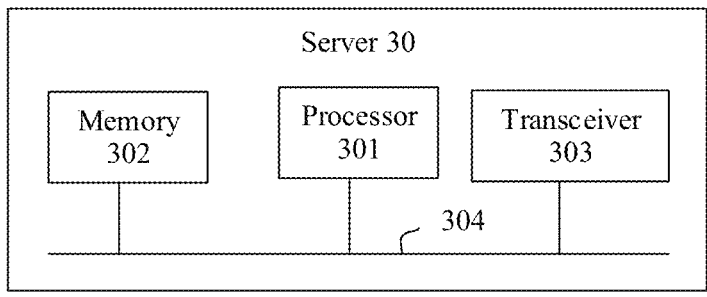
FIG. 3 is a schematic diagram of a structure of a server 30 according to an embodiment of this application.

FIG. 3 is a schematic diagram of a structure of a server 30 according to an embodiment of this application. As shown in FIG. 3, the server 30 may be the server in the embodiment shown in FIG. 1. The server 30 includes a processor 301, a memory 302 (one or more computer-readable storage media), and a transceiver 303. These components may communicate with each other by using one or more buses 304.

The processor 301 may be one or more CPUs. When the processor 301 is one CPU, the CPU may be a single-core CPU, or may be a multi-core CPU.

The memory 302 may be connected to the processor 301 through the bus 304, or may be coupled to the processor 301, and is configured to store various program code and/or a plurality of groups of instructions and data (for example, map data and pose data). In an exemplary implementation, the memory 302 includes but is not limited to a random access memory (RAM), a read-only memory (ROM), an erasable programmable read-only memory (EPROM), a portable read-only memory (Compact Disc Read-Only Memory, CD-ROM), or the like.

The transceiver 303 mainly integrates a receiver and a transmitter. The receiver is configured to receive data (for example, a request or an image) sent by an electronic device, and the transmitter is configured to send data (for example, map data or pose data) to the electronic device.

It should be understood that the server 30 shown in FIG. 3 is merely an example provided in this embodiment of this application, and the server 30 may further have more components than those shown in the figure. This is not specifically limited in embodiments of this application.

In this embodiment of this application, the processor 301 runs program code stored in the memory 302, to perform various function applications and data processing of the server 30.

The term "coupling" used in embodiments of this application means a direct connection or a connection through one or more intermediate components or circuits.

Figure 4A:
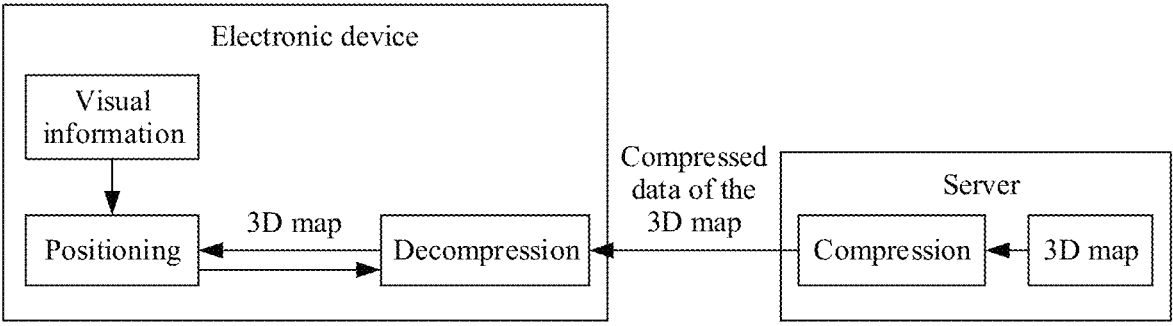
FIG. 4a to FIG. 4f are schematic diagrams of various application scenarios according to an embodiment of this application.

FIG. 4a is a schematic diagram of an application scenario according to an embodiment of this application. As shown in FIG. 4a, in the application scenario, an electronic device collects visual information by using a sensor, and determines a current pose of the electronic device with reference to the visual information and a 3D map from a server.

The 3D map is provided by the server. To be specific, the server creates the 3D map, then compresses the 3D map, and transmits compressed data of the 3D map to the electronic device. After receiving the compressed data of the 3D map, the electronic device performs decompression to obtain reconstructed data of the 3D map, and determines the current pose of the electronic device with reference to the collected visual information and the reconstructed data of the 3D map. The pose is location information of the electronic device, and may be an absolute pose in the world coordinate system, or may be a relative pose relative to a point in an environment.

In this embodiment of this application, the server may create the 3D map in advance, compress the 3D map, and then store compressed data of the 3D map locally. In this way, storage space can be saved. In addition, the server may transmit the compressed data of the 3D map to another device, for example, a cloud storage.

1. The server creates the 3D map, compresses the 3D map to obtain the compressed data of the 3D map, and stores the compressed data locally.

The server compresses the 3D map, to save local storage space.

2. The electronic device sends a map download request to the server. The map download request is triggered in two manners:

(1) A user starts a map application installed on the electronic device, and the application uploads, to a server corresponding to the application, location information obtained based on GPS positioning or Wi-Fi positioning. The upload operation may trigger a map download request. Because uploaded content includes the location information, the server may perform preliminary estimation based on the location information, and transmit, to the electronic device, compressed data of a 3D map of an area to which a positioning point indicated by the location information belongs. A range of the area to which the positioning point indicated by the location information belongs may be preset. For example, the area to which the positioning point belongs may be an administrative region (including a county, a city, a country, or an administrative region) at any level in which the positioning point is located, or may be a circular area centered on the positioning point and using a specified distance as a radius.

(2) The user starts a map application installed on the electronic device, and actively enters or selects an area on the application. For example, the user actively enters "xx business center", or selects "street A" from a list of "street A, street B, and street C". The foregoing operations of the user may trigger a map download request. Regardless of whether the user enters or selects a geographical location, the server accordingly transmits compressed data of a 3D map of the geographical location to the electronic device.

It should be understood that, in this embodiment of this application, in addition to the foregoing two manners, another manner may be used for triggering a map download request. For example, the electronic device automatically detects whether a condition for downloading a 3D map or starting downloading a 3D map is satisfied, or the electronic device starts downloading a 3D map upon detecting an ambient light change or an environment change, to request the server to download a 3D map of an area range. A size of the area range is not specifically limited.

3. The server sends the compressed data of the 3D map to the electronic device.

4. The electronic device collects the visual information by using the sensor.

It should be noted that step 3 and step 4 are independent of each other, and a sequence is not limited.

5. The electronic device decompresses the compressed data of the 3D map to obtain the reconstructed data of the 3D map.

6. The electronic device performs positioning in the 3D map based on the visual information, to obtain a pose corresponding to the visual information.

After receiving the compressed data of the 3D map, the electronic device does not need to immediately decompress the compressed data, and needs to decompress the compressed data to obtain the reconstructed data of the 3D map only before performing positioning based on the visual information. For example, the user may pre-download compressed data of a 3D map of an area range by downloading an "offline map", and decompress the compressed data of the 3D map only when positioning is required.

Figure 4B:
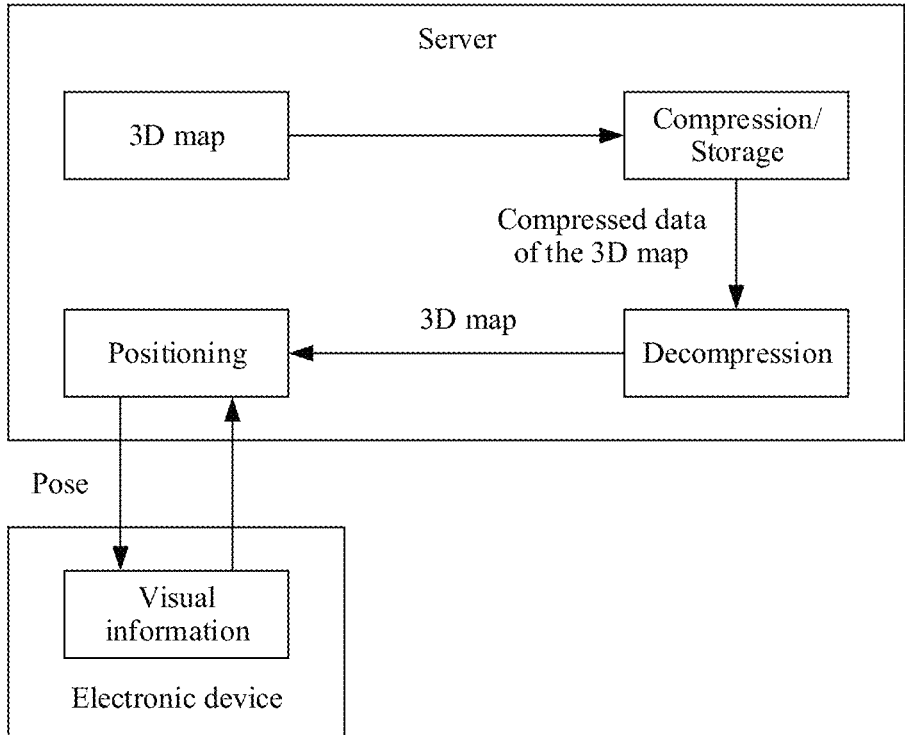

FIG. 4b is a schematic diagram of an application scenario according to an embodiment of this application. As shown in FIG. 4b, in the application scenario, an electronic device collects visual information by using a sensor, and a server determines a current pose of the electronic device with reference to the visual information from the electronic device and a 3D map.

The 3D map is provided by the server. To be specific, the server creates the 3D map, then compresses the 3D map, and stores compressed data of the 3D map locally. When receiving the visual information from the electronic device, the server performs decompression to obtain reconstructed data of the 3D map, and determines the current pose of the electronic device with reference to the visual information and the reconstructed data of the 3D map.

1. The server creates the 3D map, compresses the 3D map to obtain the compressed data of the 3D map, and stores the compressed data locally.

2. The electronic device collects the visual information by using the sensor.

3. The electronic device sends the visual information to the server.

4. The server decompresses the compressed data of the 3D map to obtain the reconstructed data of the 3D map.

It should be understood that the server compresses the 3D map to save storage space.

5. The server performs positioning in the 3D map based on the visual information, to obtain a pose corresponding to the visual information.

6. The server sends the pose to the electronic device.

Figure 4C:
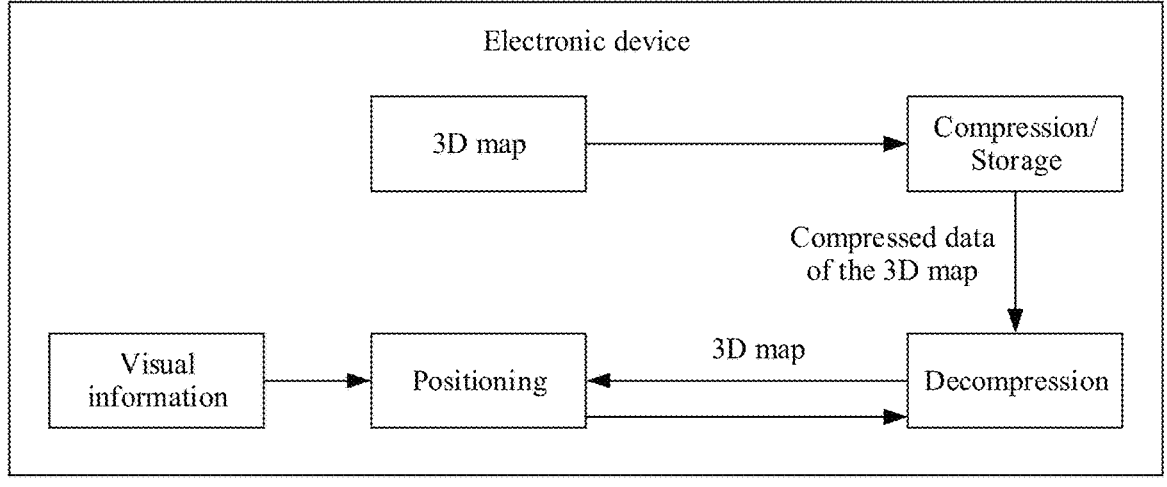

FIG. 4c is a schematic diagram of an application scenario according to an embodiment of this application. As shown in FIG. 4c, in the application scenario, an electronic device collects visual information by using a sensor, and determines a current pose of the electronic device with reference to the collected visual information and a 3D map.

The 3D map is provided by the electronic device. To be specific, the electronic device creates the 3D map, then compresses the 3D map, and stores compressed data of the 3D map locally. When the visual information is collected, the electronic device performs decompression to obtain reconstructed data of the 3D map, and determines the current pose of the electronic device with reference to the collected visual information and the reconstructed data of the 3D map.

1. The electronic device creates the 3D map, compresses the 3D map to obtain the compressed data of the 3D map, and stores the compressed data locally.

It should be understood that the electronic device compresses the 3D map to save storage space.

2. The electronic device collects the visual information by using the sensor.

3. The electronic device decompresses the compressed data of the 3D map to obtain the reconstructed data of the 3D map.

4. The electronic device performs positioning in the 3D map based on the visual information, to obtain a pose corresponding to the visual information.

Figure 4D:
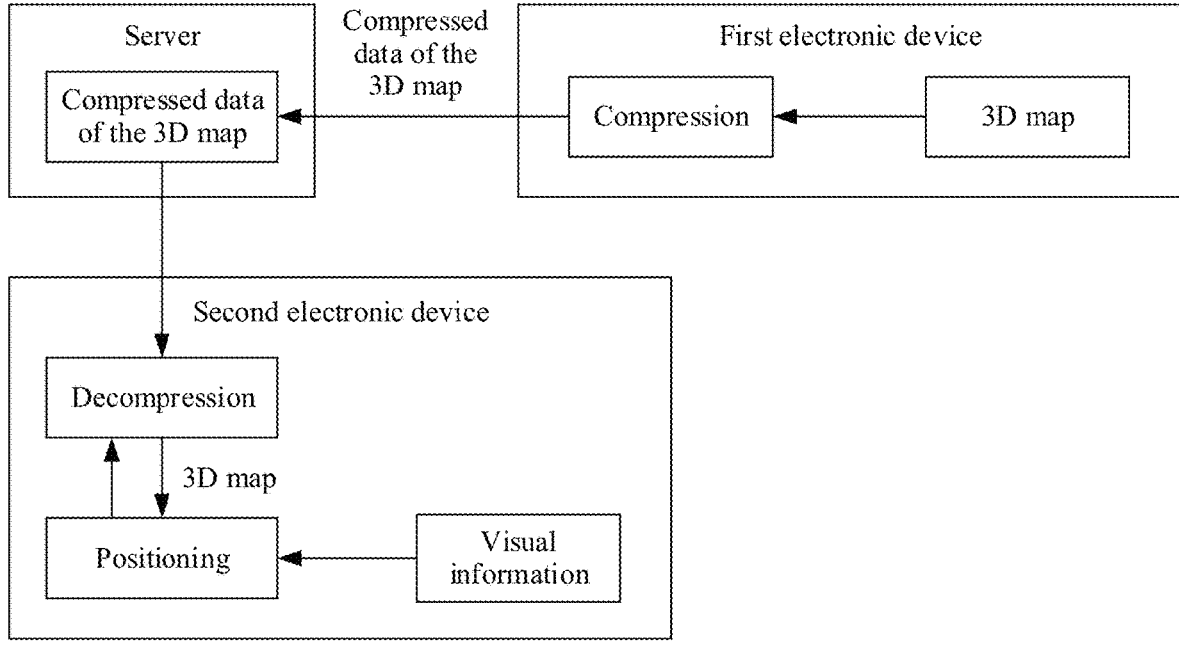

FIG. 4d is a schematic diagram of an application scenario according to an embodiment of this application. As shown in FIG. 4d, in the application scenario, a second electronic device collects visual information by using a sensor, and determines a current pose of the second electronic device with reference to the visual information and a 3D map from a server.

The 3D map is created by the first electronic device. To be specific, the first electronic device creates the 3D map, compresses the 3D map, and then sends compressed data of the 3D map to the server. The server then sends the compressed data of the 3D map to the second electronic device. The second electronic device performs decompression to obtain reconstructed data of the 3D map, and determines the current pose of the second electronic device with reference to the collected visual information and the reconstructed data of the 3D map.

In this embodiment of this application, the first electronic device may create the 3D map in advance, compress the 3D map, and then transmit the compressed data of the 3D map to the server. In this way, transmission bandwidth can be reduced.

1. The first electronic device creates the 3D map, compresses the 3D map to obtain the compressed data of the 3D map.

2. The first electronic device sends the compressed data of the 3D map to the server.

The first electronic device compresses the 3D map and then transmits the compressed data of the 3D map, to reduce transmission bandwidth, and improve transmission efficiency.

3. The second electronic device sends a map download request to the server.

The second electronic device may send the map download request based on a trigger manner shown in FIG. 4a.

4. The server sends the compressed data of the 3D map to the second electronic device.

5. The second electronic device decompresses the compressed data of the 3D map to obtain the reconstructed data of the 3D map.

6. The second electronic device collects the visual information by using the sensor.

7. The second electronic device performs positioning in the 3D map based on the visual information, to obtain a pose corresponding to the visual information.

Figure 4E:
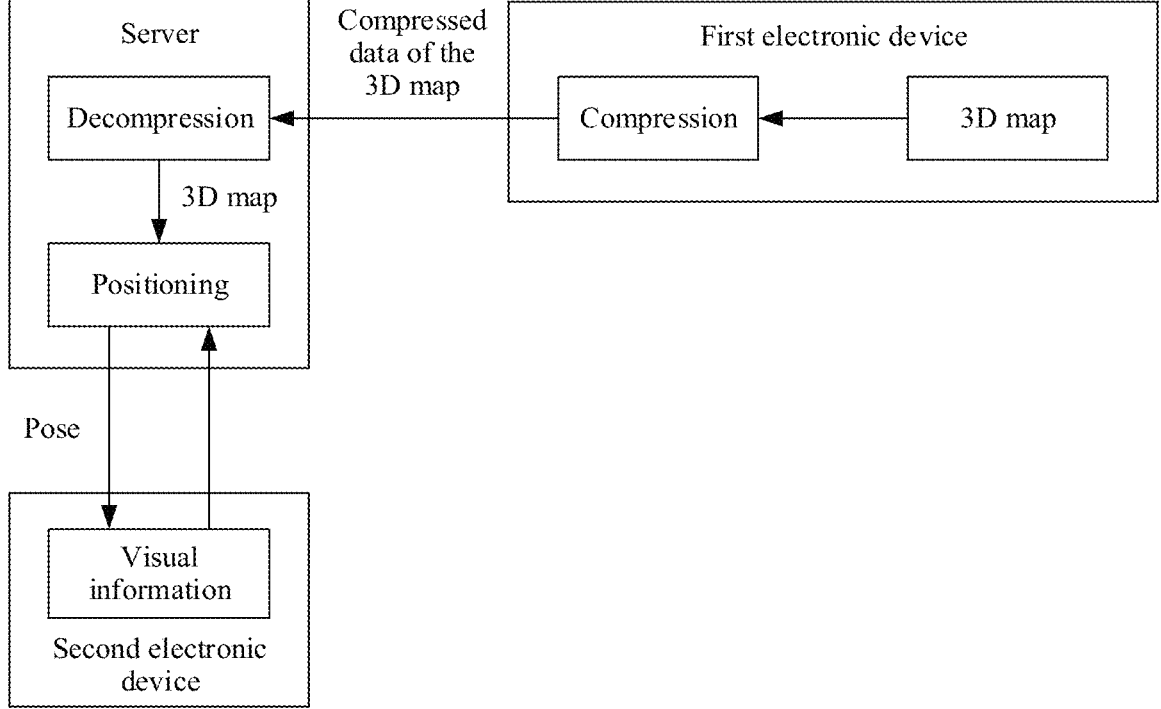

FIG. 4e is a schematic diagram of an application scenario according to an embodiment of this application. As shown in FIG. 4e, in the application scenario, a second electronic device collects visual information by using a sensor, and a server determines a current pose of the second electronic device with reference to the visual information from the second electronic device and a 3D map from a first electronic device.

The 3D map is created by the first electronic device. To be specific, the first electronic device creates the 3D map, compresses the 3D map, and then sends compressed data of the 3D map to the server. The server performs decompression to obtain reconstructed data of the 3D map, and determines the current pose of the second electronic device with reference to the visual information from the second electronic device and the reconstructed data of the 3D map.

1. The first electronic device creates the 3D map, compresses the 3D map to obtain the compressed data of the 3D map.

2. The first electronic device sends the compressed data of the 3D map to the server.

3. The second electronic device collects the visual information by using the sensor.

4. The second electronic device sends a positioning request to the server, where the positioning request carries the visual information.

5. The server decompresses the compressed data of the 3D map to obtain the reconstructed data of the 3D map.

6. The server performs positioning in the 3D map based on the visual information, to obtain a pose corresponding to the visual information.

7. The server sends, to the second electronic device, the pose obtained through positioning.

Figure 4F:
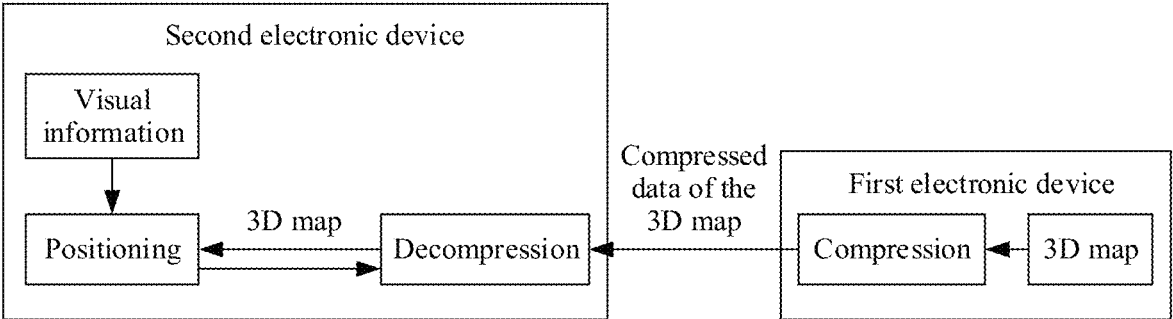

FIG. 4f is a schematic diagram of an application scenario according to an embodiment of this application. As shown in FIG. 4f, in the application scenario, a second electronic device collects visual information by using a sensor, and determines a current pose of the second electronic device with reference to the visual information and a 3D map from a first electronic device.

The 3D map is created by the first electronic device. To be specific, the first electronic device creates the 3D map, compresses the 3D map, and then sends compressed data of the 3D map to the second electronic device. The second electronic device performs decompression to obtain reconstructed data of the 3D map, and determines the current pose of the second electronic device with reference to the collected visual information and the 3D map from the first electronic device.

1. The first electronic device creates the 3D map, compresses the 3D map to obtain the compressed data of the 3D map, and stores the compressed data locally.

2. The second electronic device sends a map download request to the first electronic device.

3. The first electronic device sends the compressed data of the 3D map to the second electronic device.

4. The second electronic device decompresses the compressed data of the 3D map to obtain the reconstructed data of the 3D map.

5. The second electronic device collects the visual information by using the sensor.

6. The second electronic device performs positioning in the 3D map based on the visual information, to obtain a pose corresponding to the visual information.

A positioning algorithm used in the embodiments shown in FIG. 4a to FIG. 4f may include the following.

(1) A to-be-retrieved area descriptor is extracted from the visual information, where an algorithm used for extracting the to-be-retrieved area descriptor is consistent with an algorithm for extracting an area descriptor from the 3D map.

(2) A to-be-retrieved 3D map point is extracted from the visual information, and a to-be-retrieved 3D map point spatial location and a to-be-retrieved 3D map point descriptor are obtained, where an algorithm for extracting the to-be-retrieved 3D map point descriptor is consistent with an algorithm for extracting a 3D map point descriptor from the 3D map.

(3) Retrieval is performed in a plurality of area descriptors included in data of the 3D map based on the to-be-retrieved area descriptor, to obtain a plurality of candidate area descriptors.

In embodiments of this application, a distance between the to-be-retrieved area descriptor and each area descriptor in the plurality of area descriptors may be calculated. The distance may include a Hamming distance, a Manhattan distance, a Euclidean distance, or the like. Then, at least one area descriptor that satisfies a condition (for example, the distance is less than a threshold) is selected as a candidate area descriptor.

(4) Matching is separately performed between the to-be-retrieved 3D map point descriptor and 3D map point descriptors corresponding to a plurality of candidate area descriptors. The matching is to separately calculate a similarity between the to-be-retrieved 3D map point descriptor and the 3D map point descriptors corresponding to the plurality of candidate area descriptors, to find a most similar 3D map point.

(5) The pose of the electronic device is calculated based on the found 3D map point by using a pose solution algorithm such as perspective-n-point (PnP) camera pose estimation and efficient perspective-n-point camera pose estimation (EPnP).

Figure 4G:
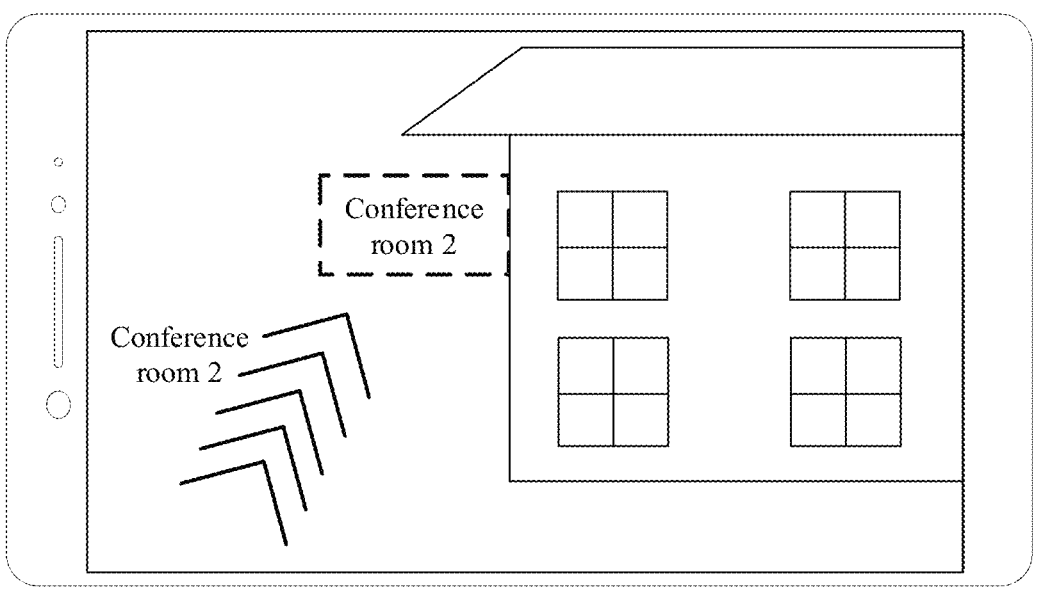
FIG. 4g is a schematic diagram of a user interface (for example, a user interface of a 3D map application) displayed by an electronic device according to an embodiment of this application.

In any one of the application scenarios in FIG. 4a to FIG. 4f, positioning is performed based on the 3D map in embodiments of this application, to obtain the current pose of the electronic device. The pose may be applied to fields such as AR navigation, AR human-computer interaction, assisted driving, and autonomous driving. For example, AR navigation based on the pose is used as an example. FIG. 4g is a schematic diagram of a user interface displayed by an electronic device according to an embodiment of this application. The electronic device may display, based on the pose, the user interface shown in FIG. 4g. The user interface may include an indication of a navigation arrow headed to a conference room 2, and the indication of the navigation arrow headed to the conference room 2 may be a virtual object obtained from a server based on the pose or obtained locally based on the pose. The user interface may further include visual information collected by a sensor, for example, a building shown in FIG. 4g. The user goes to the conference room 2 with reference to the user interface of the electronic device shown in FIG. 4g.

It should be noted that reconstructed data, obtained through decompression, of a 3D map in embodiments of this application may also be referred to as reconstructed data of the 3D map.

In the embodiments shown in FIG. 4a to FIG. 4f, compression and decompression are performed on the 3D map, and positioning is performed based on the reconstructed data, obtained through decompression, of the 3D map, to obtain the current pose of the electronic device. For positioning, in an implementable manner, positioning may be performed based on the reconstructed data, obtained through complete decompression, of the 3D map. In another possible implementable manner, a descriptor may be obtained through screening by using a method for retrieving a 3D map provided in the following embodiments of this application, and positioning is performed by using the descriptor. According to the method for retrieving a 3D map provided in the following embodiments of this application, retrieval and decompression or extraction from compressed data are alternately performed, to perform multi-stage retrieval in a 3D map, so as to obtain a descriptor. Compared with retrieval in reconstructed data of a 3D map obtained through complete decompression, in the method for retrieving a 3D map provided in the following embodiments of this application, one stage of non-complete-decompression retrieval exists in at least two stages of retrieval, to improve a retrieval speed, and another stage of retrieval in the at least two stages of retrieval can ensure retrieval accuracy. Non-complete decompression means that all reconstructed data of the 3D map is obtained through incomplete decompression. The following describes the method for retrieving a 3D map.

Retrieval of a 3D map in embodiments of this application means finding some most similar or most related 3D map points from a plurality of 3D map points on the 3D map.

A length of binary data in embodiments of this application may be a quantity of bits (also referred to as a bit quantity) of the binary data. For example, if the binary data is 110, the quantity of bits in the binary data is 3.

It should be noted that the retrieval method provided in embodiments of this application may also be applied to another technical field, for example, retrieval of image or video data, retrieval of audio data, and retrieval of point cloud data.

Based on the foregoing description, the following provides a method for retrieving a 3D map according to an embodiment of this application. For convenience, the method embodiments described below are expressed as a combination of a series of action steps. However, a person skilled in the art should understand that exemplary implementations of the technical solutions of this application are not limited to a sequence of the described series of action steps.

Figure 5A:
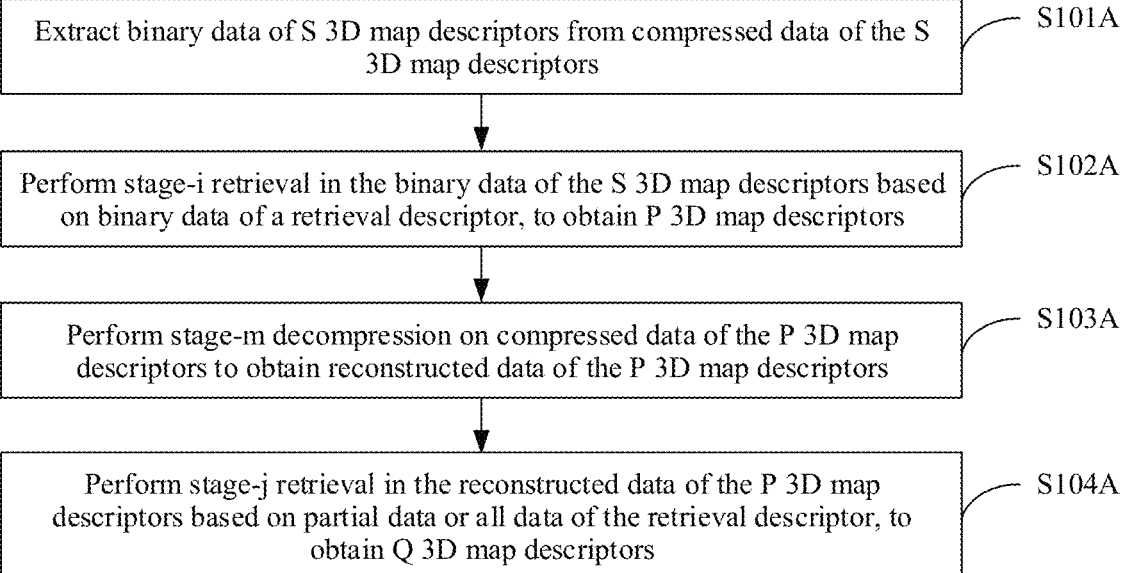

Refer to FIG. 5A. FIG. 5A is a schematic flowchart of a segment of a method for retrieving a 3D map according to an embodiment of this application. In some implementations, the method may be applied to the electronic device in any one of examples of FIG. 1 to FIG. 4f, or may be applied to the server in any one of examples of FIG. 1 to FIG. 4f. The method includes but is not limited to the following steps.

S101A: Extract binary data of S 3D map descriptors from compressed data of the S 3D map descriptors, where the S 3D map descriptors correspond to a plurality of 3D map points of a 3D map.

The binary data may be first binary data, second binary data, . . . , $n^{th}$ binary data, or the like, where n is a positive integer. It should be understood that "first", "second", and "third" in the first binary data, the second binary data, the third binary data, and the like are not in a sequential order, and are merely used for distinguishing between each other. The following uses the $n^{th}$ binary data as an example for description.

The $n^{th}$ binary data of the S 3D map descriptors is extracted from the compressed data of the S 3D map descriptors.

The $n^{th}$ binary data of the S 3D map descriptors is extracted from the compressed data of the S 3D map descriptors, where S is a positive integer. S represents a quantity of 3D map descriptors that need to be retrieved in stage-i retrieval. S<T, where T represents a total quantity of 3D map descriptors in the 3D map.

A quantity of the plurality of 3D map points corresponding to the S 3D map descriptors may be greater than S, or may be equal to S.

For example, the S 3D map descriptors may be S area descriptors or S 3D map point descriptors. One area descriptor corresponds to a plurality of 3D map points, and one 3D map point descriptor corresponds to one 3D map point. For specific explanations and descriptions thereof, refer to the explanations and descriptions in the foregoing embodiment, and details are not described herein again.

The compressed data of the S 3D map descriptors may be obtained through compression on the S area descriptors or the S 3D map point descriptors. The compression herein may include compaction. The compaction may include binarization and quantization. The $n^{th}$ binary data of the S 3D map descriptors may be partial data of compressed data of each of the S 3D map descriptors. For example, the $n^{th}$ binary data of the S 3D map descriptors may be partial or all binary data of compressed data of each of the S 3D map descriptors.

Binarization includes but is not limited to: iterative quantization (ITQ) hashing, locality-sensitive hashing (LSH), spectral hashing, or the like. For example, a descriptor may be mapped to a Hamming space (also referred to as a binary space) through binarization, to obtain binary data.

The quantization includes but is not limited to scalar quantization, vector quantization, product quantization, or the like. For example, a 3D map descriptor may be compressed into one or more quantization indexes through quantization, and the one or more quantization indexes are quantized data of the 3D map descriptor. Each quantization index in the one or more quantization indexes corresponds to one quantization center.

Optionally, an execution body in this embodiment of this application may perform entropy decoding on the compressed data of the S 3D map descriptors to extract the $n^{th}$ binary data of the S 3D map descriptors from the compressed data.

S102A: Perform stage-i retrieval in the binary data of the S 3D map descriptors based on binary data of a retrieval descriptor, to obtain P 3D map descriptors.

The $n^{th}$ binary data is used as an example for description.

The stage-i retrieval is performed in the $n^{th}$ binary data of the S 3D map descriptors based on $n^{th}$ binary data of the retrieval descriptor, to obtain the P 3D map descriptors.

The retrieval descriptor is a feature that corresponds to a real environment and that is extracted from visual information collected by a sensor of an electronic device.

The retrieval descriptor herein may be the to-be-retrieved area descriptor or the to-be-retrieved 3D map point descriptor in the foregoing embodiment. In other words, the retrieval descriptor may be a to-be-retrieved area descriptor extracted from the visual information, and the to-be-retrieved area descriptor describes features of some or all of the plurality of 3D map points. The to-be-retrieved area descriptor may be a vector, for example, a 128-dimensional vector or a 512-dimensional vector. A quantity of dimensions of the to-be-retrieved area descriptor is not limited to the foregoing example, and may be another value. Examples are not described one by one in this embodiment of this application. Alternatively, the retrieval descriptor may be a to-be-retrieved 3D map point descriptor extracted from the visual information, and the to-be-retrieved 3D map point descriptor is used to indicate a local feature of a corresponding 3D map point. The to-be-retrieved 3D map point descriptor may be a vector, and a quantity of dimensions of the vector may be any positive integer.

Manners of obtaining the retrieval descriptor may include but are not limited to the following manners. In an implementable manner, an execution body of this embodiment may receive the retrieval descriptor sent by another device. For example, this embodiment may be performed by the first electronic device shown in FIG. 1, and the first electronic device may receive a retrieval descriptor sent by the second electronic device. For another example, this embodiment may be performed by the server shown in FIG. 1, and the server may receive a retrieval descriptor sent by the first electronic device or the second electronic device. In another implementable manner, an execution body of this embodiment may receive the visual information sent by another device, and extract the retrieval descriptor from the visual information. For example, this embodiment may be performed by the first electronic device shown in FIG. 1, the first electronic device may receive visual information sent by the second electronic device, and the first electronic device extracts a retrieval descriptor from the visual information. For another example, this embodiment may be performed by the server shown in FIG. 1, the server may receive visual information sent by the first electronic device or the second electronic device, and the server extracts a retrieval descriptor from the visual information. In still another implementable manner, an execution body of this embodiment may detect a visual information collection operation entered by a user, and in response to the operation, trigger a sensor of the execution body to perform visual information collection on the real environment to obtain the visual information, and extract the retrieval descriptor from the visual information. For example, this embodiment may be performed by the first electronic device shown in FIG. 1, and when detecting a visual information collection operation entered by the user, the first electronic device triggers, in response to the operation, a sensor of the first electronic device to perform visual information collection on the real environment to obtain visual information, and extracts a retrieval descriptor from the visual information. The visual information collection operation may be: enabling, in a manner such as tap, touch, slide, or shake, the sensor to collect visual information, or enabling, through sound control or in another manner, the sensor to collect visual information. This is not limited in embodiments of this application. For example, after the first electronic device detects a touch operation performed by the user on a shooting button in the user interface, a camera of the first electronic device is started in response to the touch operation.

The $n^{th}$ binary data of the retrieval descriptor may be partial or all binary data of the retrieval descriptor. In an example, an execution body of this embodiment may perform binarization on the retrieval descriptor to obtain the binary data of the retrieval descriptor, and select (also referred to as "extract") a part or all of the binary data of the retrieval descriptor as the $n^{th}$ binary data of the retrieval descriptor.

The execution body of this embodiment may perform retrieval in the $n^{th}$ binary data of the S 3D map descriptors by using the $n^{th}$ binary data of the retrieval descriptor, to obtain P 3D map descriptors that are most similar to or most related to the $n^{th}$ binary data of the retrieval descriptor.

P is a positive integer, and P represents a quantity of 3D map descriptors obtained through screening in the stage-i retrieval, where P<T.

In some embodiments, P<S. For example, a 3D map descriptor subset is obtained through stage-i retrieval, and a quantity of 3D map descriptors in the 3D map description subset is less than a quantity of 3D map descriptors in a 3D map description subset existing before the stage-i retrieval. In some embodiments, P may be greater than S. For specific explanations and descriptions thereof, refer to the following explanations and descriptions of the embodiment shown in FIG. 7, and details are not described herein again.

When P<S, that is, the P 3D map descriptors belong to the S 3D map descriptors, a similarity or correlation between n$^{th}$ binary data of each of the P 3D map descriptors and the n$^{th}$ binary data of the retrieval descriptor is higher than that for other 3D map descriptors in the S 3D map descriptors except the P 3D map descriptors. There may be many implementations of calculating the similarity or correlation. For example, first distances between n$^{th}$ binary data of two 3D map descriptors (between the 3D map descriptor and the retrieval descriptor) are calculated, to determine a correlation of n$^{th}$ binary data of each of the two 3D map descriptors. A smaller first distance indicates a higher correlation.

The first distance in embodiments of this application may include a distance obtained by using binary data, such as a Hamming distance. For example, the first distance may be a Hamming distance. For another example, the first distance may be a distance obtained by obtaining absolute values of difference values between corresponding bits of two pieces of binary data and adding up the absolute values of all the difference values. Retrieval based on the first distance means determining a correlation or similarity by calculating the first distance, to screen 3D map descriptors.

S103A: Perform stage-m decompression on compressed data of the P 3D map descriptors to obtain reconstructed data of the P 3D map descriptors.

The reconstructed data may be first reconstructed data, second reconstructed data, . . . m$^{th}$ reconstructed data, or the like, where m is a positive integer. It should be understood that "first", "second", and "third" in the first reconstructed data, the second reconstructed data, the third reconstructed data, and the like are not in a sequential order, and are merely used for distinguishing between each other. The following uses the m$^{th}$ reconstructed data as an example for description.

The stage-m decompression is performed on the compressed data of the P 3D map descriptors to obtain m$^{th}$ reconstructed data of the P 3D map descriptors.

The P 3D map descriptors may be obtained through screening in S101A and S102A, and the stage-m decompression may be performed on the compressed data of the P 3D map descriptors in S103A, to obtain the m$^{th}$ reconstructed data of the P 3D map descriptors, so as to further perform retrieval based on the m$^{th}$ reconstructed data, where m is a positive integer. The stage-m decompression may include dequantization. The stage-m decompression may be staged decompression (that is, a part of complete decompression), or may be complete decompression.

The m$^{th}$ reconstructed data of the P 3D map descriptors may be obtained by performing the stage-m decompression on partial data or all data of compressed data of each of the P 3D map descriptors. For example, the m$^{th}$ reconstructed data of the P 3D map descriptors may be dequantized data obtained by performing dequantization on a part or all of the compressed data of each of the P 3D map descriptors. It should be noted that the dequantized data may also be referred to as reconstructed data, and the reconstructed data may be obtained in a dequantization manner in a conventional technology. For another example, dequantization is performed on quantized data (a part of the compressed data) of each of the P 3D map descriptors to obtain P pieces of dequantized data, and then the m$^{th}$ reconstructed data of the P 3D map descriptors may be obtained based on the P pieces of dequantized data and binary data (a part of the compressed data) of each of the P 3D map descriptors.

In some embodiments, the stage-m decompression may further include other decompression such as entropy decoding and prediction. Examples are not described one by one in this embodiment of this application.

S104A: Perform stage-j retrieval in the reconstructed data of the P 3D map descriptors based on partial data or all data of the retrieval descriptor, to obtain Q 3D map descriptors.

Q is a positive integer, 0<Q<P, 0<P<T, 0<S≤T, T represents a total quantity of 3D map descriptors in the 3D map, j=i+1, 1≤i<L, 1<j≤L, L represents a total quantity of retrieval stages of the 3D map or a retrieval stage quantity threshold, and L is a positive integer greater than 1.

The reconstructed data may be first reconstructed data, second reconstructed data, . . . m$^{th}$ reconstructed data, or the like, where m is a positive integer. It should be understood that "first", "second", and "third" in the first reconstructed data, the second reconstructed data, the third reconstructed data, and the like are not in a sequential order, and are merely used for distinguishing between each other. The following uses the m$^{th}$ reconstructed data as an example for description.

The partial data or all data of the retrieval descriptor means some or all components of the retrieval descriptor. A component of the retrieval descriptor is a value of one dimension of the vector of the retrieval descriptor. For example, the retrieval descriptor may be a vector, for example, an M-dimensional vector, where each dimension of the M dimensions is a component of the vector.

Similar to S102A, an execution body of this embodiment may perform retrieval in the m$^{th}$ reconstructed data of the P 3D map descriptors by using partial data or all data of the retrieval descriptor, to obtain Q 3D map descriptors that are most similar to or most related to the m$^{th}$ reconstructed data of the retrieval descriptor, where Q may be less than P. It may also be understood that another 3D map descriptor subset is obtained through stage-j retrieval, and a quantity of 3D map descriptors in this 3D map descriptor subset is less than the quantity of 3D map descriptors obtained through stage-i retrieval.

A similarity or correlation between m$^{th}$ reconstructed data of each of the Q 3D map descriptors and partial data or all data of the retrieval descriptor is higher than that for other 3D map descriptors in the P 3D map descriptors except the Q 3D map descriptors. There may be many implementations of calculating the similarity or correlation. For example, second distances of two 3D map descriptors (between m$^{th}$ reconstructed data of the 3D map descriptors and partial data or all data of the retrieval descriptor) are calculated, to determine correlations of the two 3D map descriptors. The second distance may include but is not limited to a Euclidean distance, an inner product distance, a cosine distance, a Manhattan distance, and the like. For example, a smaller Euclidean distance indicates a higher correlation, and a larger inner product distance indicates a higher correlation.

Certainly, it may be understood that, after S104A, a condition determining step may be performed. When a condition is satisfied, the retrieval in this embodiment may end. When the condition is not satisfied, one-stage or multi-stage retrieval may continue to be performed. The condition may be any condition, and may be properly set as required. For example, the condition may be that a similarity or correlation is greater than or equal to a preset threshold, or may be that a quantity of 3D map descriptors obtained through retrieval is less than or equal to a preset quantity, or the like. For another example, the condition may be that the following N 3D map descriptors used for positioning are obtained through retrieval.

The method for retrieving a 3D map in this embodiment of this application is a segment of a procedure. Before and/or after the segment of the procedure, another-stage retrieval at another stage may be further included. In other words, the method for retrieving a 3D map may include multi-stage retrieval with more stages than that shown in FIG. 5A, for example, three stages, four stages, or five stages. For example, before S101A in the embodiment shown in FIG. 5A, there may be more stages of retrieval, or after S104A in the embodiment shown in FIG. 5A, there may be more stages of retrieval. Examples are not described one by one herein.

In some embodiments, the Q 3D map descriptors obtained through multi-stage retrieval may be used for positioning. If 3D map points corresponding to N 3D map descriptors in the Q 3D map descriptors match a 3D map point corresponding to the retrieval descriptor, positioning may be performed based on the 3D map points corresponding to the N 3D map descriptors, to obtain pose information of an electronic device, where the electronic device may be the electronic device that collects the visual information, and $0 < N \leq Q$.

In this embodiment, the binary data of the S 3D map descriptors is extracted from the compressed data of the S 3D map descriptors, and the stage-i retrieval is performed in the binary data of the S 3D map descriptors based on the binary data of the retrieval descriptor, to obtain the P 3D map descriptors through screening. The stage-m decompression is performed on the compressed data of the P 3D map descriptors to obtain the reconstructed data of the P 3D map descriptors, and the stage-j retrieval is performed in the reconstructed data of the P 3D map descriptors based on partial data or all data of the retrieval descriptor, to obtain fewer 3D map descriptors through screening. Binary data in the compressed data is used for one stage of retrieval in the at least two stages of retrieval, to improve a retrieval speed, and the reconstructed data obtained through decompression is used for another stage of retrieval, to ensure retrieval accuracy. Compared with retrieval in reconstructed data of the 3D map obtained through complete decompression, the method for retrieving a 3D map provided in this embodiment of this application can improve retrieval performance.

Refer to FIG. 5B. FIG. 5B is a schematic flowchart of a segment of a method for retrieving a 3D map according to an embodiment of this application. In some implementations, the method may be applied to the electronic device in any one of examples of FIG. 1 to FIG. 4f, or may be applied to the server in any one of examples of FIG. 1 to FIG. 4f. The method includes but is not limited to the following steps.

S101B: Extract first binary data of S 3D map descriptors from compressed data of the S 3D map descriptors, where the S 3D map descriptors correspond to a plurality of 3D map points of a 3D map.

The first binary data may be any one of first binary data, second binary data, . . . , $n^{th}$ binary data, or the like, where n is a positive integer. It should be understood that "first", "second", and "third" in the first binary data, the second binary data, the third binary data, and the like are not in a sequential order, and are merely used for distinguishing between each other. The following uses the $n^{th}$ binary data as an example for description.

The $n^{th}$ binary data of the S 3D map descriptors is extracted from the compressed data of the S 3D map descriptors, where the S 3D map descriptors correspond to a plurality of 3D map points on the 3D map.

S102B: Perform stage-i retrieval in the first binary data of the S 3D map descriptors based on first binary data of a retrieval descriptor, to obtain P 3D map descriptors.

The following uses the $n^{th}$ binary data as an example for description. The stage-i retrieval may be performed in the $n^{th}$ binary data of the S 3D map descriptors based on $n^{th}$ binary data of the retrieval descriptor, to obtain the P 3D map descriptors.

For specific explanations and descriptions of S101B and S102B, refer to S101A and S102A in the embodiment shown in FIG. 5A.

S103B: Extract second binary data of the P 3D map descriptors from compressed data of the P 3D map descriptors.

The second binary data may be any one of second binary data, third binary data, . . . $q^{th}$ binary data, or the like, where q is a positive integer. It should be understood that "second" and "third" in the second binary data, the third binary data, and the like are not in a sequential order, and are merely used for distinguishing between each other. The following uses the $q^{h}$ binary data as an example for description. In an example, $q=n+1$.

The P 3D map descriptors may be obtained through screening from the S 3D map descriptors in S101B and S102B, and then the $q^{th}$ binary data of the P 3D map descriptors is extracted from the compressed data of the P 3D map descriptors, to further perform retrieval based on the $q^{th}$ binary data. The $q^{h}$ binary data of the P 3D map descriptors may be partial data or all data of compressed data of each of the P 3D map descriptors. For example, the $q^{th}$ binary data of the P 3D map descriptors may be partial or all binary data of each of the P 3D map descriptors.

$n^{th}$ binary data of each 3D map descriptor of the S 3D map descriptors is different from $q^{th}$ binary data of each 3D map descriptor of the P 3D map descriptors. In an implementable manner, the difference may be a difference in length. To be specific, a length of the $n^{h}$ binary data of each 3D map descriptor of the S 3D map descriptors is different from a length of the $q^{th}$ binary data of each 3D map descriptor of the P 3D map descriptors. In another implementable manner, the difference may be a difference between binarization manners corresponding to the $n^{th}$ binary data and the $q^{th}$ binary data. To be specific, a binarization manner corresponding to the $n^{th}$ binary data of each 3D map descriptor of the S 3D map descriptors is different from a binarization manner corresponding to the $q^{th}$ binary data of each 3D map descriptor of the P 3D map descriptors. For example, the $n^{th}$ binary data of each 3D map descriptor of the S 3D map descriptors is obtained in a binarization manner (for example, locality-sensitive hashing), and each 3D map descriptor of the P 3D map descriptors is obtained in another binarization manner (for example, spectral hashing).

The length of the $n^{th}$ binary data may be measured or represented by using a quantity of bits in the $n^{th}$ binary data. Similarly, the length of the $q^{th}$ binary data may be measured or represented by using a quantity of bits in the $q^{th}$ binary data.

When the P 3D map descriptors belong to the S 3D map descriptors (P<S), a location of the $n^{th}$ binary data of each 3D map descriptor of the P 3D map descriptors in compressed data of the 3D map descriptor is different from a location of the $q^{th}$ binary data of the 3D map descriptor in the compressed data of the 3D map descriptor. The location may be a start location, an end location, or the like.

In an example, a component of an original 3D map descriptor corresponding to the $n^{th}$ binary data of each 3D map descriptor of the P 3D map descriptors is different from a component of an original 3D map descriptor corresponding to the $q^{th}$ binary data of a corresponding 3D map descriptor. That is, $n^{th}$ binary data of a 3D map descriptor may be binary data of a first part (for example, a component in the first 128 dimensions of the 3D map descriptor) of the 3D map descriptor, and $q^{th}$ binary data of the 3D map descriptor may be binary data of a second part (for example, a component in the last 128 dimensions of the 3D map descriptor) of the 3D map descriptor.

When the P 3D map descriptors belong to the S 3D map descriptors (P<S), a length of the $n^{th}$ binary data of each 3D map descriptor of the P 3D map descriptors may be less than a length of the $q^{th}$ binary data of each 3D map descriptor of the P 3D map descriptors. The length of the $n^{th}$ binary data of each 3D map descriptor in the stage-i retrieval is smaller, to improve a retrieval speed, and the length of the $q^{th}$ binary data of the 3D map descriptor in the stage-j retrieval is larger, to improve retrieval accuracy. A retrieval speed and retrieval accuracy are comprehensively improved through differentiated at least two-stage retrieval. Alternatively, a length of the $n^{th}$ binary data of each 3D map descriptor of the P 3D map descriptors may be greater than a length of the $q^{th}$ binary data of each 3D map descriptor of the P 3D map descriptors. Alternatively, a length of the $n^{th}$ binary data of each 3D map descriptor of the P 3D map descriptors may be equal to a length of the $q^{th}$ binary data of each 3D map descriptor of the P 3D map descriptors.

S104B: Perform stage-j retrieval in the second binary data of the P 3D map descriptors based on second binary data of the retrieval descriptor, to obtain Q 3D map descriptors.

The following uses the $q^{th}$ binary data as an example for description.

The stage-j retrieval is performed in the $q^{th}$ binary data of the P 3D map descriptors based on $q^{th}$ binary data of the retrieval descriptor, to obtain the Q 3D map descriptors.

S, P, Q, i, and j are positive integers, 0<Q<P, 0<P<T, 0<S≤T, T represents a total quantity of 3D map descriptors in the 3D map, j=i+1, 1≤i<L, 1<j≤L, L represents a total quantity of retrieval stages of the 3D map or a retrieval stage quantity threshold, and L is a positive integer greater than 1.

The $q^{th}$ binary data of the retrieval descriptor may be partial or all binary data of the retrieval descriptor. In an example, an execution body of this embodiment may perform binarization on the retrieval descriptor to obtain binary data of the retrieval descriptor, and select (also referred to as "extract") a part or all of the binary data of the retrieval descriptor as an $(n+1)^{th}$ representation of the retrieval descriptor. It should be noted that the $n^{th}$ binary data of the retrieval descriptor may be the same as or different from the $q^{th}$ binary data of the retrieval descriptor.

Similar to S102B, the execution body of this embodiment may perform retrieval in the $q^{th}$ binary data of the P 3D map descriptors by using the $q^{th}$ binary data of the retrieval descriptor, to obtain Q 3D map descriptors that are most similar to or most related to the $q^{th}$ binary data of the retrieval descriptor, where Q may be less than P. It may also be understood that another 3D map descriptor subset is obtained through stage-j retrieval, and a quantity of 3D map descriptors in this 3D map descriptor subset is less than the quantity of 3D map descriptors obtained through stage-i retrieval.

A similarity or correlation between $q^{th}$ binary data of each of the Q 3D map descriptors and the $q^{th}$ binary data of the retrieval descriptor is higher than that for other 3D map descriptors in the P 3D map descriptors except the Q 3D map descriptors. For explanations and descriptions of a manner of calculating the similarity or correlation, refer to related explanations and descriptions of S102B. Details are not described herein again.

Optionally, both retrieval manners used for the stage-i retrieval in S102B and the stage-j retrieval in S104B are retrieval based on a first distance. For specific explanations and descriptions thereof, refer to the explanations and descriptions of S102A in the embodiment shown in FIG. 5A. Details are not described herein again.

Certainly, it may be understood that, after S104B, a condition determining step may be performed. When a condition is satisfied, the retrieval in this embodiment may end. When the condition is not satisfied, one-stage or multi-stage retrieval may continue to be performed. The condition may be any condition, and may be properly set as required. For example, the condition may be that a similarity or correlation is greater than or equal to a preset threshold, or may be that a quantity of 3D map descriptors obtained through retrieval is less than or equal to a preset quantity, or the like. Examples are not described one by one in this embodiment of this application.

The method for retrieving a 3D map in this embodiment of this application is a segment of a procedure. Before and/or after the segment of the procedure, another-stage retrieval at another stage may be further included. In other words, the method for retrieving a 3D map may include multi-stage retrieval with more stages than that shown in FIG. 5B, for example, three stages, four stages, or five stages. For example, before S101B in the embodiment shown in FIG. 5B, there may be more stages of retrieval, or after S104B in the embodiment shown in FIG. 5B, there may be more stages of retrieval. Examples are not described one by one herein.

In some embodiments, the Q 3D map descriptors obtained through multi-stage retrieval may be used for positioning. If 3D map points corresponding to N 3D map descriptors in the Q 3D map descriptors match a 3D map point corresponding to the retrieval descriptor, positioning may be performed based on the 3D map points corresponding to the N 3D map descriptors, to obtain pose information of an electronic device, where the electronic device may be the electronic device that collects the visual information, and 0<N<Q.

In this embodiment, the first binary data of the S 3D map descriptors is extracted from the compressed data of the S 3D map descriptors, and the stage-i retrieval is performed in the first binary data of the S 3D map descriptors based on the first binary data of the retrieval descriptor, to obtain P 3D map descriptors through screening. The second binary data of the P 3D map descriptors is extracted from the compressed data of the P 3D map descriptors, and the stage-j retrieval is performed in the second binary data of the P 3D map descriptors based on the second binary data of the retrieval descriptor, to obtain fewer 3D map descriptors through screening. Extraction of binary data of 3D map descriptors from the compressed data for one-stage retrieval is performed alternately with the one-stage retrieval, to perform at least two-stage retrieval in the 3D map in a compressed state, so as to obtain retrieved 3D map descriptors. Information content carried in binary data of a 3D map descriptor used by each of any two stages of retrieval is different, or information integrity of binary data of a 3D map descriptor used by each of any two stages of retrieval is different. This can improve a retrieval speed and ensure retrieval accuracy when compared with retrieval in reconstructed data of the 3D map obtained through complete decompression.

Refer to FIG. 5C. FIG. 5C is a schematic flowchart of a segment of a method for retrieving a 3D map according to an embodiment of this application. In some implementations, the method may be applied to the electronic device in any one of examples of FIG. 1 to FIG. 4f, or may be applied to the server in any one of examples of FIG. 1 to FIG. 4f. The method includes but is not limited to the following steps.

S101C: Perform stage-m decompression on compressed data of S 3D map descriptors to obtain first reconstructed data of the S 3D map descriptors, where the S 3D map descriptors correspond to a plurality of 3D map points of a 3D map.

The first reconstructed data may be any one of first reconstructed data, second reconstructed data, . . . , $m^{th}$ reconstructed data, or the like, where m is a positive integer. It should be understood that "first", "second", and "third" in the first reconstructed data, the second reconstructed data, the third reconstructed data, and the like are not in a sequential order, and are merely used for distinguishing between each other. An example in which the first reconstructed data is $m^{th}$ reconstructed data is used as an example for description below.

The stage-m decompression is performed on the compressed data of the S 3D map descriptors to obtain $m^{th}$ reconstructed data of the S 3D map descriptors, where the S 3D map descriptors correspond to a plurality of 3D map points of the 3D map.

S and m are positive integers. S represents a quantity of 3D map descriptors that need to be retrieved in stage-i retrieval. S<T, where T represents a total quantity of 3D map descriptors in the 3D map.

A quantity of the plurality of 3D map points corresponding to the S 3D map descriptors may be greater than S, or may be equal to S.

The compressed data of the S 3D map descriptors may be obtained through compression on the S area descriptors or the S 3D map point descriptors. The compression herein may include quantization. Optionally, the compression may further include at least one of the following: binarization, prediction, entropy coding, or the like.

The $m^{th}$ reconstructed data of the S 3D map descriptors is obtained by performing the stage-m decompression on partial data of each of the compressed data of the S 3D map descriptors.

m is a positive integer. The stage-m decompression may include dequantization. The stage-m decompression may be staged decompression (that is, a part of complete decompression).

The $m^{th}$ reconstructed data of the S 3D map descriptors may be obtained by performing the stage-m decompression on partial data of the compressed data of each of the S 3D map descriptors. For example, the $m^{th}$ reconstructed data of the S 3D map descriptors may be dequantized data obtained by performing dequantization on a part of the compressed data of each of the S 3D map descriptors. It should be noted that the dequantized data may also be referred to as reconstructed data, and the reconstructed data may be obtained in a dequantization manner in a conventional technology. For another example, dequantization is performed on a part of the quantized data (a part of the compressed data) of each of the S 3D map descriptors to obtain S pieces of dequantized data, and then the $m^{th}$ reconstructed data of the S 3D map descriptors may be obtained based on the S pieces of dequantized data and a part of binary data (a part of the compressed data) of each of the S 3D map descriptors.

In some embodiments, the stage-m decompression may further include other decompression such as entropy decoding and prediction. Examples are not described one by one in this embodiment of this application.

S102C: Perform stage-i retrieval in the first reconstructed data of the S 3D map descriptors based on partial data or all data of a retrieval descriptor, to obtain P 3D map descriptors.

An example in which the first reconstructed data is $m^{th}$ reconstructed data is used as an example for description below.

The stage-i retrieval is performed in the $m^{th}$ reconstructed data of the S 3D map descriptors based on partial data or all data of the retrieval descriptor, to obtain the P 3D map descriptors.

The partial data or all data of the retrieval descriptor means some or all components of the retrieval descriptor. A component of the retrieval descriptor is a value of one dimension of the vector of the retrieval descriptor. For example, the retrieval descriptor may be a vector, for example, an M-dimensional vector, where each dimension of the M dimensions is a component of the vector.

An execution body of this embodiment may perform retrieval in the $m^{th}$ reconstructed data of the S 3D map descriptors by using partial data or all data of the retrieval descriptor, to obtain P 3D map descriptors that are most similar to or most related to $m^{th}$ reconstructed data of the retrieval descriptor.

In some embodiments, P<S. For example, a 3D map descriptor subset is obtained through stage-i retrieval, and a quantity of 3D map descriptors in the 3D map description subset is less than a quantity of 3D map descriptors in a 3D map description subset existing before the stage-i retrieval. In some embodiments, P may be greater than S. For specific explanations and descriptions thereof, refer to the following explanations and descriptions of the embodiment shown in FIG. 7, and details are not described herein again.

When P<S, that is, the P 3D map descriptors belong to the S 3D map descriptors, a similarity or correlation between $m^{th}$ reconstructed data of each of the P 3D map descriptors and partial data or all data of the retrieval descriptor is higher than that for other 3D map descriptors in the S 3D map descriptors except the P 3D map descriptors. There may be many implementations of calculating the similarity or correlation. For example, second distances of two 3D map descriptors (between $k^{th}$ reconstructed data of the 3D map descriptors and partial data or all data of the retrieval descriptor) are calculated, to determine correlations of the two 3D map descriptors. The second distance may include but is not limited to a Euclidean distance, an inner product distance, a cosine distance, a Manhattan distance, and the like. For example, a smaller Euclidean distance indicates a higher correlation, and a larger inner product distance indicates a higher correlation.

S103C: Perform stage-k decompression on compressed data of the P 3D map descriptors to obtain second reconstructed data of the P 3D map descriptors, where a decompression process of the compressed data of the S 3D map descriptors includes the stage-m decompression and the stage-k decompression, or a decompression process of the compressed data of the S 3D map descriptors includes the stage-k decompression and the stage-k decompression includes the stage-m decompression.

The second reconstructed data may be any one of second reconstructed data, third reconstructed data, . . . , $k^{th}$ reconstructed data, or the like, where k is a positive integer, and m<k. It should be understood that "second" and "third" in the second reconstructed data, the third reconstructed data, and the like are not in a sequential order, and are merely used for distinguishing between each other. An example in which the second reconstructed data is $k^{th}$ reconstructed data is used as an example for description below.

The stage-k decompression is performed on the compressed data of the P 3D map descriptors to obtain $k^{th}$ reconstructed data of the P 3D map descriptors, where a decompression process of the compressed data of the S 3D map descriptors includes the stage-m decompression and the stage-k decompression, or a decompression process of the compressed data of the S 3D map descriptors includes the stage-k decompression and the stage-k decompression includes the stage-m decompression.

The P 3D map descriptors may be obtained through screening from the S 3D map descriptors in S101C and S102C, and then the stage-k decompression is performed on the compressed data of the P 3D map descriptors to obtain the $k^{th}$ reconstructed data of the P 3D map descriptors, so as to further perform retrieval based on the $k^{th}$ reconstructed data. In some embodiments, k=m+1.

The $k^{th}$ reconstructed data of the P 3D map descriptors may be obtained by performing the stage-k decompression on partial data or all data of compressed data of each of the P 3D map descriptors.

In some embodiments, both retrieval manners used for the stage-i retrieval and the stage-j retrieval are retrieval manners based on a second distance, the P 3D map descriptors belong to the S 3D map descriptors, and a distortion of $m^{th}$ reconstructed data of each 3D map descriptor of the P 3D map descriptors is different from a distortion of $k^{th}$ reconstructed data of each 3D map descriptor of the P 3D map descriptors. The distortion of the $m^{th}$ reconstructed data of each 3D map descriptor of the P 3D map descriptors indicates a degree of a difference between the $m^{th}$ reconstructed data of each 3D map descriptor and a corresponding original 3D map descriptor, the distortion of the $k^{th}$ reconstructed data of each 3D map descriptor of the P 3D map descriptors indicates a degree of a difference between the $k^{th}$ reconstructed data of each 3D map descriptor and a corresponding original 3D map descriptor, where P<S.

In some embodiments, the distortion of the $m^{th}$ reconstructed data of each 3D map descriptor of the P 3D map descriptors is greater than the distortion of the $k^{th}$ reconstructed data of each 3D map descriptor of the P 3D map descriptors. In at least two stages of retrieval, a result of a next stage retrieval is smaller than a distortion of a previous stage of retrieval, thereby improving accuracy of a retrieval result.

For example, the P 3D map descriptors belong to the S 3D map descriptors. One of the P 3D map descriptors is used as an example, where m=1, and k=2. Compressed data of the 3D map descriptor includes first quantized data and second quantized data. First reconstructed data of the 3D map descriptor is obtained by performing stage-1 decompression on the first quantized data, and the first reconstructed data of the 3D map descriptor may include reconstructed data of some components of an original vector of the 3D map descriptor. Second reconstructed data of the 3D map descriptor is obtained by performing stage-2 decompression on the second quantized data, and the second reconstructed data of the 3D map descriptor may include reconstructed data of some other components of the original vector of the 3D map descriptor. That is, a decompression process of the compressed data of the 3D map descriptor includes stage-1 (m=1) decompression and stage-2 (k=2) decompression.

For example, the P 3D map descriptors belong to the S 3D map descriptors. One of the P 3D map descriptors is used as an example, where m=1, and k=2. Compressed data of the 3D map descriptor includes first quantized data and second quantized data. Different from the foregoing example, the second quantized data herein may be obtained after quantization is performed on residual data of the first quantized data, first reconstructed data of the 3D map descriptor is obtained by performing stage-1 decompression on the first quantized data, and the first reconstructed data of the 3D map descriptor may include first reconstructed data (reconstructed data with low precision) of an original vector of the 3D map descriptor. Second reconstructed data of the 3D map descriptor is obtained by performing stage-2 decompression on the second quantized data, and the second reconstructed data of the 3D map descriptor may include reconstructed data of the residual data of the 3D map descriptor. The first reconstructed data of the 3D map descriptor and the second reconstructed data of the 3D map descriptor are added up, to obtain reconstructed data (reconstructed data with high precision) of the original vector of the 3D map descriptor. That is, a decompression process of the compressed data of the 3D map descriptor includes stage-2 (k=2) decompression, and the stage-2 (k=2) decompression includes stage-1 (m=1) decompression.

S104C: Perform stage-j retrieval in the second reconstructed data of the P 3D map descriptors based on partial data or all data of the retrieval descriptor, to obtain Q 3D map descriptors.

An example in which the second reconstructed data is $k^{th}$ reconstructed data is used as an example for description below.

The stage-j retrieval is performed in the $k^{th}$ reconstructed data of the P 3D map descriptors based on partial data or all data of the retrieval descriptor, to obtain the Q 3D map descriptors.

S. P, Q, i, j, k, and m are positive integers, 0<Q<P, 0<P<T, 0<S≤T, T represents a total quantity of 3D map descriptors in the 3D map, j=i+1, 1≤i<L, 1<j≤L, L represents a total quantity of retrieval stages of the 3D map or a retrieval stage quantity threshold, and L is a positive integer greater than 1.

For specific explanations and descriptions of S104C, refer to the explanations and descriptions of S104A in the embodiment shown in FIG. 5A. Details are not described herein again.

Certainly, it may be understood that, after S104C, a condition determining step may be performed. When a condition is satisfied, the retrieval in this embodiment may end. When the condition is not satisfied, one-stage or multi-stage retrieval may continue to be performed. The condition may be any condition, and may be properly set as required. For example, the condition may be that a similarity or correlation is greater than or equal to a preset threshold, or may be that a quantity of 3D map descriptors obtained through retrieval is less than or equal to a preset quantity, or the like. Examples are not described one by one in this embodiment of this application.

The method for retrieving a 3D map in this embodiment of this application is a segment of a procedure. Before and/or after the segment of the procedure, another-stage retrieval at another stage may be further included. In other words, the method for retrieving a 3D map may include multi-stage retrieval with more stages than that shown in FIG. 5C, for example, three stages, four stages, or five stages. For example, before S101C in the embodiment shown in FIG. 5C, there may be more stages of retrieval, or after S104C in the embodiment shown in FIG. 5C, there may be more stages of retrieval. Examples are not described one by one herein.

In some embodiments, the Q 3D map descriptors obtained through multi-stage retrieval may be used for positioning. If 3D map points corresponding to N 3D map descriptors in the Q 3D map descriptors match a 3D map point corresponding to the retrieval descriptor, positioning may be performed based on the 3D map points corresponding to the N 3D map descriptors, to obtain pose information of an electronic device, where the electronic device may be the electronic device that collects the visual information, and 0<N<Q.

In this embodiment, the stage-m decompression is performed on the compressed data of the S 3D map descriptors to obtain the first reconstructed data of the S 3D map descriptors, and the stage-i retrieval is performed in the first reconstructed data of the S 3D map descriptors based on partial data or all data of the retrieval descriptor, to obtain the P 3D map descriptors through screening. The stage-k decompression is performed on the compressed data of the P 3D map descriptors to obtain the second reconstructed data of the P 3D map descriptors, and the stage-j retrieval is performed in the second reconstructed data of the P 3D map descriptors based on partial data or all data of the retrieval descriptor, to obtain fewer 3D map descriptors through screening. Decompression to obtain reconstructed data of 3D map descriptors for one-stage retrieval is performed alternately with the one-stage retrieval. In at least two stages of retrieval, one stage of retrieval is staged decompression, to improve a retrieval speed. A differentiated decompression setting for the at least two stages of retrieval can ensure retrieval accuracy. Reconstructed data of 3D map descriptors used by any two stages of retrieval has different decompression degrees or distortions. This can improve a retrieval speed and ensure retrieval accuracy when compared with retrieval in reconstructed data of the 3D map obtained through complete decompression.

Refer to FIG. 5D. FIG. 5D is a schematic flowchart of a segment of a method for retrieving a 3D map according to an embodiment of this application. In some implementations, the method may be applied to the electronic device in any one of examples of FIG. 1 to FIG. 4f, or may be applied to the server in any one of examples of FIG. 1 to FIG. 4f. The method includes but is not limited to the following steps.

S101D: Perform stage-m decompression on compressed data of S 3D map descriptors to obtain reconstructed data of the S 3D map descriptors, where the S 3D map descriptors correspond to a plurality of 3D map points of a 3D map.

The reconstructed data may be any one of first reconstructed data, second reconstructed data, . . . , $m^{th}$ reconstructed data, or the like, where m is a positive integer. It should be understood that "first", "second", and "third" in the first reconstructed data, the second reconstructed data, the third reconstructed data, and the like are not in a sequential order, and are merely used for distinguishing between each other. An example in which the reconstructed data is $m^{th}$ reconstructed data is used as an example for description below.

The stage-m decompression is performed on the compressed data of the S 3D map descriptors to obtain reconstructed data of the S 3D map descriptors, where the S 3D map descriptors correspond to a plurality of 3D map points of the 3D map.

S102D: Perform stage-i retrieval in the reconstructed data of the S 3D map descriptors based on partial data or all data of a retrieval descriptor, to obtain P 3D map descriptors.

For explanations and descriptions of S101D and S102D, refer to the explanations and descriptions of S101C and S102C in FIG. 5C. Details are not described herein again.

S103D: Extract binary data of the P 3D map descriptors from compressed data of the P 3D map descriptors.

S104D: Perform stage-j retrieval in the binary data of the P 3D map descriptors based on binary data of the retrieval descriptor, to obtain Q 3D map descriptors.

S, P, Q, i, m, and j are positive integers, 0<Q<P, 0<P<T, 0<S≤T, T represents a total quantity of 3D map descriptors in the 3D map, j=i+1, 1≤i<L, 1<j≤L, L represents a total quantity of retrieval stages of the 3D map or a retrieval stage quantity threshold, and L is a positive integer greater than 1.

For explanations and descriptions of S103D and S104D, refer to the explanations and descriptions of S103B and S104B in FIG. 5B. Details are not described herein again.

In this embodiment, the stage-m decompression is performed on the compressed data of the S 3D map descriptors to obtain the reconstructed data of the S 3D map descriptors, and the stage-i retrieval is performed in the reconstructed data of the S 3D map descriptors based on partial data or all data of the retrieval descriptor, to obtain the P 3D map descriptors through screening. The binary data of the P descriptors is extracted from the compressed data of the P 3D map descriptors, and the stage-j retrieval is performed in the binary data of the P 3D map descriptors based on the binary data of the retrieval descriptor, to obtain fewer 3D map descriptors through screening. Extraction or decompression from the compressed data and retrieval are alternately performed, to perform multi-stage retrieval in the 3D map, to obtain a 3D map descriptor that can be used for positioning. One stage of retrieval in at least two stages of retrieval is decompression, to improve retrieval accuracy, and one stage of retrieval in the at least two stages of retrieval is extraction from compressed data, to improve a retrieval speed. Compared with retrieval in the reconstructed data, obtained through complete decompression, of the 3D map, the method for retrieving a 3D map provided in this embodiment of this application can improve a retrieval speed and ensure retrieval accuracy.

It should be noted that the retrieval method procedures shown in FIG. 5A to FIG. 5C may be flexibly combined to form various different multi-stage retrieval methods.

Refer to FIG. 6. FIG. 6 is a schematic flowchart of a method for retrieving a 3D map according to an embodiment of this application. In some implementations, the method may be applied to the electronic device in any one of examples of FIG. 1 to FIG. 4f, or may be applied to the server in any one of examples of FIG. 1 to FIG. 4f. In this embodiment, an example in which multi-stage retrieval is 4-stage retrieval is used for description. Stage-1 retrieval and stage-2 retrieval use retrieval manners that are based on a first distance, and stage-3 retrieval and stage-4 retrieval use retrieval manners that are based on a second distance. The method includes but is not limited to the following steps.

Execution of the following method steps in this embodiment of this application starts.

S201: Obtain a retrieval descriptor. The retrieval descriptor is a feature that corresponds to a real environment and that is extracted from visual information collected by a sensor of an electronic device.

For explanations and descriptions of S201, refer to the explanations and descriptions of S102A in the embodiment shown in FIG. 5A. Details are not described herein again.

S202: Extract first (n=1) binary data of $S_1$ 3D map descriptors from compressed data of the $S_1$ 3D map descriptors, and obtain first (n=1) binary data of the retrieval descriptor.

The $S_1$ 3D map descriptors may be $S_1$ area descriptors or $S_1$ 3D map point descriptors. One area descriptor corresponds to a plurality of 3D map points. For specific explanations and descriptions, refer to the explanations and descriptions in the foregoing embodiment. Details are not described herein again.

For explanations and descriptions of the compressed data of the $S_1$ 3D map descriptors, refer to the embodiments shown in FIG. 5A to FIG. 5D. Details are not described herein again.

The first binary data of the retrieval descriptor may be partial binary data of the retrieval descriptor. In an example, an execution body of this embodiment may perform binarization on the retrieval descriptor to obtain the binary data of the retrieval descriptor, and select a part of the binary data of the retrieval descriptor as the first binary data of the retrieval descriptor.

S203: Perform stage-1 (i=1) retrieval in the first binary data of the $S_1$ 3D map descriptors based on the first (n=1) binary data of the retrieval descriptor, to obtain $P_1$ 3D map descriptors.

The execution body of this embodiment may perform first distance-based retrieval in the first (n=1) binary data of the $S_1$ 3D map descriptors by using the first binary data of the retrieval descriptor, to obtain $P_1$ 3D map descriptors that are most similar to or most related to the first binary data of the retrieval descriptor, where $P_1$ is less than $S_1$. It may also be understood that a subset is obtained through retrieval, and a quantity of 3D map descriptors in the subset is less than a quantity of 3D map descriptors in a 3D map description subset existing before the retrieval.

S204: Extract second (n=2) binary data of $P_1$ 3D map descriptors from compressed data of the $P_1$ 3D map descriptors, and obtain second (n=2) binary data of the retrieval descriptor.

The second (n=2) binary data of the retrieval descriptor may be partial or all binary data of the retrieval descriptor. A quantity of bits in the second (n=2) binary data of the retrieval descriptor is different from a quantity of bits in the first (n=1) binary data of the retrieval descriptor. For example, the quantity of bits in the second (n=2) binary data of the retrieval descriptor is greater than the quantity of bits in the first (n=1) binary data of the retrieval descriptor. In this embodiment, bit overheads of the second binary data may be higher than bit overheads of the first binary data. In this way, a retrieval speed of previous-stage retrieval can be improved, and accuracy of next-stage retrieval can be ensured.

S205: Perform stage-2 0=2) retrieval in the second (n=2) binary data of the $P_1$ 3D map descriptors based on the second (n=2) binary data of the retrieval descriptor, to obtain $Q_1$ 3D map descriptors.

The execution body of this embodiment may perform first distance-based retrieval in the second binary data of the $P_1$ 3D map descriptors by using the second binary data of the retrieval descriptor, to obtain $Q_1$ 3D map descriptors that are most similar to or most related to the second binary data of the retrieval descriptor, where $Q_1$ is less than or equal to $P_1$. It may also be understood that another subset is obtained through retrieval, and a quantity of 3D map descriptors in this subset is less than the quantity of 3D map descriptors in the 3D map descriptor subset obtained through retrieval in step 203.

S206: Perform stage-1 (m=1) decompression on compressed data of the $Q_1$ 3D map descriptors to obtain first (m=1) reconstructed data of the $Q_1$ 3D map descriptors.

S207: Perform stage-3 retrieval in the first (m=1) reconstructed data of the $Q_1$ 3D map descriptors based on partial data or all data of the retrieval descriptor, to obtain $Q_2$ 3D map descriptors.

In an example, an execution body of this embodiment may perform second distance-based retrieval in the first (m=1) reconstructed data of the $Q_1$ descriptors by using partial data or all data of the retrieval descriptor, to obtain $Q_2$ 3D map descriptors that are most similar to or most related to partial data or all data of the retrieval descriptor, where $Q_2$ is less than or equal to $Q_1$. It may also be understood that another subset is obtained through retrieval, and a quantity of 3D map descriptors in this subset is less than the quantity of 3D map descriptors in the 3D map descriptor subset obtained through retrieval in step 205.

Compared with previous two stages of retrieval that are based on the first distance, the stage-3 retrieval uses second distance-based retrieval, to improve retrieval accuracy.

S208: Perform stage-2 (k=2) decompression on the $Q_2$ 3D map descriptors to obtain second (k=2) reconstructed data of the $Q_2$ 3D map descriptors.

In an example, distortions of the first (m=1) reconstructed data and the second (k=2) reconstructed data of the 3D map descriptor are different. In this embodiment, the distortion of the first (m=1) reconstructed data of the 3D map descriptor is higher than the distortion of the second (k=2) reconstructed data. In this way, accuracy of next-stage retrieval can be ensured.

S209: Perform stage-4 retrieval in the second (k=2) reconstructed data of the $Q_2$ 3D map descriptors based on all data of the retrieval descriptor, to obtain $Q_3$ 3D map descriptors.

In an example, an execution body of this embodiment may perform retrieval in the second (k=2) reconstructed data of the $Q_2$ 3D map descriptors by using all data of the retrieval descriptor, to obtain $Q_3$ 3D map descriptors that are most similar to or most related to all data of the retrieval descriptor, where $Q_3$ is less than or equal to $Q_2$. It may also be understood that another subset is obtained through retrieval, and a quantity of 3D map descriptors in this subset is less than the quantity of 3D map descriptors in the 3D map descriptor subset obtained through retrieval in step 207.

S210: Perform positioning based on 3D map points corresponding to the $Q_3$ 3D map descriptors, to obtain pose information of the electronic device.

In this embodiment, binary data of a 3D map descriptor is extracted from compressed data, or reconstructed data of the 3D map descriptor is obtained by decompressing the compressed data, which is performed alternately with stage-1 retrieval, to perform multi-stage retrieval in a 3D map, so as to obtain a 3D map descriptor that can be used for positioning. This can improve a retrieval speed and ensure retrieval accuracy when compared with retrieval in reconstructed data of the 3D map obtained through complete decompression.

Figure 7:
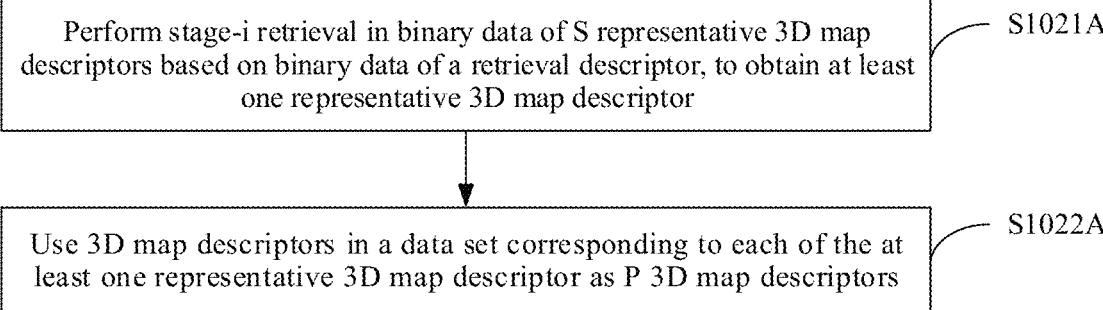
FIG. 7 is a schematic flowchart of a method for retrieving a 3D map according to an embodiment of this application.

Refer to FIG. 7. FIG. 7 is a schematic flowchart of a method for retrieving a 3D map according to an embodiment of this application. In some implementations, the method may be applied to the electronic device in any one of examples of FIG. 1 to FIG. 4f, or may be applied to the server in any one of examples of FIG. 1 to FIG. 4f. This embodiment is described by using an example in which the S 3D map descriptors in the embodiment shown in FIG. 5A are S representative 3D map descriptors. Each of the S representative 3D map descriptors corresponds to at least one data set. An exemplary implementation of 102A in FIG. 5A may include but is not limited to the following steps.

S1021: Perform stage-i retrieval in binary data of the S representative 3D map descriptors based on binary data of a retrieval descriptor, to obtain at least one representative 3D map descriptor.

The at least one representative 3D map descriptor corresponds to at least one data set, and each of the at least one data set includes compressed data of a plurality of 3D map descriptors. 3D map descriptors in each data set have a correlation or similarity.

For the binary data of the S representative 3D map descriptors, the binary data of the retrieval descriptor may be partial or all binary data of the retrieval descriptor. An execution body of this embodiment may perform first distance-based retrieval in the binary data of the S representative 3D map descriptors by using the binary data of the retrieval descriptor, to obtain at least one representative 3D map descriptor that is most similar to or most related to the binary data of the retrieval descriptor. A quantity of the at least one representative 3D map descriptor is less than or equal to S.

S1022: Use 3D map descriptors in a data set corresponding to each of the at least one representative 3D map descriptor as P 3D map descriptors.

The at least one representative 3D map descriptor is obtained through retrieval, to obtain at least one data set, so as to obtain compressed data of the P 3D map descriptors in the at least one data set.

For example, the S representative 3D map descriptors are $T_1$, $T_2$, and $T_3$, $T_1$ corresponds to a data set 1, $T_2$ corresponds to a data set 2, and $T_3$ corresponds to a data set 3. At least one representative 3D map descriptor $T_3$ is obtained through retrieval, to obtain a data set 3, where the data set 3 may include compressed data of P 3D map descriptors.

In this embodiment, one-stage retrieval is performed in fewer representative 3D map descriptors, to improve a retrieval speed. Then, one-stage or multi-stage retrieval may be performed in a data set corresponding to the representative 3D map descriptor, to improve retrieval accuracy. This can improve a retrieval speed and ensure retrieval accuracy when compared with retrieval in reconstructed data of the 3D map obtained through complete decompression.

It should be noted that an exemplary implementation in which the S 3D map descriptors in the embodiments shown in FIG. 5C to FIG. 5D are S representative 3D map descriptors is similar to that in the embodiment shown in FIG. 7. For an exemplary implementation of 102B in FIG. 5B, 102C in FIG. 5C, or 102D in FIG. 5D, refer to the embodiment shown in FIG. 7. Details are not described herein again.

Figure 9:
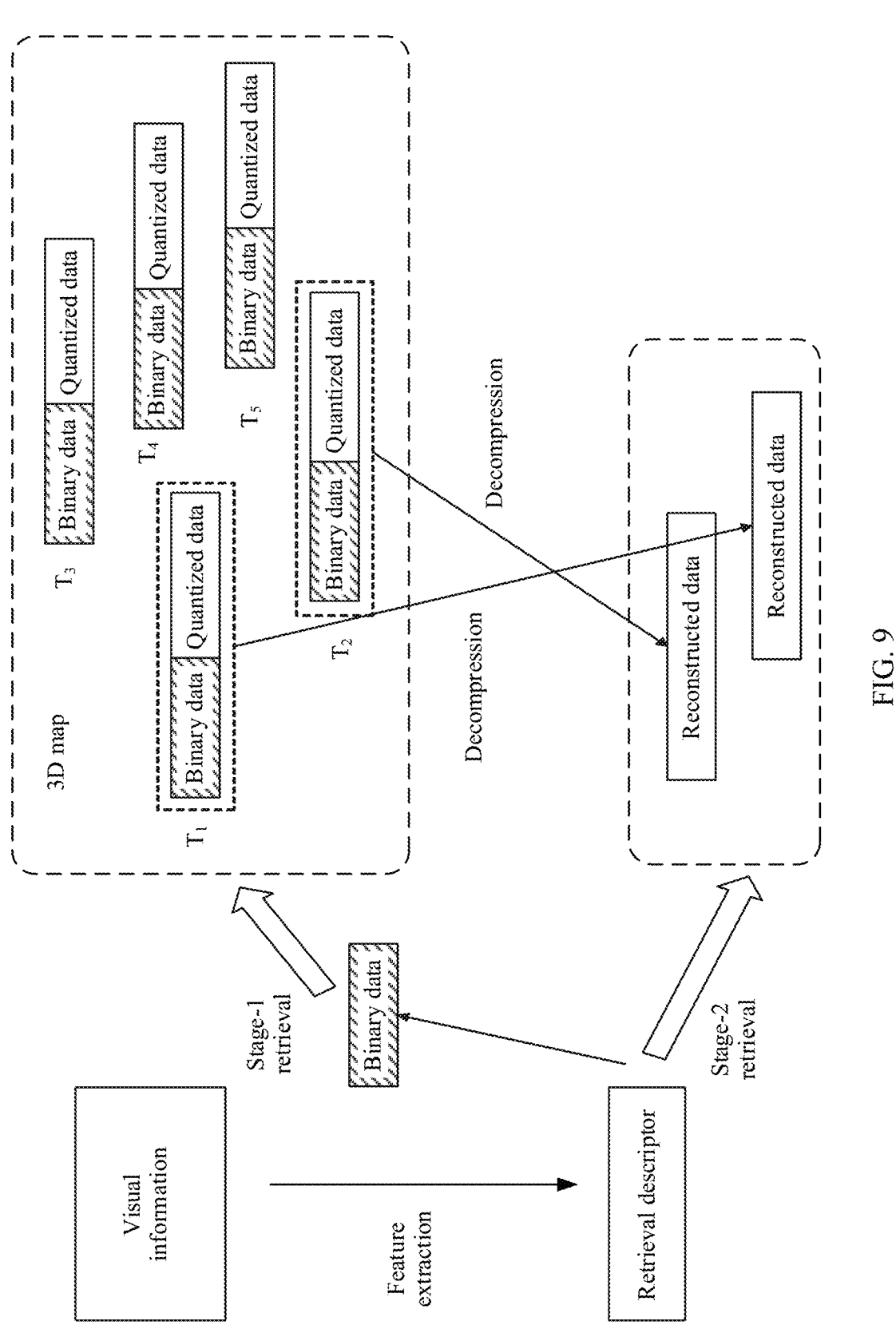
FIG. 9 is a schematic diagram of a processing process of a method for retrieving a 3D map according to an embodiment of this application.

Refer to FIG. 8 and FIG. 9. FIG. 8 is a schematic flowchart of a method for retrieving a 3D map according to an embodiment of this application. FIG. 9 is a schematic diagram of a processing process of a method for retrieving a 3D map according to an embodiment of this application. This embodiment includes a server and an electronic device. The method includes but is not limited to the following steps.

S401: The server determines a magnitude relationship between each component of S 3D map descriptors and a corresponding component of a preset threshold vector based on each component of the S 3D map descriptors and the corresponding component of the preset threshold vector.

S402: The server performs binarization on the magnitude relationship to obtain binary data of each of the S 3D map descriptors.

S403: The server performs quantization on an absolute value of a difference value between each component of the S 3D map descriptors and the corresponding component of the preset threshold vector, to obtain quantized data of each of the S 3D map descriptors.

Each component included in the preset threshold vector is any value.

S404: The server encapsulates the binary data and the quantized data of each of the S 3D map descriptors to obtain a bitstream of a 3D map.

S405. The server sends the bitstream of the 3D map to the electronic device.

S406: The electronic device obtains a retrieval descriptor.

With reference to FIG. 9, the electronic device may extract the retrieval descriptor from visual information collected by a sensor.

S407: The electronic device decapsulates the bitstream of the 3D map to obtain the binary data and the quantized data of each of the S 3D map descriptors, and extracts the binary data of each of the S 3D map descriptors from the binary data and the quantized data of each of the S 3D map descriptors.

With reference to FIG. 9, that the S 3D map descriptors are five 3D map descriptors ($T_1$, $T_2$, $T_3$, $T_4$, and $T_5$) is used as an example. The electronic device may decapsulate the bitstream of the 3D map to obtain binary data and quantized data of each of the five 3D map descriptors shown in FIG. 9.

S408: The electronic device performs stage-1 retrieval in the binary data of each of the S 3D map descriptors based on binary data of the retrieval descriptor, to obtain P 3D map descriptors.

The binary data of the retrieval descriptor is obtained in the following manner: The electronic device may determine a magnitude relationship between each component of the retrieval descriptor and a corresponding component of the preset threshold vector based on each component of the retrieval descriptor and the corresponding component of the preset threshold vector. Binarization is performed on the magnitude relationship to obtain the binary data of the retrieval descriptor. The stage-1 retrieval performed in the binary data of each of the S 3D map descriptors may use a first distance-based retrieval manner.

FIG. 9 is further used as an example for description. The stage-1 retrieval is performed in the five 3D map descriptors ($T_1$, $T_2$, $T_3$, $T_4$, and $T_5$) based on the binary data of the retrieval descriptor. For example, a Hamming distance between binary data of each of five 3D map descriptors ($T_1$, $T_2$, $T_3$, $T_4$, and $T_5$) and the binary data of the retrieval descriptor may be calculated, and a 3D map descriptor is obtained through screening based on the Hamming distance. In this example, two 3D map descriptors are obtained through screening, that is, $T_1$ and $T_2$ in the dashed box shown in FIG. 9 are obtained through screening. That is, P=2.

S409: The electronic device decompresses quantized data of each of the P 3D map descriptors to obtain reconstructed data of each of the P 3D map descriptors.

The electronic device may perform dequantization on the quantized data of each of the P 3D map descriptors to obtain dequantized data of each of the P 3D map descriptors. The reconstructed data of each of the P 3D map descriptors is obtained based on the dequantized data and binary data of each of the P 3D map descriptors.

S410: The electronic device performs stage-2 retrieval in the reconstructed data of each of the P 3D map descriptors based on the retrieval descriptor, to obtain Q 3D map descriptors.

The stage-2 retrieval performed in the reconstructed data of each of the P 3D map descriptors may use a second distance-based retrieval manner.

FIG. 9 is further used as an example for description. The stage-2 retrieval is performed in $T_1$ and $T_2$ based on all components of the retrieval descriptor. For example, a Euclidean distance between reconstructed data of each of $T_1$ and $T_2$ and the retrieval descriptor may be calculated, and a 3D map descriptor is obtained through screening based on the Euclidean distance. In this example, one 3D map descriptor is obtained through screening, that is, $T_1$ shown in FIG. 9 is obtained through screening. That is, Q=1.

In this embodiment, the server compresses the S 3D map descriptors in the 3D map to obtain the binary data and the quantized data of each of the S 3D map descriptors, so as to reduce resource overheads for transmitting the 3D map. The electronic device obtains the binary data of the S 3D map descriptors, and quickly obtains the P 3D map descriptors through screening in the first distance-based retrieval based on the binary data of the retrieval descriptor and the binary data of the S 3D map descriptors, to improve a retrieval speed. The electronic device obtains the reconstructed data of the P 3D map descriptors, and obtains Q 3D map descriptors through precise screening in a second distance-based retrieval manner based on the retrieval descriptor and the reconstructed data of the P 3D map descriptors, to improve retrieval precision.

The foregoing describes in detail the method for retrieving a 3D map in embodiments of this application with reference to accompanying drawings. The following describes an apparatus for retrieving a 3D map in embodiments of this application with reference to FIG. 10 and FIG. 11. It should be understood that the apparatus for retrieving a 3D map can perform the method for retrieving a 3D map in embodiments of this application. To avoid unnecessary repetition, the following appropriately omits repeated descriptions when describing the apparatus for retrieving a 3D map in embodiments of this application.

Figure 10:
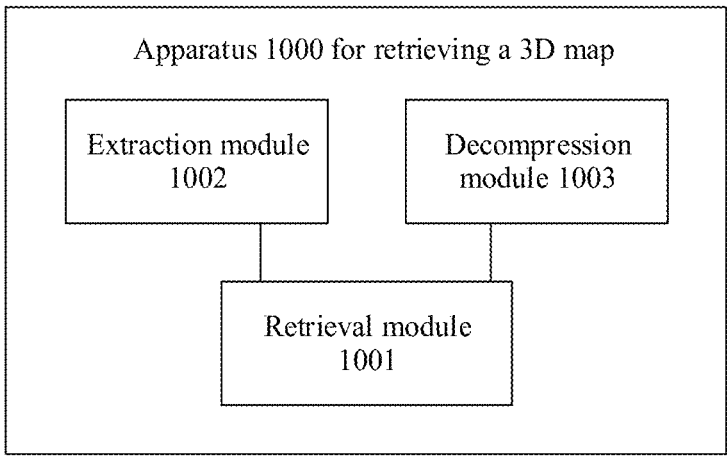
FIG. 10 is a schematic diagram of a structure of an apparatus for retrieving a 3D map according to an embodiment of this application.

Refer to FIG. 10. FIG. 10 is a schematic diagram of a structure of an apparatus for retrieving a 3D map according to an embodiment of this application. As shown in FIG. 10, the apparatus 1000 for retrieving a 3D map may include a retrieval module 1001, an extraction module 1002, and a decompression module 1003.

In a first possible implementation, the extraction module 1002 is configured to extract binary data of S 3D map descriptors from compressed data of the S 3D map descriptors, where the S 3D map descriptors correspond to a plurality of 3D map points of a 3D map. The retrieval module 1001 is configured to perform stage-i retrieval in the binary data of the S 3D map descriptors based on binary data of a retrieval descriptor, to obtain P 3D map descriptors, where the retrieval descriptor is a feature that corresponds to a real environment and that is extracted from visual information collected by a sensor of an electronic device. The decompression module 1003 is configured to perform stage-m decompression on the compressed data of the P 3D map descriptors to obtain reconstructed data of the P 3D map descriptors, where a decompression process of the compressed data of the P 3D map descriptors includes at least the stage-m decompression. The retrieval module 1001 is configured to perform stage-j retrieval in the reconstructed data of the P 3D map descriptors based on partial data or all data of the retrieval descriptor, to obtain Q 3D map descriptors, where S, P, Q, i, j, and m are positive integers, $0<Q<P$, $0<P<T$, $0<S\leq T$, T represents a total quantity of 3D map descriptors in the 3D map, $j=i+1$, $1\leq i<L$, $1<j\leq L$, L represents a total quantity of retrieval stages of the 3D map or a retrieval stage quantity threshold, and L is a positive integer greater than 1.

In some embodiments, N 3D map descriptors in the Q 3D map descriptors are used for positioning, 3D map points corresponding to the N 3D map descriptors match a 3D map point corresponding to the retrieval descriptor, N is a positive integer, $0<N<Q$, and the apparatus further includes a pose determining module. The pose determining module performs positioning based on the 3D map points corresponding to the N 3D map descriptors, to obtain pose information of the electronic device.

In some embodiments, a retrieval manner used for the stage-i retrieval is a retrieval manner based on a first distance, and a retrieval manner used for the stage-j retrieval is a retrieval manner based on a second distance.

In some embodiments, the apparatus further includes an obtaining module, configured to: receive the retrieval descriptor, and perform binarization on the retrieval descriptor to obtain the binary data of the retrieval descriptor; or receive the visual information, extract the retrieval descriptor from the visual information, and perform binarization on the retrieval descriptor to obtain the binary data of the retrieval descriptor; or in response to a visual information collection operation entered by a user, trigger the sensor to perform visual information collection on the real environment to obtain the visual information, extract the retrieval descriptor from the visual information, and perform binarization on the retrieval descriptor to obtain the binary data of the retrieval descriptor.

In some embodiments, when $N<Q$, the decompression module 1003 is further configured to: perform stage-k decompression on compressed data of the Q 3D map descriptors to obtain reconstructed data of the Q 3D map descriptors; and perform stage-r retrieval in the reconstructed data of the Q 3D map descriptors based on partial data or all data of the retrieval descriptor, to obtain the N 3D map descriptors, where $N<Q<P$, and the decompression process of the compressed data of the P 3D map descriptors includes the stage-m decompression and the stage-k decompression, where r and k are positive integers, $m<k$, and $j<r\leq L$.

In some embodiments, the compressed data of the P 3D map descriptors includes binary data and quantized data of each of the P 3D map descriptors, and the decompression module 1003 is configured to: perform dequantization on the quantized data of each of the P 3D map descriptors to obtain P pieces of dequantized data, where the P pieces of dequantized data are used as the reconstructed data of the P 3D map descriptors; perform dequantization on quantized data of each of the Q 3D map descriptors to obtain Q pieces of dequantized data; and obtain reconstructed data of each of the Q 3D map descriptors based on the Q pieces of dequantized data and binary data of each of the Q 3D map descriptors.

In some embodiments, when $N=Q$, compressed data of the P 3D map descriptors includes binary data and quantized data of each of the P 3D map descriptors, and the decompression module 1003 is configured to: perform dequantization on the quantized data of each of the P 3D map descriptors to obtain P pieces of dequantized data; and obtain reconstructed data of each of the P 3D map descriptors based on the P pieces of dequantized data and the binary data of each of the P 3D map descriptors.

In some embodiments, the S 3D map descriptors are S representative 3D map descriptors, the S representative 3D map descriptors each correspond to at least one data set, each data set of the at least one data set includes at least one 3D map descriptor, and the retrieval module 1001 is configured to: perform stage-i retrieval in binary data of the S representative 3D map descriptors based on the binary data of the retrieval descriptor, to obtain at least one representative 3D map descriptor; and use a 3D map descriptor in a data set corresponding to each of the at least one representative 3D map descriptor as the P 3D map descriptors.

In a second possible implementation, the extraction module 1002 is configured to extract first binary data of S 3D map descriptors from compressed data of the S 3D map descriptors, where the S 3D map descriptors correspond to a plurality of 3D map points of a 3D map. The retrieval module 1001 is configured to perform stage-i retrieval in the first binary data of the S 3D map descriptors based on first binary data of a retrieval descriptor, to obtain P 3D map descriptors, where the retrieval descriptor is a feature that corresponds to a real environment and that is extracted from visual information collected by a sensor of an electronic device. The extraction module 1002 is further configured to extract second binary data of the P 3D map descriptors from the compressed data of the P 3D map descriptors. The retrieval module 1001 is configured to perform stage-j retrieval in the second binary data of the P 3D map descriptors based on second binary data of the retrieval descriptor, to obtain Q 3D map descriptors, where S, P, Q, i, and j are positive integers, $0<Q<P$, $0<P<T$, $0<S\leq T$, T represents a total quantity of 3D map descriptors in the 3D map, $j=i+1$, $1\leq i<L$, $1<j\leq L$, L represents a total quantity of retrieval stages of the 3D map or a retrieval stage quantity threshold, and L is a positive integer greater than 1.

In some embodiments, N 3D map descriptors in the Q 3D map descriptors are used for positioning, 3D map points corresponding to the N 3D map descriptors match a 3D map point corresponding to the retrieval descriptor, N is a positive integer, $0<N<Q$, and the apparatus further includes a pose determining module. The pose determining module is configured to perform positioning based on the 3D map points corresponding to the N 3D map descriptors, to obtain pose information of the electronic device.

In some embodiments, both retrieval manners used for the stage-i retrieval and the stage-j retrieval are retrieval based on a first distance, the P 3D map descriptors belong to the S 3D map descriptors, and a location of first binary data of each 3D map descriptor of the P 3D map descriptors in compressed data of the 3D map descriptor is different from a location of second binary data of the 3D map descriptor in the compressed data of the 3D map descriptor, where $P<S$.

In some embodiments, a length of the first binary data of each 3D map descriptor of the P 3D map descriptors is less than a length of the second binary data of each 3D map descriptor of the P 3D map descriptors.

In some embodiments, the apparatus further includes an obtaining module, configured to: receive the retrieval descriptor, and perform binarization on the retrieval descriptor to obtain the first binary data and the second binary data of the retrieval descriptor; or receive the visual information, extract the retrieval descriptor from the visual information, and perform binarization on the retrieval descriptor to obtain the first binary data and the second binary data of the retrieval descriptor; or in response to a visual information collection operation entered by a user, trigger the sensor to perform visual information collection on the real environment to obtain the visual information, extract the retrieval descriptor from the visual information, and perform binarization on the retrieval descriptor to obtain the first binary data and the second binary data of the retrieval descriptor.

In some embodiments, a length of the first binary data of the retrieval descriptor is equal to a length of the first binary data of each 3D map descriptor of the S 3D map descriptors, and/or a length of the second binary data of the retrieval descriptor is equal to a length of the second binary data of each 3D map descriptor of the S 3D map descriptors.

In some embodiments, the S 3D map descriptors are S representative 3D map descriptors, the S representative 3D map descriptors each correspond to at least one data set, each data set of the at least one data set includes at least one 3D map descriptor, and the retrieval module 1001 is configured to: perform stage-i retrieval in first binary data of the S representative 3D map descriptors based on the first binary data of the retrieval descriptor, to obtain at least one representative 3D map descriptor; and use a 3D map descriptor in a data set corresponding to each of the at least one representative 3D map descriptor as the P 3D map descriptors.

In a third possible implementation, the decompression module 1003 is configured to perform stage-m decompression on compressed data of S 3D map descriptors to obtain first reconstructed data of the S 3D map descriptors, where the S 3D map descriptors correspond to a plurality of 3D map points of a 3D map. The retrieval module 1001 is configured to perform stage-i retrieval in first reconstructed data of the S 3D map descriptors based on partial data or all data of a retrieval descriptor, to obtain P 3D map descriptors, where the retrieval descriptor is a feature that corresponds to a real environment and that is extracted from visual information collected by a sensor of an electronic device. The decompression module 1003 is further configured to perform stage-k decompression on compressed data of the P 3D map descriptors to obtain second reconstructed data of the P 3D map descriptors, where a decompression process of the compressed data of the S 3D map descriptors includes the stage-m decompression and the stage-k decompression, or a decompression process of the compressed data of the S 3D map descriptors includes the stage-k decompression and the stage-k decompression includes the stage-m decompression. The retrieval module 1001 is configured to perform stage-j retrieval in the second reconstructed data of the P 3D map descriptors based on a part or all of the retrieval descriptor, to obtain Q 3D map descriptors, where S, P, Q, i, j, k, and m are positive integers, $0<Q<P$, $0<P<T$, $0<S\leq T$, T represents a total quantity of 3D map descriptors in the 3D map, $j=i+1$, $1\leq i<L$, $1<j\leq L$, L represents a total quantity of retrieval stages of the 3D map or a retrieval stage quantity threshold, and L is a positive integer greater than 1.

In some embodiments, N 3D map descriptors in the Q 3D map descriptors are used for positioning, 3D map points corresponding to the N 3D map descriptors match a 3D map point corresponding to the retrieval descriptor, N is a positive integer, $0<N<Q$, and the apparatus further includes a pose determining module. The pose determining module is configured to perform positioning based on the 3D map points corresponding to the N 3D map descriptors, to obtain pose information of the electronic device.

In some embodiments, both retrieval manners used for the stage-i retrieval and the stage-j retrieval are retrieval manners based on a second distance, the P 3D map descriptors belong to the S 3D map descriptors, and a distortion of first reconstructed data of each 3D map descriptor of the P 3D map descriptors is different from a distortion of second reconstructed data of each 3D map descriptor of the P 3D map descriptors. The distortion of the first reconstructed data of each 3D map descriptor of the P 3D map descriptors indicates a degree of a difference between the first reconstructed data of each 3D map descriptor and a corresponding original 3D map descriptor, the distortion of the second reconstructed data of each 3D map descriptor of the P 3D map descriptors indicates a degree of a difference between the second reconstructed data of each 3D map descriptor and a corresponding original 3D map descriptor, where P<S.

In some embodiments, the distortion of the first reconstructed data of each 3D map descriptor of the P 3D map descriptors is greater than the distortion of the second reconstructed data of each 3D map descriptor of the P 3D map descriptors.

In some embodiments, the apparatus further includes an obtaining module, configured to: receive the retrieval descriptor, and obtain partial data or all data of the retrieval descriptor; or receive the visual information, extract the retrieval descriptor from the visual information, and obtain partial data or all data of the retrieval descriptor; or in response to a visual information collection operation entered by a user, trigger the sensor to perform visual information collection on the real environment to obtain the visual information, extract the retrieval descriptor from the visual information, and obtain partial data or all data of the retrieval descriptor.

In some embodiments, the S 3D map descriptors are S representative 3D map descriptors, the S representative 3D map descriptors each correspond to at least one data set, each data set of the at least one data set includes at least one 3D map descriptor, and the retrieval module 1001 is configured to: perform stage-i retrieval in $m^{th}$ reconstructed data of the S representative 3D map descriptors based on partial data or all data of the retrieval descriptor, to obtain at least one representative 3D map descriptor; and use a 3D map descriptor in a data set corresponding to each of the at least one representative 3D map descriptor as the P 3D map descriptors.

In a fourth possible implementation, the decompression module 1003 is configured to perform stage-m decompression on compressed data of S 3D map descriptors to obtain reconstructed data of the S 3D map descriptors, where the S 3D map descriptors correspond to a plurality of 3D map points of a 3D map. The retrieval module 1001 is configured to perform stage-i retrieval in the reconstructed data of the S 3D map descriptors based on partial data or all data of a retrieval descriptor, to obtain P 3D map descriptors, where the retrieval descriptor is a feature that corresponds to a real environment and that is extracted from visual information collected by a sensor of an electronic device. The extraction module 1002 is configured to extract binary data of the P descriptors from compressed data of the P 3D map descriptors. The retrieval module 1001 is further configured to perform stage-j retrieval in the binary data of the P 3D map descriptors based on binary data of the retrieval descriptor, to obtain Q 3D map descriptors, where S, P, Q, i, m, and j are positive integers, 0<Q<P, 0<P<T, 0<S≤T, T represents a total quantity of 3D map descriptors in the 3D map, j=i+1, 1≤i<L, 1<j≤L, L represents a total quantity of retrieval stages of the 3D map or a retrieval stage quantity threshold, and L is a positive integer greater than 1.

In some embodiments, N 3D map descriptors in the Q 3D map descriptors are used for positioning, 3D map points corresponding to the N 3D map descriptors match a 3D map point corresponding to the retrieval descriptor, N is a positive integer, 0<N<Q, and the apparatus further comprises a pose determining module. The pose determining module is configured to perform positioning based on the 3D map points corresponding to the N 3D map descriptors, to obtain pose information of the electronic device.

In some embodiments, a retrieval manner used for the stage-i retrieval is a retrieval manner based on a second distance, and a retrieval manner used for the stage-j retrieval is a retrieval manner based on a first distance.

In some embodiments, the apparatus further includes an obtaining module, configured to: receive the retrieval descriptor, and perform binarization on the retrieval descriptor to obtain the binary data of the retrieval descriptor; or receive the visual information, extract the retrieval descriptor from the visual information, and perform binarization on the retrieval descriptor to obtain the binary data of the retrieval descriptor; or in response to a visual information collection operation entered by a user, trigger the sensor to perform visual information collection on the real environment to obtain the visual information, extract the retrieval descriptor from the visual information, and perform binarization on the retrieval descriptor to obtain the binary data of the retrieval descriptor.

In some embodiments, the S 3D map descriptors are S representative 3D map descriptors, the S representative 3D map descriptors each correspond to at least one data set, each data set of the at least one data set comprises at least one 3D map descriptor, and the retrieval module 1001 is configured to: perform stage-i retrieval in $m^{th}$ reconstructed data of the S representative 3D map descriptors based on partial data or all data of the retrieval descriptor, to obtain at least one representative 3D map descriptor; and use a 3D map descriptor in a data set corresponding to each of the at least one representative 3D map descriptor as the P 3D map descriptors.

It should be noted that the apparatus 1000 for retrieving a 3D map may perform the method for retrieving a 3D map in the embodiment shown in any one of FIG. 5A to FIG. 5D or in FIG. 6 or FIG. 7, or perform related content of S406 to S410 in the embodiment shown in FIG. 8, or perform related content of the embodiment shown in FIG. 9. For an exemplary implementation principle and technical effect, refer to the specific description of the foregoing method embodiment. Details are not described herein again.

Figure 11:
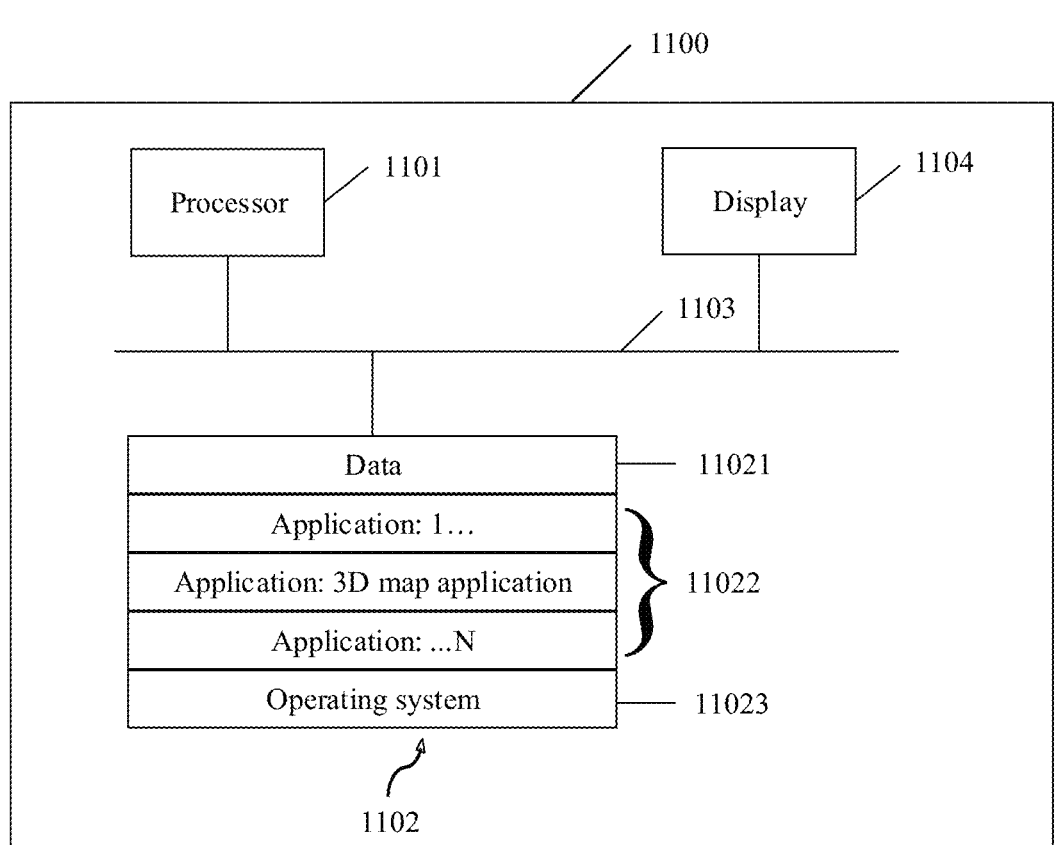
FIG. 11 is a schematic block diagram of a decoding apparatus 1100 according to an embodiment of this application.

FIG. 11 is a schematic block diagram of an implementation of a decoding apparatus 1100 according to an embodiment of this application. The decoding apparatus 1100 may include a processor 1101, a memory 1102, and a bus system 1103. The processor 1101 and the memory 1102 are connected through the bus system 1103. The memory 1102 is configured to store instructions. The processor 1101 is configured to execute the instructions stored in the memory 1102, to perform various methods for retrieving a 3D map described in this application. To avoid repetition, details are not described herein again.

In this embodiment of this application, the processor 1101 may be a central processing unit (CPU), or the processor 1101 may be another general-purpose processor, a DSP, an ASIC, an FPGA or another programmable logic device, a discrete gate or a transistor logic device, a discrete hardware component, or the like. The general-purpose processor may be a microprocessor, or the processor may be any conventional processor or the like.

The memory 1102 may include a ROM device or a RAM device. Any other proper type of storage device may also be used as the memory 1102. The memory 1102 may include code and data 11021 that are accessed by the processor 1101 through the bus 1103. The memory 1102 may further include an operating system 11023 and an application 11022. The application 11022 includes at least one program that allows the processor 1101 to perform the method for retrieving a 3D map described in this application. For example, the application 11022 may include applications 1 to N, and further include a 3D map application that performs the method for retrieving a 3D map described in this application.

The bus system 1103 may further include a power bus, a control bus, a status signal bus, and the like, in addition to a data bus. However, for clarity of description, various types of buses in the figure are denoted as the bus system 1103.

Optionally, the decoding apparatus 1100 may further include one or more output devices, such as a display 1104. In an example, the display 1104 may be a touch display that combines a display and a touch unit that operably senses a touch input. The display 1104 may be connected to the processor 1101 through the bus 1103.

It should be noted that the decoding apparatus 1100 may perform the method for retrieving a 3D map in this application.

A person skilled in the art can understand that the functions described with reference to various illustrative logical blocks, modules, and algorithm steps disclosed and described in this specification can be implemented by hardware, software, firmware, or any combination thereof. If the functions are implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium corresponding to a tangible medium, such as a data storage medium, or any communication medium that facilitates transmission of a computer program from one place to another (for example, according to a communication protocol). In this manner, the computer-readable medium may generally correspond to (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

In an example but not a limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of instructions or a data structure and that is accessible by a computer. In addition, any connection is properly referred to as a computer-readable medium. For example, if instructions are transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the foregoing items should also be included in the scope of the computer-readable media.

Instructions may be executed by one or more processors such as one or more digital signal processors (DSPs), general microprocessors, application-specific integrated circuits (ASICs), field-programmable gate arrays (FPGAs), or other equivalent integrated or discrete logic circuits. Therefore, the term "processor" used in this specification may refer to the foregoing structure, or any other structure that may be applied to implementation of the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of apparatuses configured to perform the disclosed techniques, but do not necessarily require realization by different hardware units. Actually, as described above, various units may be combined into a codec hardware unit in combination with appropriate software and/or firmware, or may be provided by interoperable hardware units (including the one or more processors described above).

The foregoing descriptions are merely exemplary implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for retrieving a three-dimensional (3D) map, applied to an apparatus that comprises at least one processor, wherein the method comprises:

extracting, by the at least one processor, binary data of S 3D map descriptors from compressed data of the S 3D map descriptors, wherein the S 3D map descriptors correspond to a plurality of 3D map points of the 3D map;

performing, by the at least one processor, stage-i retrieval in the binary data of the S 3D map descriptors based on binary data of a retrieval descriptor, to obtain P 3D map descriptors, wherein the retrieval descriptor is a feature that corresponds to a real environment and that is extracted from visual information collected by a sensor of an electronic device;

performing, by the at least one processor, stage-m decompression on compressed data of the P 3D map descriptors to obtain reconstructed data of the P 3D map descriptors, wherein a decompression process of the compressed data of the P 3D map descriptors comprises at least the stage-m decompression;

performing, by the at least one processor, stage-j retrieval in the reconstructed data of the P 3D map descriptors based on partial data or all data of the retrieval descriptor, to obtain Q 3D map descriptors, wherein S, P, Q, i, j, and m are positive integers, $0<Q<P$, $0<P<T$, $0<S\leq T$, T represents a total quantity of 3D map descriptors in the 3D map, $j=i+1$, $1\leq i<L$, $1<j\leq L$, L represents a total quantity of retrieval stages of the 3D map or a retrieval stage quantity threshold, and L is a positive integer greater than 1;

wherein N 3D map descriptors in the Q 3D map descriptors are used for positioning, 3D map points corresponding to the N 3D map descriptors match a 3D map point corresponding to the retrieval descriptor, N is a positive integer, and $0<N\leq Q$; and the method further comprises:

performing, by the at least one processor, positioning based on the 3D map points corresponding to the N 3D map descriptors, to obtain pose information of the electronic device; and displaying, by the apparatus, based on the pose information, a user interface including a navigation indicator.

2. The method according to claim 1, wherein the S 3D map descriptors are S representative 3D map descriptors, the S representative 3D map descriptors each corresponds to at least one data set, each data set of the at least one data set comprises at least one 3D map descriptor, and the performing stage-i retrieval in the binary data of the S 3D map descriptors based on the binary data of the retrieval descriptor, to obtain the P 3D map descriptors comprises:

performing, by the at least one processor, the stage-i retrieval in binary data of the S representative 3D map descriptors based on the binary data of the retrieval descriptor, to obtain at least one representative 3D map descriptor; and using, by the at least one processor, 3D map descriptors in a data set corresponding to each of the at least one representative 3D map descriptor as the P 3D map descriptors.

3. The method according to claim 1, wherein a retrieval manner used for the stage-i retrieval is a retrieval manner based on a first distance, and a retrieval manner used for the stage-j retrieval is a retrieval manner based on a second distance.

4. The method according to claim 1, wherein the method further comprises:

receiving, by the at least one processor, the retrieval descriptor, and performing, by the at least one processor, binarization on the retrieval descriptor to obtain the binary data of the retrieval descriptor;

receiving, by the at least one processor, the visual information, extracting, by the at least one processor, the retrieval descriptor from the visual information, and performing, by the at least one processor, binarization on the retrieval descriptor to obtain the binary data of the retrieval descriptor; or in response to a visual information collection operation entered by a user, triggering, by the at least one processor, the sensor to perform visual information collection on the real environment to obtain the visual information, extracting, by the at least one processor, the retrieval descriptor from the visual information, and performing, by the at least one processor, binarization on the retrieval descriptor to obtain the binary data of the retrieval descriptor.

5. The method according to claim 1, wherein when $N<Q$, the method further comprises:

performing, by the at least one processor, stage-k decompression on compressed data of the Q 3D map descriptors to obtain reconstructed data of the Q 3D map descriptors; and performing, by the at least one processor, stage-r retrieval in the reconstructed data of the Q 3D map descriptors based on partial data or all data of the retrieval descriptor, to obtain the N 3D map descriptors, wherein $N<Q<P$, and the decompression process of the compressed data of the P 3D map descriptors comprises the stage-m decompression and the stage-k decompression, wherein r and k are positive integers, $m<k$, and $j<r\leq L$.

6. The method according to claim 5, wherein the compressed data of the P 3D map descriptors comprises binary data and quantized data of each of the P 3D map descriptors;

the performing stage-m decompression on the compressed data of the P 3D map descriptors to obtain the reconstructed data of the P 3D map descriptors comprises:

performing, by the at least one processor, dequantization on the quantized data of each of the P 3D map descriptors to obtain P pieces of dequantized data, wherein the P pieces of dequantized data are used as the reconstructed data of the P 3D map descriptors; and the performing stage-k decompression on the compressed data of the Q 3D map descriptors to obtain the reconstructed data of the Q 3D map descriptors comprises:

performing, by the at least one processor, dequantization on quantized data of each of the Q 3D map descriptors to obtain Q pieces of dequantized data; and obtaining, by the at least one processor, reconstructed data of each of the Q 3D map descriptors based on the Q pieces of dequantized data and binary data of each of the Q 3D map descriptors.

7. The method according to claim 1, wherein when $N=Q$, the compressed data of the P 3D map descriptors comprises binary data and quantized data of each of the P 3D map descriptors, and the performing stage-m decompression on the compressed data of the P 3D map descriptors to obtain the reconstructed data of the P 3D map descriptors comprises:

performing, by the at least one processor, dequantization on the quantized data of each of the P 3D map descriptors to obtain P pieces of dequantized data; and obtaining, by the at least one processor, reconstructed data of each of the P 3D map descriptors based on the P pieces of dequantized data and the binary data of each of the P 3D map descriptors.

8. An apparatus for retrieving a three-dimensional (3D) map, wherein the apparatus comprises:

at least one processor; and one or more memories coupled to the at least one processor and storing programming instructions for execution by the at least one processor to cause the apparatus to:

extract binary data of S 3D map descriptors from compressed data of the S 3D map descriptors, wherein the S 3D map descriptors correspond to a plurality of 3D map points of the 3D map;

perform stage-i retrieval in the binary data of the S 3D map descriptors based on binary data of a retrieval descriptor, to obtain P 3D map descriptors, wherein the retrieval descriptor is a feature that corresponds to a real environment and that is extracted from visual information collected by a sensor of an electronic device;

perform stage-m decompression on compressed data of the P 3D map descriptors to obtain reconstructed data of the P 3D map descriptors, wherein a decompression process of the compressed data of the P 3D map descriptors comprises at least the stage-m decompression;

perform stage-j retrieval in the reconstructed data of the P 3D map descriptors based on partial data or all data of the retrieval descriptor, to obtain Q 3D map descriptors, wherein S, P, Q, i, j, and m are positive integers, $0<Q<P$, $0<P<T$, $0<S\leq T$, T represents a total quantity of 3D map descriptors in the 3D map, $j=i+1$, $1\leq i<L$, $1<j\leq L$, L represents a total quantity of retrieval stages of the 3D map or a retrieval stage quantity threshold, and L is a positive integer greater than 1;

wherein N 3D map descriptors in the Q 3D map descriptors are used for positioning, 3D map points corresponding to the N 3D map descriptors match a 3D map point corresponding to the retrieval descriptor, N is a positive integer, and $0<N\leq Q$; and the at least one processor further executes the instructions to:

perform positioning based on the 3D map points corresponding to the N 3D map descriptors, to obtain pose information of the electronic device; and display, based on the pose information, a user interface including a navigation indicator.

9. The apparatus according to claim 8, wherein the at least one processor further executes the instructions to:

receive the retrieval descriptor, and perform binarization on the retrieval descriptor to obtain the binary data of the retrieval descriptor;

receive the visual information, extract the retrieval descriptor from the visual information, and perform binarization on the retrieval descriptor to obtain the binary data of the retrieval descriptor; or in response to a visual information collection operation entered by a user, trigger the sensor to perform visual information collection on the real environment to obtain the visual information, extract the retrieval descriptor from the visual information, and perform binarization on the retrieval descriptor to obtain the binary data of the retrieval descriptor.

10. The apparatus according to claim 8, wherein the S 3D map descriptors are S representative 3D map descriptors, the S representative 3D map descriptors each corresponds to at least one data set, each data set of the at least one data set comprises at least one 3D map descriptor, and the at least one processor further executes the instructions to:

perform stage-i retrieval in binary data of the S representative 3D map descriptors based on the binary data of the retrieval descriptor, to obtain at least one representative 3D map descriptor; and use 3D map descriptors in a data set corresponding to each of the at least one representative 3D map descriptor as the P 3D map descriptors.

11. The apparatus according to claim 8, wherein a retrieval manner used for the stage-i retrieval is a retrieval manner based on a first distance, and a retrieval manner used for the stage-j retrieval is a retrieval manner based on a second distance.

12. The apparatus according to claim 8, wherein when $N=Q$, the compressed data of the P 3D map descriptors comprises binary data and quantized data of each of the P 3D map descriptors, and the at least one processor further executes the instructions to:

perform dequantization on the quantized data of each of the P 3D map descriptors to obtain P pieces of dequantized data; and obtain reconstructed data of each of the P 3D map descriptors based on the P pieces of dequantized data and the binary data of each of the P 3D map descriptors.

13. The apparatus according to claim 8, wherein when $N<Q$, the at least one processor further executes the instructions to:

perform stage-k decompression on compressed data of the Q 3D map descriptors to obtain reconstructed data of the Q 3D map descriptors; and perform stage-r retrieval in the reconstructed data of the Q 3D map descriptors based on partial data or all data of the retrieval descriptor, to obtain the N 3D map descriptors, wherein $N<Q<P$, and the decompression process of the compressed data of the P 3D map descriptors comprises the stage-m decompression and the stage-k decompression, wherein r and k are positive integers, $m<k$, and $j<r\leq L$.

14. The apparatus according to claim 13, wherein the compressed data of the P 3D map descriptors comprises binary data and quantized data of each of the P 3D map descriptors, and the at least one processor further executes the instructions to:

perform dequantization on the quantized data of each of the P 3D map descriptors to obtain P pieces of dequantized data, wherein the P pieces of dequantized data are used as the reconstructed data of the P 3D map descriptors;

perform dequantization on quantized data of each of the Q 3D map descriptors to obtain Q pieces of dequantized data; and obtain reconstructed data of each of the Q 3D map descriptors based on the Q pieces of dequantized data and binary data of each of the Q 3D map descriptors.

15. A non-transitory computer-readable storage medium storing computer instructions, wherein when the computer instructions are executed on a computer, cause the computer to perform the operations of:

extracting binary data of S 3D map descriptors from compressed data of the S 3D map descriptors, wherein the S 3D map descriptors correspond to a plurality of 3D map points of a 3D map;

performing stage-i retrieval in the binary data of the S 3D map descriptors based on binary data of a retrieval descriptor, to obtain P 3D map descriptors, wherein the retrieval descriptor is a feature that corresponds to a real environment and that is extracted from visual information collected by a sensor of an electronic device;

performing stage-m decompression on compressed data of the P 3D map descriptors to obtain reconstructed data of the P 3D map descriptors, wherein a decompression process of the compressed data of the P 3D map descriptors comprises at least the stage-m decompression;

performing stage-j retrieval in the reconstructed data of the P 3D map descriptors based on partial data or all data of the retrieval descriptor, to obtain Q 3D map descriptors, wherein S, P, Q, i, j, and m are positive integers, $0<Q<P$, $0<P<T$, $0<S\leq T$, T represents a total quantity of 3D map descriptors in the 3D map, $j=i+1$, $1\leq i<L$, $1<j\leq L$, L represents a total quantity of retrieval stages of the 3D map or a retrieval stage quantity threshold, and L is a positive integer greater than 1;

wherein N 3D map descriptors in the Q 3D map descriptors are used for positioning, 3D map points corresponding to the N 3D map descriptors match a 3D map point corresponding to the retrieval descriptor, N is a positive integer, and $0 < N \leq Q$; and the computer is further caused to perform the operations of:

performing positioning based on the 3D map points corresponding to the N 3D map descriptors, to obtain pose information of the electronic device; and displaying, by the apparatus, based on the pose information, a user interface including a navigation indicator.

16. The non-transitory computer-readable storage medium according to claim 15, wherein a retrieval manner used for the stage-i retrieval is a retrieval manner based on a first distance, and a retrieval manner used for the stage-j retrieval is a retrieval manner based on a second distance.

17. The non-transitory computer-readable storage medium according to claim 15, wherein the computer is further caused to perform the operations of:

receiving the retrieval descriptor, and performing binarization on the retrieval descriptor to obtain the binary data of the retrieval descriptor;

receiving the visual information, extracting the retrieval descriptor from the visual information, and performing binarization on the retrieval descriptor to obtain the binary data of the retrieval descriptor; or in response to a visual information collection operation entered by a user, triggering the sensor to perform visual information collection on the real environment to obtain the visual information, extracting the retrieval descriptor from the visual information, and performing binarization on the retrieval descriptor to obtain the binary data of the retrieval descriptor.

* * * * *